(12) United States Patent
Seo et al.

(10) Patent No.: US 7,522,912 B2
(45) Date of Patent: Apr. 21, 2009

(54) DEVICE AND METHOD FOR DOWNLOADING CHARACTER IMAGE FROM WEBSITE IN WIRELESS TERMINAL

(75) Inventors: Jeong-Wook Seo, Daegu (KR); Wei-Jin Park, Seoul (KR)

(73) Assignee: Samsung Electric Co., Ltd., Suwon-si (KR)

( * ) Notice: Subject to any disclaimer, the term of this patent is extended or adjusted under 35 U.S.C. 154(b) by 228 days.

(21) Appl. No.: 11/175,406

(22) Filed: Jul. 7, 2005

(65) Prior Publication Data

US 2006/0058014 A1 Mar. 16, 2006

(30) Foreign Application Priority Data

Jul. 7, 2004 (KR) .................. 10-2004-0052776

(51) Int. Cl.
*H04M 3/42* (2006.01)
*H04L 29/06* (2006.01)
*G06F 17/00* (2006.01)
*G06F 15/16* (2006.01)
*G06F 15/167* (2006.01)
*G06Q 30/00* (2006.01)

(52) U.S. Cl. ................. 455/414.1; 455/414.3; 715/206; 709/204; 709/219; 705/26

(58) Field of Classification Search .............. 455/414.1, 455/418, 414.3; 709/228, 229, 203, 219; 715/706, 738; 705/26, 27; 345/636
See application file for complete search history.

(56) References Cited

U.S. PATENT DOCUMENTS 5,880,731 A 3/1999 Liles et al.
6,910,186 B2 * 6/2005 Kim ........................ 715/706
2003/0065797 A1 * 4/2003 Fujisawa ................. 709/229
2004/0221224 A1 * 11/2004 Blattner et al. ........... 715/500.1
2005/0108329 A1 * 5/2005 Weaver et al. ............ 709/204
2007/0094330 A1 * 4/2007 Russell .................... 709/206

FOREIGN PATENT DOCUMENTS

| JP | 2001-276436 | 10/2001 |
| JP | 2003-108285 | 4/2003 |
| KR | 2001-0091456 | 10/2001 |
| KR | 2001-0096405 | 11/2001 |
| KR | 10-2002-0073313 | 9/2002 |
| KR | 2002-79660 | 10/2002 |
| KR | P2004-51921 | 6/2004 |

* cited by examiner

*Primary Examiner*—George Eng
*Assistant Examiner*—Nam Huynh
(74) *Attorney, Agent, or Firm*—Roylance, Abrams, Berdo & Goodman, L.L.P.

(57) ABSTRACT

A character service apparatus includes a character content database for storing characters and individual lists of characters purchased by each of users, a content server, connected to a data communication network, for downloading character information to terminals connected thereto, registering a purchased character in a character list of a corresponding terminal, accessing the character content database and downloading a character registered in the character list of the corresponding terminal in response to a transmission request, and a wireless terminal connected to the content server via a wireless network and the data communication network, for displaying the downloaded character information, transmitting a purchase request for the character selected by the user to the content server, transmitting a transmission request for the purchased character, and registering characters received in response to the transmission request as screen information for displaying a specific state of the wireless terminal.

34 Claims, 60 Drawing Sheets

FIG.28B

DEVICE AND METHOD FOR DOWNLOADING CHARACTER IMAGE FROM WEBSITE IN WIRELESS TERMINAL

BACKGROUND OF THE INVENTION

1. Field of the Invention

The present invention generally relates to a character service method of a wireless terminal, and more particularly to a method that can download a character image of a character content server to a wireless terminal.

2. Description of the Related Art

Conventionally, a wireless terminal means a portable device carried by a user, and its representative device is a wireless phone. The wireless phone can serve various; supplementary functions as well as a basic phone function. Wireless phones with the supplementary functions may be a camcorder phone with a camera, a television (TV) phone through which TV can be watched, a Moving Picture Experts Group (MPEG) layer 3 (MP3) through which an MP3 music file can be listened to, and so on. That is, it is a trend that products with supplementary functions capable of processing multimedia data are widely used as the current wireless phones.

The wireless terminals capable of processing the multimedia data conventionally include a liquid crystal display (LCD), and various display methods for displaying the multimedia data are being developed. The wireless terminals are being developed such that various types of user data can be displayed. Currently, user data displayed in the wireless terminals are generally configured by visual image data such as photo data, character images, animations, and so on. Avatar image data is included in the user data, and wireless terminals using the avatar image data are being developed.

SUMMARY OF THE INVENTION

It is, therefore, an object of the present invention to provide an apparatus and method that can download avatar-related images using a web service in a wireless terminal and generate an Avatar House screen to be used in a standby state of the wireless terminal.

It is another object of the present invention to provide an apparatus and method through which a wireless terminal can configure House in a desired form and download the configured House as the wireless-terminal is connected to a server for providing avatars and avatar-related information on a web site.

It is another object of the present invention to provide an apparatus and method that can generate an Avatar House screen using a purchased avatar and purchased items and download the generated Avatar House Screen to a wireless terminal after a user purchases a desired avatar and desired items on a web site with a character content server containing avatars and items decorating House.

It is another object of the present invention to provide an apparatus and method through which a data terminal can edit a character structure available for a specific state of a wireless terminal in a character content server and transmit a result of the edition to the wireless terminal.

It is another object of the present invention to provide an apparatus and method that can perform a download operation from a character content server to a wireless terminal in response to a request of a data terminal, register characters requested for purchase as characters of an associated terminal, and download selected characters in response to a request of the terminal.

It is yet another object of the present invention to provide an apparatus and method through which a wireless terminal can access a character content server, select and purchase desired characters, download the purchased characters, and use the downloaded characters as characters of the wireless terminal.

BRIEF DESCRIPTION OF THE DRAWINGS

FIGS. 28A and 28B illustrate a procedure for processing a download list in accordance with an embodiment of the present invention;

DETAILED DESCRIPTION OF THE PREFERRED EMBODIMENTS

Figure 1A:
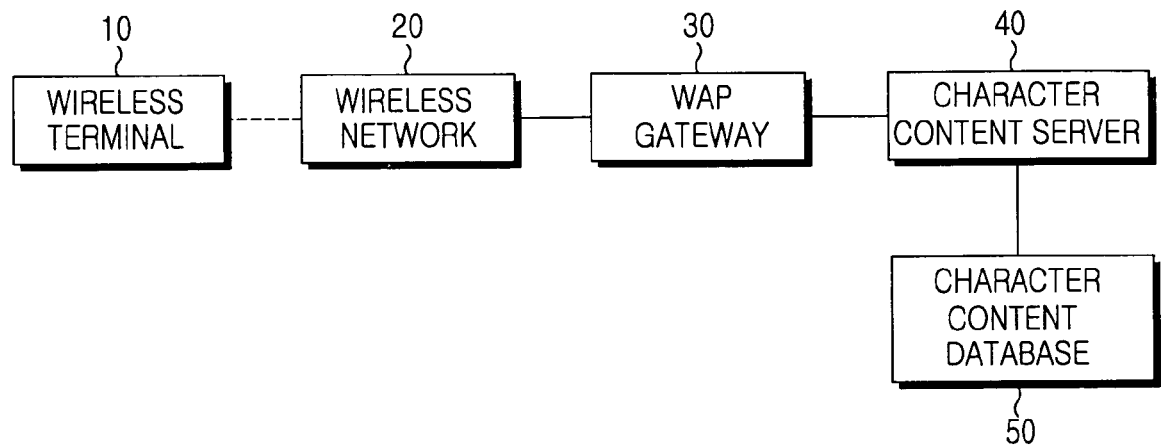
FIGS. 1A to 1C are block diagrams illustrating a web structure in accordance with an embodiment of the present invention.

Preferred embodiments of the present invention will be described in detail herein below with reference to the accompanying drawings. In the drawings, the same or similar elements are denoted by the same reference numerals even though they are depicted in different drawings.

Specific details such as types of character images of a wireless terminal, and so on are provided for a better understanding of the present invention. Those skilled in the art will appreciate that the present invention can be easily implemented through various modifications without the specific details.

In the following description, the term "character" can be used as a generic term indicating all images such as avatars, items, and so on. The term "Mounut" is short for Mobile Doughnut and can be used as the same as the term "avatar" in an embodiment of the present invention. The terms "House" and "Avatar House" have the same meaning as each other. The term "House" indicates a screen configured by an avatar and items, and indicates a display screen used in a specific state of a wireless terminal (e.g., a standby state). Hereinafter, it is assumed that the specific state is a standby state of the wireless terminal. The term "item" indicates an image for decorating a House screen along with an avatar, and is used as distinguished from the term "avatar".

Moreover, the term "My Mounut" indicates a purchased avatar and purchased characters. The terms "My Avatar" and "My Character" are used in the same meaning as the term "My Mounut". The term "House Shop" is used as a shop where items are purchased, and is used in the same meaning as the terms "Item Shop" and "House Item Shop". The terms "Mounut Shop" and "House Shop" are used in the same meaning as the term "Character Shop". The term "computer" is used in the same meaning as the term "data terminal".

An avatar used in the wireless terminal has the ability of processing information, controls its behavior according to event processing of the terminal, and performs various interactions with a user. First, the information processing ability of the avatar will be described. The avatar variously reacts to environments (associated with an antenna, a battery, an amount of communication packet variation, and so on) of the wireless terminal, has a bring-up function through which the avatar grows according to a use state of the wireless terminal, and provides convenient environments (of a background screen, menu variation, and so on) on which the user's tendency of using the wireless terminal is reflected. Second, avatar behavior control according to a type of using the wireless terminal will be described. The avatar has an emotional model and various emotional indices (associated with kindness, popularity, emotion, and so on) according to an event processing result, and displays the emotional model mapped to an emotional index. Third, various interactions with the user will be described. The avatar can maximize convenience and intimacy for the user by providing various entertainment and servant functions, and establishes a new differentiated concept of the wireless terminal.

When the above-described avatar functions are adopted in the wireless terminal, the wireless terminal can satisfy the user and can realize all actions associated with a business object capable of creating an independent value added service in an on-line fashion. First, an avatar system can be extended in terms of community, private data back-up, character purchase and update, and so on. Second, the avatar system can overcome limitations of the wireless terminal by creating a mobile-linked function for overcoming a drawback of a personal terminal, loyalty for customers, and a new business model. Third, the avatar system can be extended and can enhance media control power by providing various entertainment and servant functions, such that various interactions can be performed between the user and the wireless-terminal.

In this case, the wireless terminal can process entertainment, a text message associated with an avatar, Avatar House for a standby screen, emotional expression according to an event, and so on. Private/public services using a wireless network (based on Web/Wireless Application Protocol (WAP)) can provide the-wireless terminal with entertainment, Avatar House (or private Web-mobile linked Blog), avatar house item malls, avatar communities, avatar games, services (for postcards and photos), and so on.

Now, how the private/public services are supported will be described.

Avatar House serves as an information center for displaying information such as the current avatar state, an emotional index, and etc. on the basis of service implemented in the wireless terminal and also supports a servant function interworking with the wireless terminal such as a data backup service, and so on. As a personal Blog space is supported, Avatar House can serve as a personal home page that is impossible in a wireless terminal. That is, Avatar House is a screen to be displayed on the wireless terminal in the standby state and performs Store and Open functions for a set House theme and a synchronization function between Avatar House and the wireless terminal. Display and notification functions for information associated with the wireless terminal can be performed using an avatar. Information about phone book data backup, wireless terminal memory backup, downloaded image backup, schedule management, and so on can be displayed using an avatar. The avatar can perform a function for replacing various characters according to purchase, a background replacement function and an item storage function.

Second, the avatar item mall is implemented on both the wireless terminal and the web, and serves as a shopping mall through which an avatar item and character can be purchased and provided as a gift. The user can buy an item suitable for a feature of each character and increase a specific emotional index of a corresponding character. Through the avatar item mall, differentiation of emotional index development according to a state in which each character room is decorated and a bring-up function of an avatar according to the purchase of an item with a specific index can be enhanced. The user of the wireless terminal can buy and gift various items. A basic character can be purchased for multi-character use. Ringtone and coloring content associated with an avatar can be purchased, and item auction and resale functions can be provided.

Third, the avatar community can provide various events and clubs, provides a feedback function between users that cannot be provided from the wireless terminal, and a function for activating use of an avatar. Moreover, the avatar community provides an entertainment function associated with an event, contest, and so on, and provides a community function of various bulletin boards, an avatar-related club function, and so on.

Fourth, an avatar entertainment performs a function for providing various supplementary functions to the wireless terminal and a function for improving utility of site and wireless terminal services. The avatar entertainment can include an avatar postcard function for supporting facial expression variation on the basis of an emotion circuit in a function of a visual message form into which an avatar character has been inserted, an avatar photo frame function for freely generating a sticker photo event on a phone photo using a photo frame into which an avatar character has been inserted, an avatar wallpaper function for downloading a computer background screen or an accessory such as a calendar capable of being outputted, a function for downloading English word learning content, games, and so on to the wireless terminal, and avatar games capable of being enjoyed on the web.

The avatar-related web service function will be described in more detail.

Figure 1B:
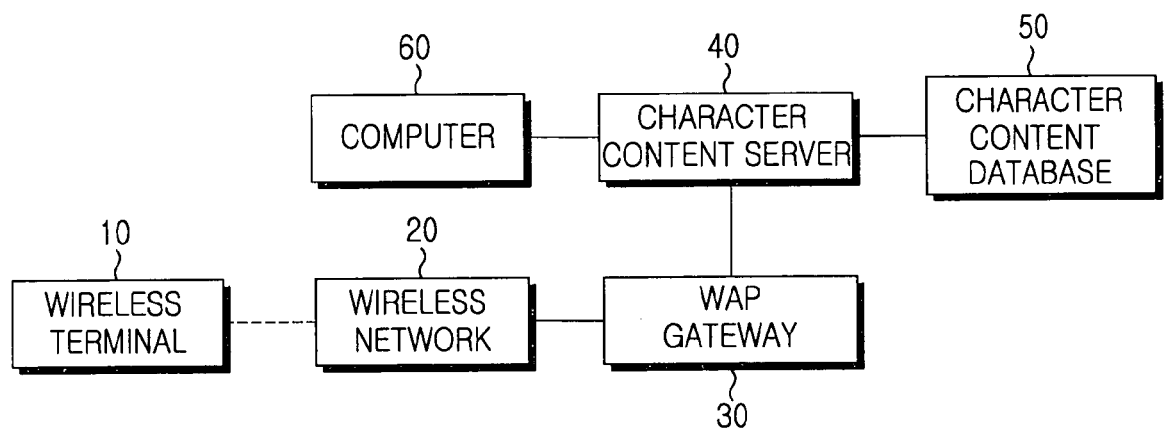
Figure 1C:
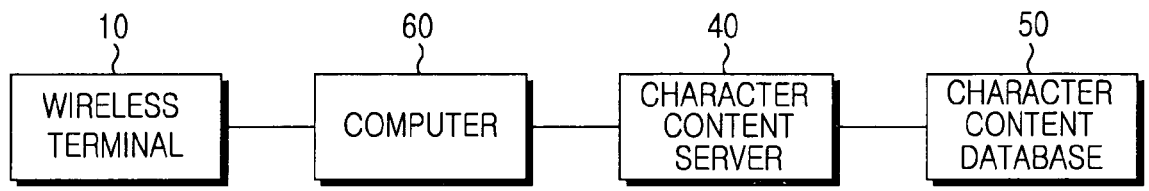

The above-described avatar-related web service function can be implemented in a web service network as illustrated in FIGS. 1A to 1C. As illustrated in FIGS. 1A to 1C, a character content server (or avatar content server) 40 is a server for processing the character entertainment, Avatar House, item mall, avatar community, avatar game, and avatar service functions in accordance with an embodiment of the present invention. A character content database 50 serves as a database of the character content server 40, stores image data such as an avatar character, an item character, and so on, and is controlled by the character content server 40. The character content server 40 establishes a communication path with a wireless terminal 10 and a computer 60, and processes an operation associated with character processing.

Referring to FIG. 1A, when the wireless terminal 10 attempts to access the WAP, a wireless network 20 notifies a gateway 30 of the WAP access attempt. The gateway 30 notifies the wireless terminal 10 of a WAP connection. In this case, when the wireless terminal 10 requests a character menu, the gateway 30 notifies the character content server 40 of the character menu request and the character content server 40 downloads the requested character menu. When specific character information is selected from the downloaded character menu, the character content server 40 downloads the selected character information to the wireless terminal 10. At this time, the wireless terminal 10 communicates, with the, character content server 40 through the wireless network 20. The wireless network 20 may be one of communication networks associated with Interim Standard-95 (IS-95), Code Division Multiple Access (CDMA), Universal Mobile Telecommunications System (UMTS), and so on, or may be a satellite broadcasting network capable of performing two-way communication. Character information communicated between the wireless terminal 10 and the character content server 40 may be Avatar House, an avatar, an item, an avatar game, and so on.

Referring to FIG. 1B, when a computer 60 attempts to access a character-related web site, the computer 60 and the character content server 40 are connected to each other on the web. In this case, when the computer 60 is connected to the character content server 40, the character content server 40 downloads a character menu, and the downloaded character menu is displayed on a display unit of the computer 60. In this case, the user of the computer 60 can select desired character information from the displayed character menu, edit the selected character information, and gift the selected character information to the wireless terminal 10. When the computer 60 makes a request for transmitting the character information to the wireless terminal 10, the character content server 40 notifies the wireless terminal 10 of the request. When the wireless terminal 10 responds to the request, the selected character information is sent to the wireless terminal 10. Also in this case, the wireless terminal 10 communicates with the character content server 40 through the wireless network 20.

Referring to FIG. 1C, the wireless terminal 10 is connected to the computer 60 through a communication cable, and the computer 60 selects, edits, and downloads character information from the character content server 40 through a procedure associated with FIG. 1B. The downloaded character information is sent to the wireless terminal 10 through the communication cable.

Figure 2:
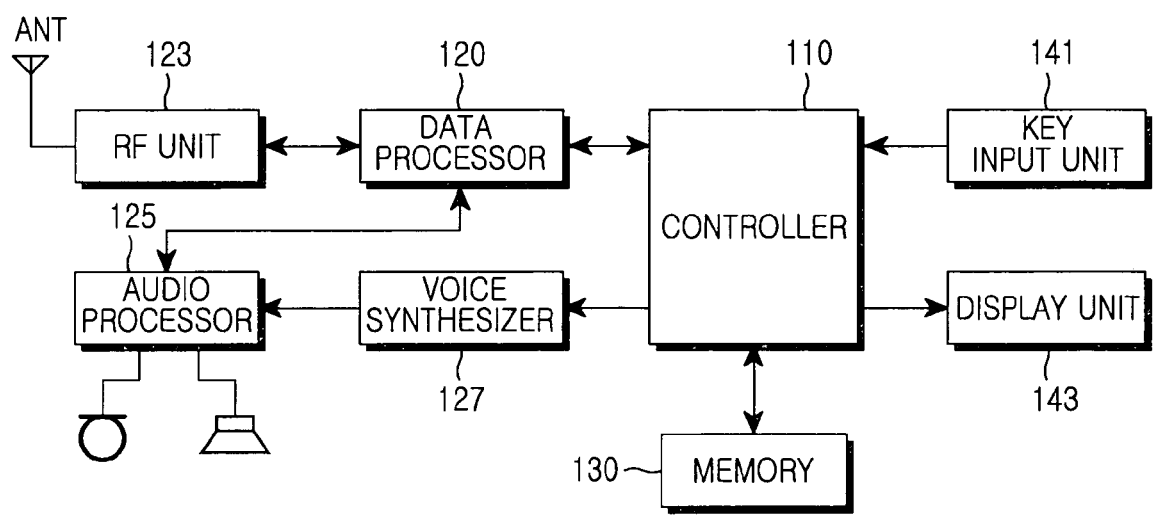
FIG. 2 is a block diagram illustrating a structure of a wireless terminal in accordance with an embodiment of the present invention.

FIG. 2 is a block diagram illustrating a structure of the wireless terminal 10 in accordance with an embodiment of the present invention, and the wireless terminal 10 may be a wireless phone.

Referring to FIG. 2, a radio frequency (RF) unit 123 performs a wireless communication function of the wireless phone. The RF unit 123 includes an RF transmitter for up converting and amplifying a frequency of a signal to be transmitted, an RF receiver for low-noise amplifying a received signal and down converting a frequency of the received signal, and so on. A data processor 120 includes a transmitter for encoding and modulating the signal to be transmitted and a receiver for demodulating and decoding the received signal. That is, the data processor 120 can include a modulator-demodulator (MODEM) and a coder-decoder (CODEC). A voice converter 127 performs a function for converting text data output from a controller 110 into a voice signal. The voice converter 127 can convert a received text message into a voice signal.

A key input unit 141 includes keys for inputting number and letter information and function keys for setting various functions.

A memory 130 can be configured by program and data memories. The program memory stores programs for processing a call of the wireless phone and programs for controlling reaction of an avatar according to event occurrence in accordance with an embodiment of the present invention. The data memory performs a function for temporarily storing data generated while the programs are executed. Moreover, the data memory includes an avatar memory for storing avatar images and an item memory for storing item images representing various functions in accordance with an embodiment of the present invention. The avatar memory can operate with a file system, and can have an index of an avatar-by-avatar memory (or file system). The avatar memory can be configured in various forms for enabling operations, facial expressions, and object representations of avatar components. Avatar information can be stored in the avatar memory according to forms capable of performing avatar reactions.

The controller 110 performs a function for controlling the overall operation of the wireless terminal. Moreover, the controller 110 may include the data processor 20. That is, in case of the wireless phone, the controller 110, the data processor 120, the audio processor 125, and the voice converter 127 may be integrated into one mobile station modem (MSM) chip. The controller 110 controls an operation for selecting avatar and item images to be displayed on a display screen and an operation for displaying the selected images in a desired position of the display screen in accordance with an embodiment of the present invention.

A local area communicator 150 modulates data output from the controller 110 using an associated local area communication scheme to transmit the modulated data, or demodulates received data using an associated local area communication scheme to output the demodulated data to the controller 110. The local area communicator 150 can use an Infrared Data Association (IrDA) scheme or a Bluetooth scheme. The local area communicator 150 performs a local area communication function using a set communication scheme in another communication device close to the wireless terminal.

A display unit 143 displays a state of the wireless terminal under control of the controller 110. The display unit 160 can use a liquid crystal display (LCD). In this case, the display unit 143 can include an LCD controller, a memory for storing display data, an LCD display element, and so on. When the LCD is implemented in an LCD touch screen scheme, it can operate as an input unit.

In an embodiment of the present invention, a description will be given of an exemplary procedure in which the computer 60 as illustrated in FIG. 1B is connected to the character content server 40 and selects, edits, and downloads character information. Even when the wireless terminal 10 operates in connection with the character content server 40, it can perform the same operations as the computer 60.

Figure 3:
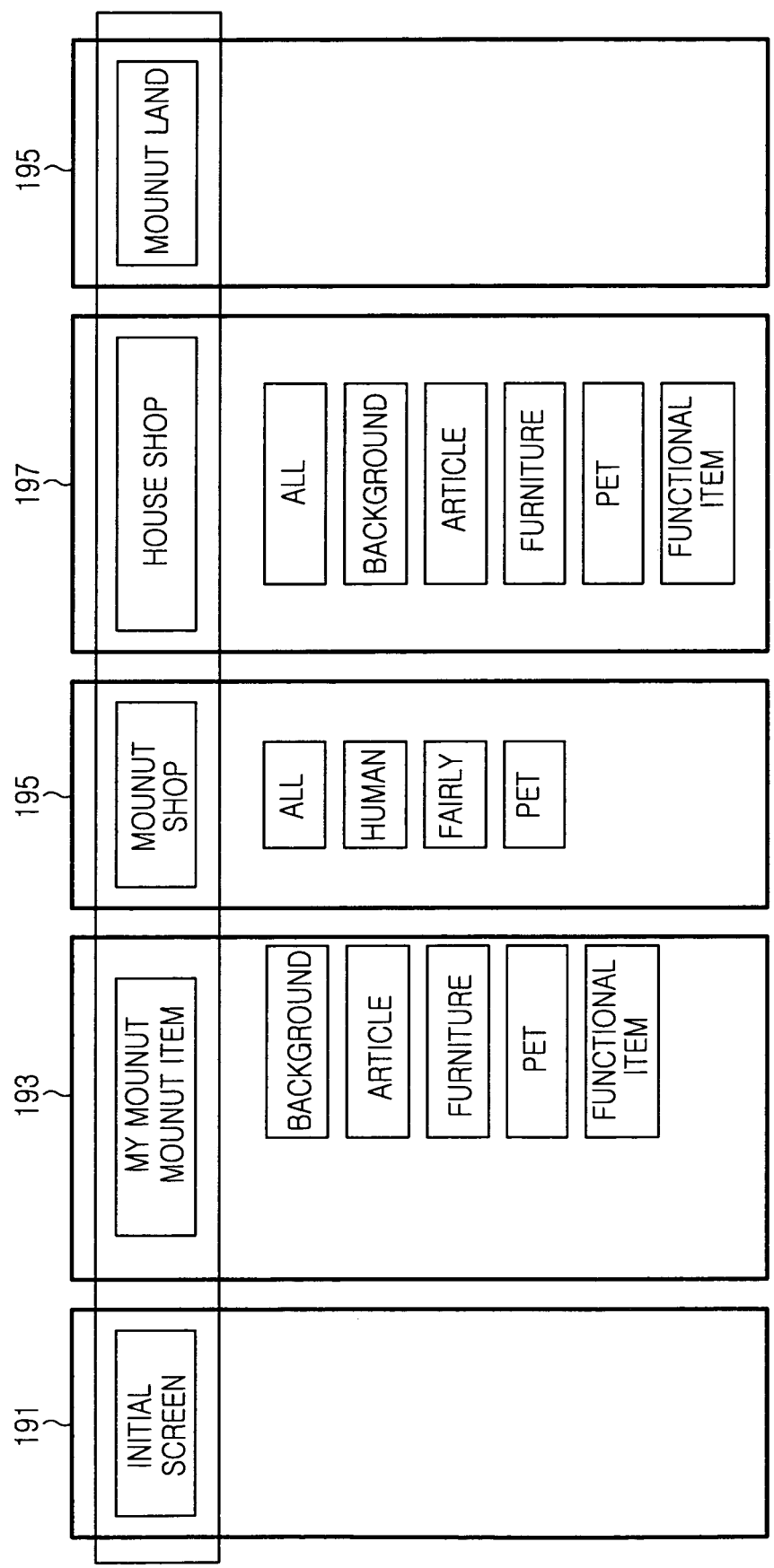
FIG. 3 illustrates a menu structure of a character-related web site in accordance with an embodiment of the present invention.

FIG. 3 illustrates a character menu structure of a web site in accordance with an embodiment of the present invention.

Referring to FIG. 3, when the computer 60 makes a character menu transmission request after connecting to the character content server 40, the avatar content server 40 downloads an avatar menu with the structure as illustrated in FIG. 3. The character menu structure, includes an initial screen 101 to be displayed when the user performs initial access, My Mounut 193 for displaying an avatar (Mounut) and items purchased by the user, Mounut Shop 195 for displaying avatars (Mounuts) capable of being purchased by users, House Shop 197 for displaying items that users can buy, Mounut Land 195 for displaying communication and notification information between all users and web operators, and so on. The initial screen 191 is displayed when the user is connected to the character content server 40, and displays new character images and bestseller character images. My Mounut 193 is assigned on a user-by-user basis and stores avatars and items purchased by the users. A House screen of the user is displayed on a preview area. Mounut Shop 195 and House Shop 197 include menus for purchasing items configuring Mounut and House, respectively. In an embodiment of the present invention, Mounut types are Human, Fairy, Pet, Monster, and so on. Item types are Background, Article, Furniture, Pet, and Functional items, and so on. Mounut Land 195 is a content page of an entertainment content function for promoting web site use of users. That is, Mounut Land 195 can include a behavior animation, in which the user expresses avatar emotions and text, upload House beautifully decorated by the user, and select and display House most preferred by the users.

Figure 4A:
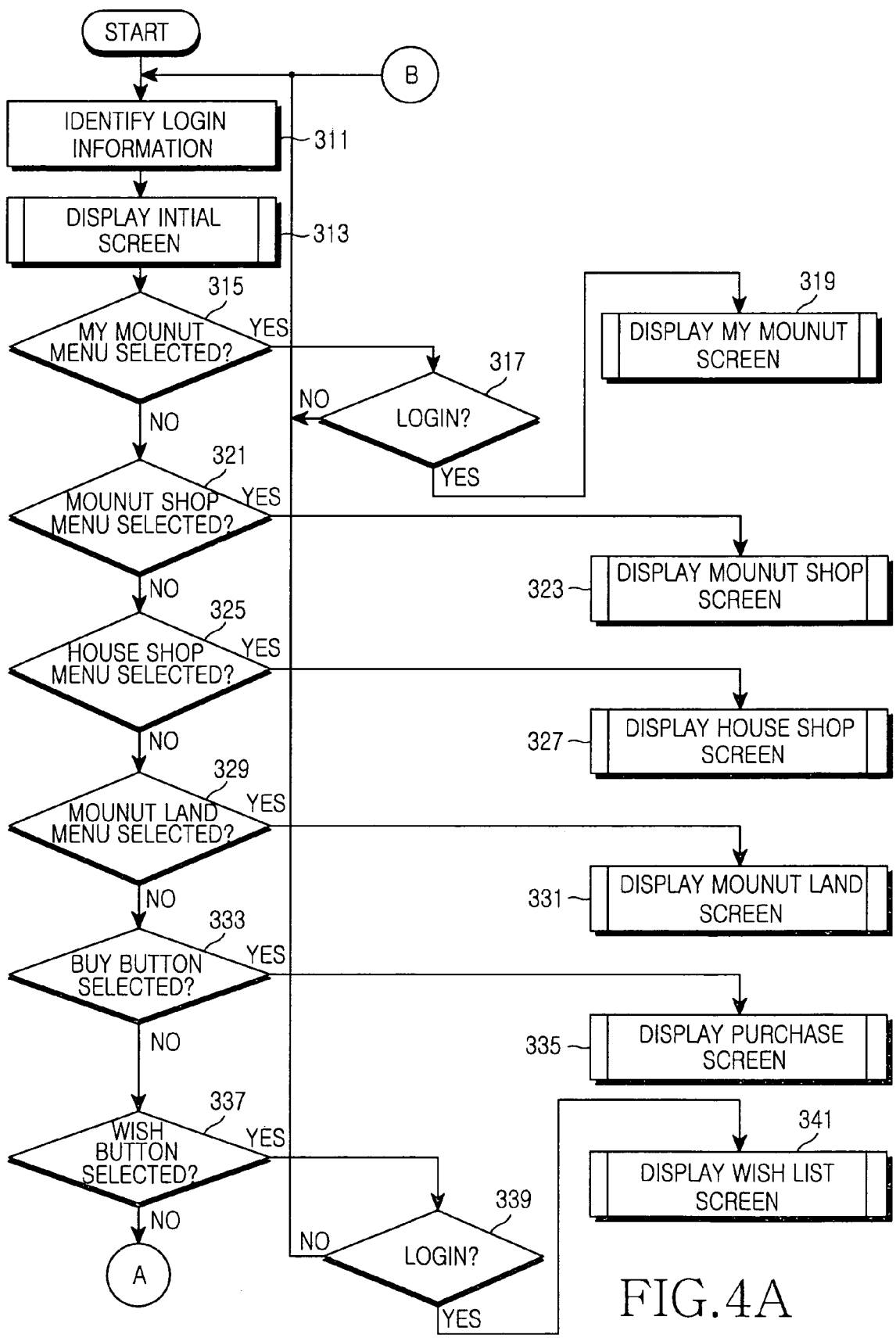
FIG. 4 is a flow chart illustrating a character service procedure of the character-related web site in accordance with an embodiment of the present invention.
Figure 4B:
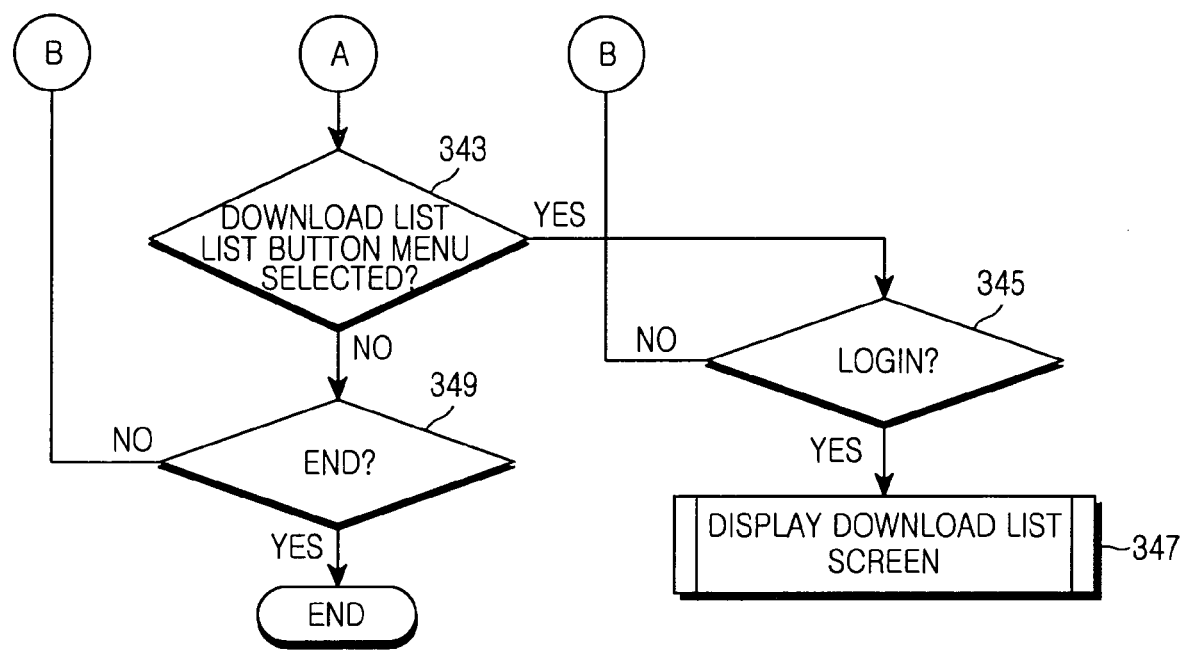

FIG. 4 illustrates main flow of a character-related web site in accordance with an embodiment of the present invention. FIG. 4 is a flow chart illustrating a procedure of connecting to the character content server 40 through the computer 60.

Figure 5:
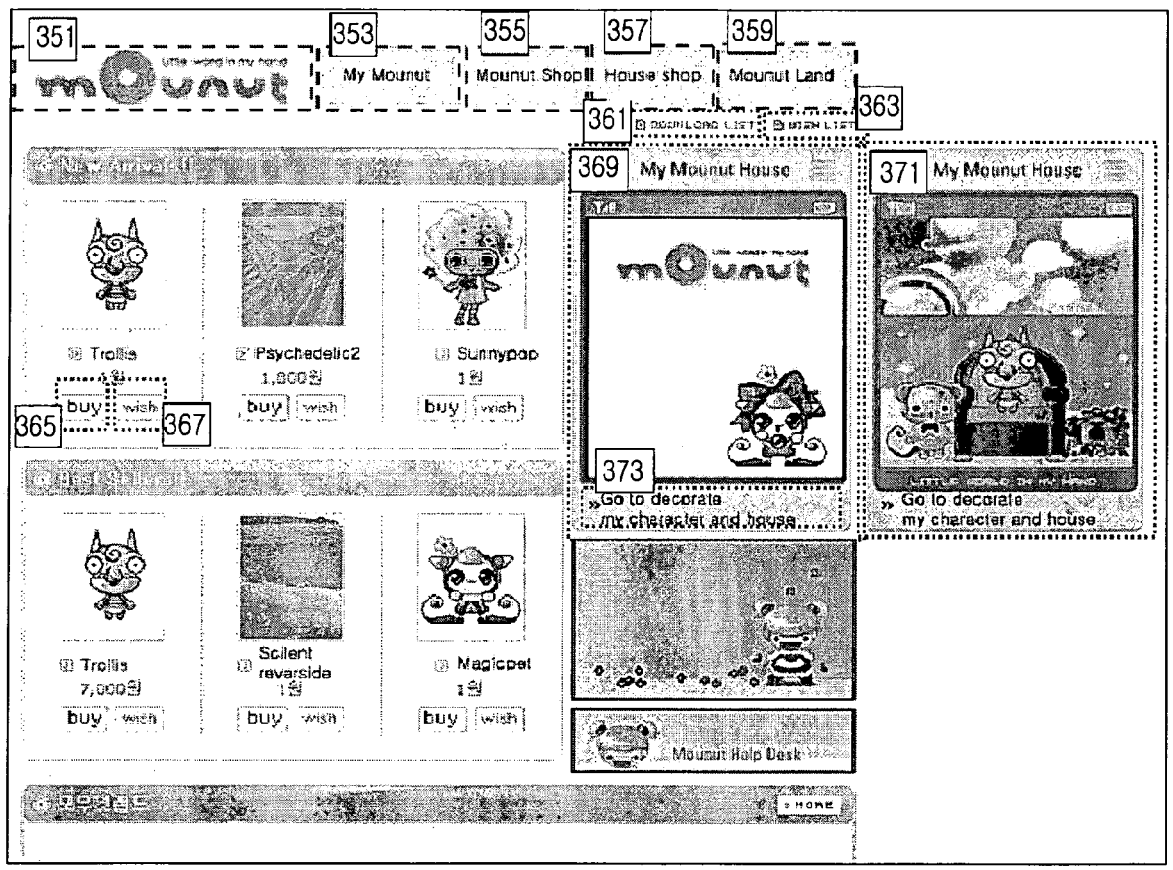
FIG. 5 illustrates an initial screen of the character-related web site in accordance with an embodiment of the present invention.

Referring to FIG. 4, when the user of the computer 60 attempts access, the character content server 40 identifies login information and downloads an initial screen to the computer 60 according to the login in step 311. Then, the computer 60 displays the downloaded initial screen on the display unit. At this time, the computer 60 can display the initial screen in the same form as illustrated in FIG. 5. FIG. 5 illustrates an initial screen of an avatar-related web site. In accordance with an embodiment of the present invention, a character download service can be performed according to the login of the user. First, a button 351 is a shortcut button for an initial screen. A button 353 is a shortcut button for My Mounut. A button 355 is a shortcut button for Mounut Shop. A button 359 is a shortcut button for Mounut Land. A button 361 is a Download List View button. A button 363 is a Wish List View button. A button 365 is a Buy button. A button 367 is an Add To Wish List button. A button 373 is a shortcut button for a screen of My Mounut. Windows 369 and 371 are preview windows. In logoff state, a preview screen as indicated by reference numeral 369 is not displayed. In login state, My Mounut House as indicated by reference numeral 371 is displayed. As illustrated in FIG. 5, the initial screen displays the preview window 369 (or 371), an area for displaying new Mounut (or new arrivals), a Mounut display area for bestsellers, and Mounut Land.

When a button for My Mounut, Mounut Shop, House Shop, Mounut Land, Mounut Purchase, Add to Wish List, Download List, or Wish List is clicked in a state in which the initial screen of FIG. 5 has been selected in step 313 of FIG. 4, a jump to an associated function is performed and the associated function is processed. At this time, the computer 60 transfers information input by the user to the character content server 40, and the character content server 40 analyzes the input user information and downloads character information for an associated function. Moreover, when the user sends a purchase command or transmission request, the computer 60 sends the purchase command or transmission request to the character content server 40. When the purchase command is generated from the user, the character content server 40 creates a list of characters purchased by the user and stores the character list in a My Mounut area of an associated user. When the transmission request is generated from the user, the character content server 40 transmits characters (such as House, Mounut, items, and so on) requested by the user to the computer 60 or a wireless terminal designated by the user.

Figure 6:
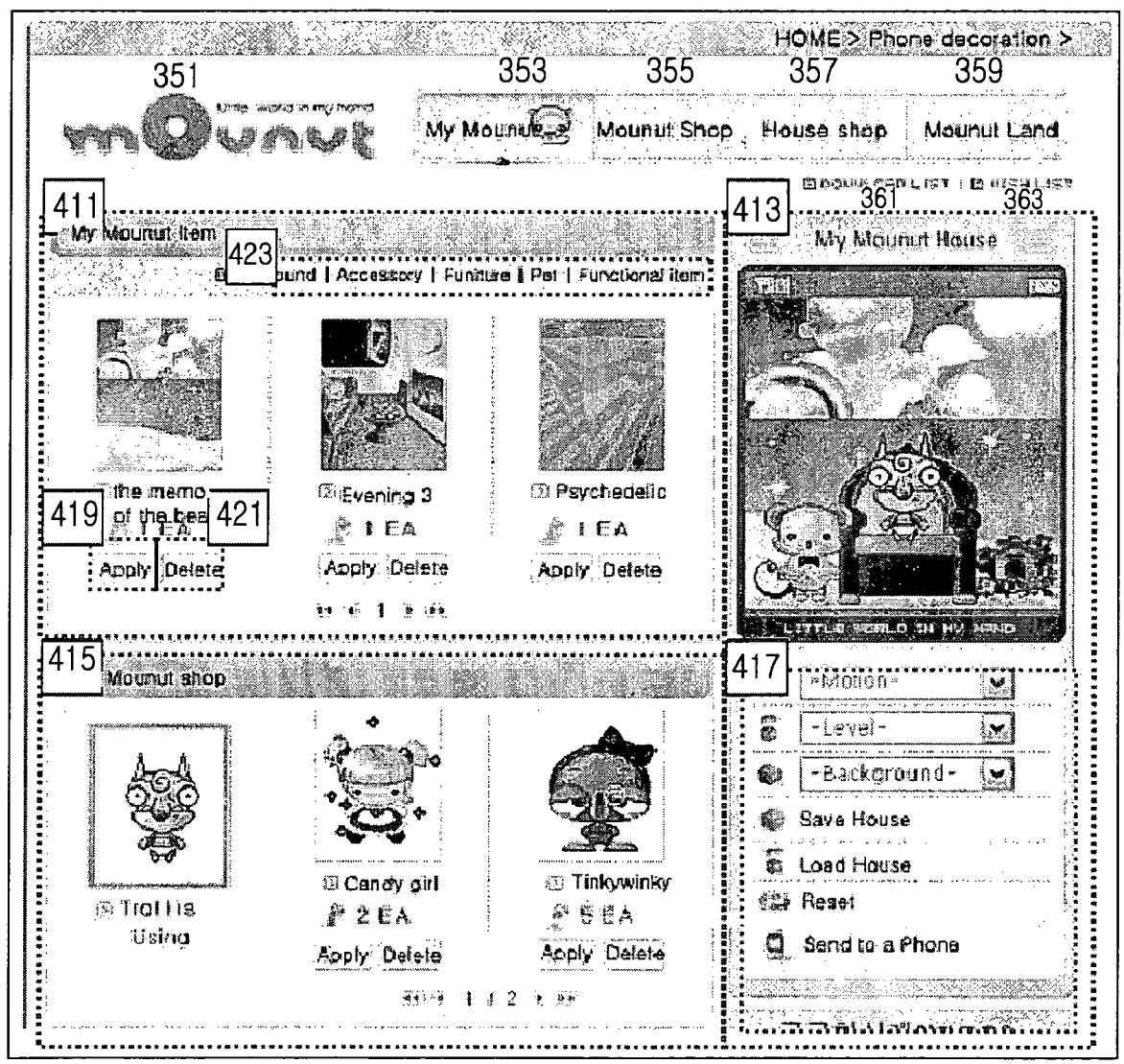
FIG. 6 illustrates an initial screen for My Mounut (Avatar) in accordance with an embodiment of the present invention.
Figure 7:
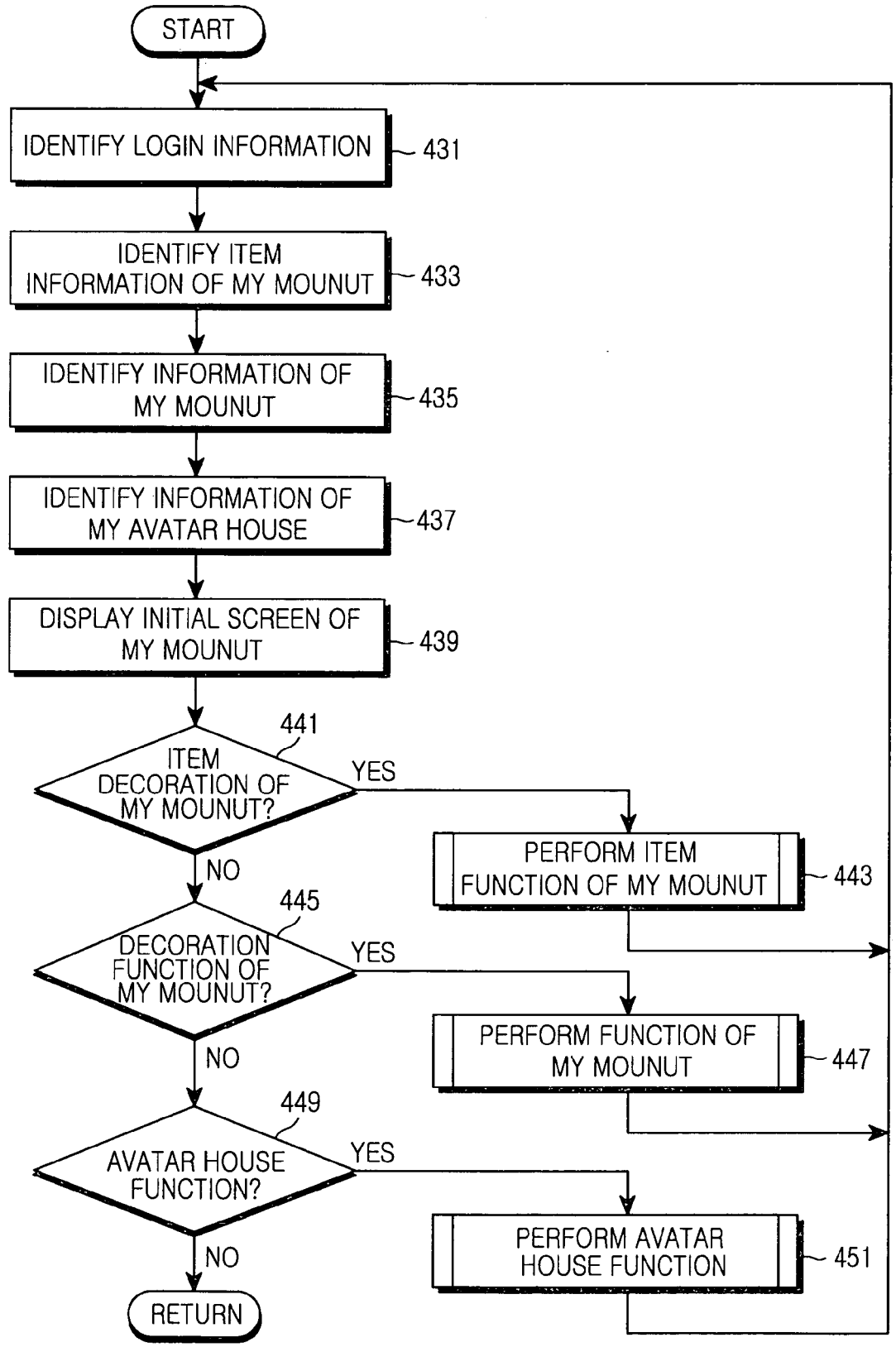
FIG. 7 is a flow chart illustrating a character service procedure when a My Mounut (Avatar) menu is selected in accordance with an embodiment of the present invention.

First, when the My Mounut button 353 is clicked, the computer 60 senses the clicked button and notifies the character content server 40 of the clicked button. The character content server 40 senses the clicked button in step 315 and checks a login state of the user in step 317. When the checked state is the logoff state, a My Mounut function is terminated and the procedure returns to step 311. However, when the login procedure has been performed normally in step 317, the character content server 40 senses the normal login state and downloads a My Mounut screen of a login subscriber to the computer 60 in step 319. Accordingly, the computer 60 displays My Mounut downloaded from the character content server 40. In this case, the computer 60 displays the My Mounut screen in the structure as illustrated in FIG. 6, and the My Mounut function is processed as the procedure of FIG. 7 is performed. Accordingly, the computer 60 and the character content server 40 perform a My Mounut processing procedure while performing the procedure of FIG. 7 in step 317.

Figure 14:
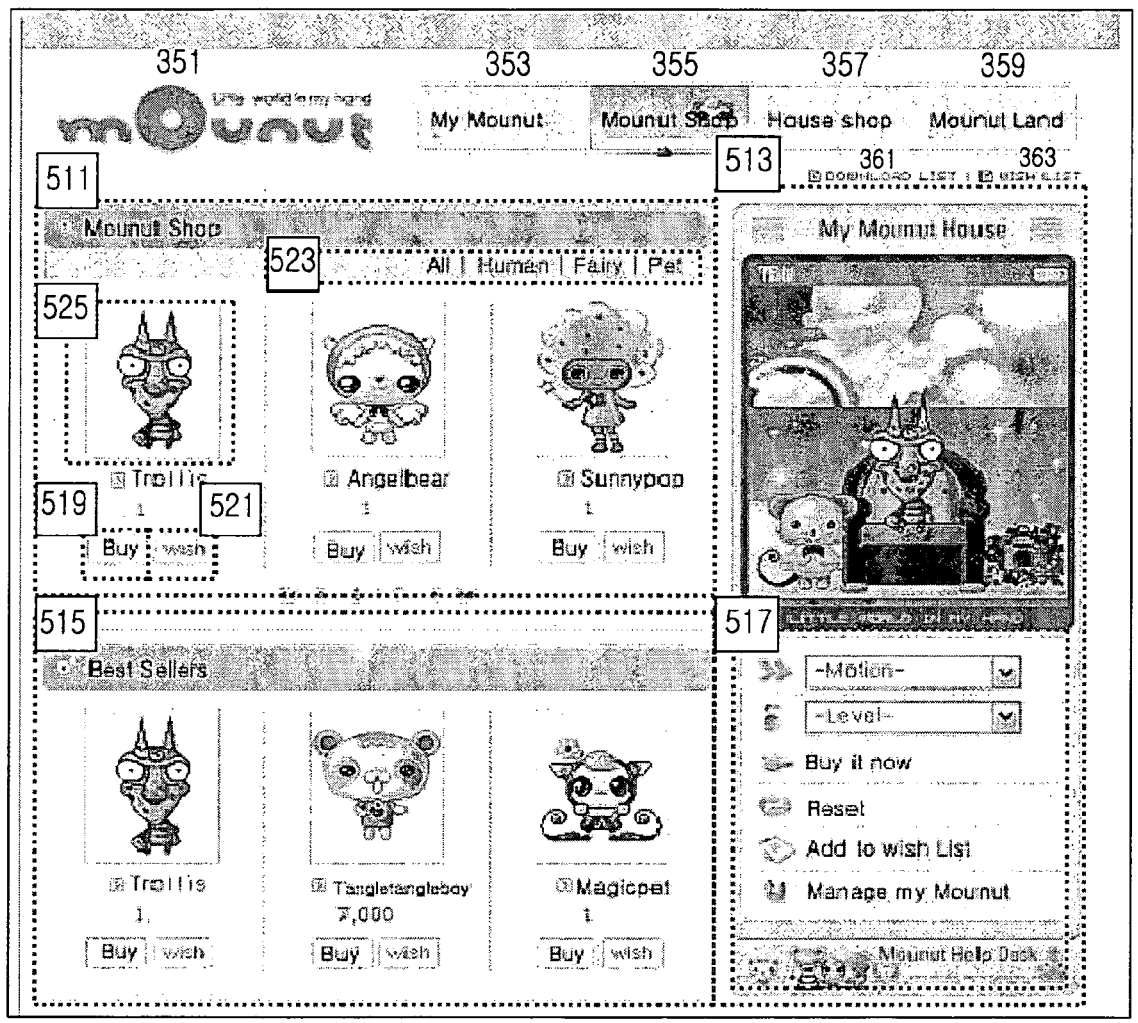
FIG. 14 illustrates a structure of an initial screen of Mounut (Avatar) Shop in accordance with an embodiment of the present invention.
Figure 15:
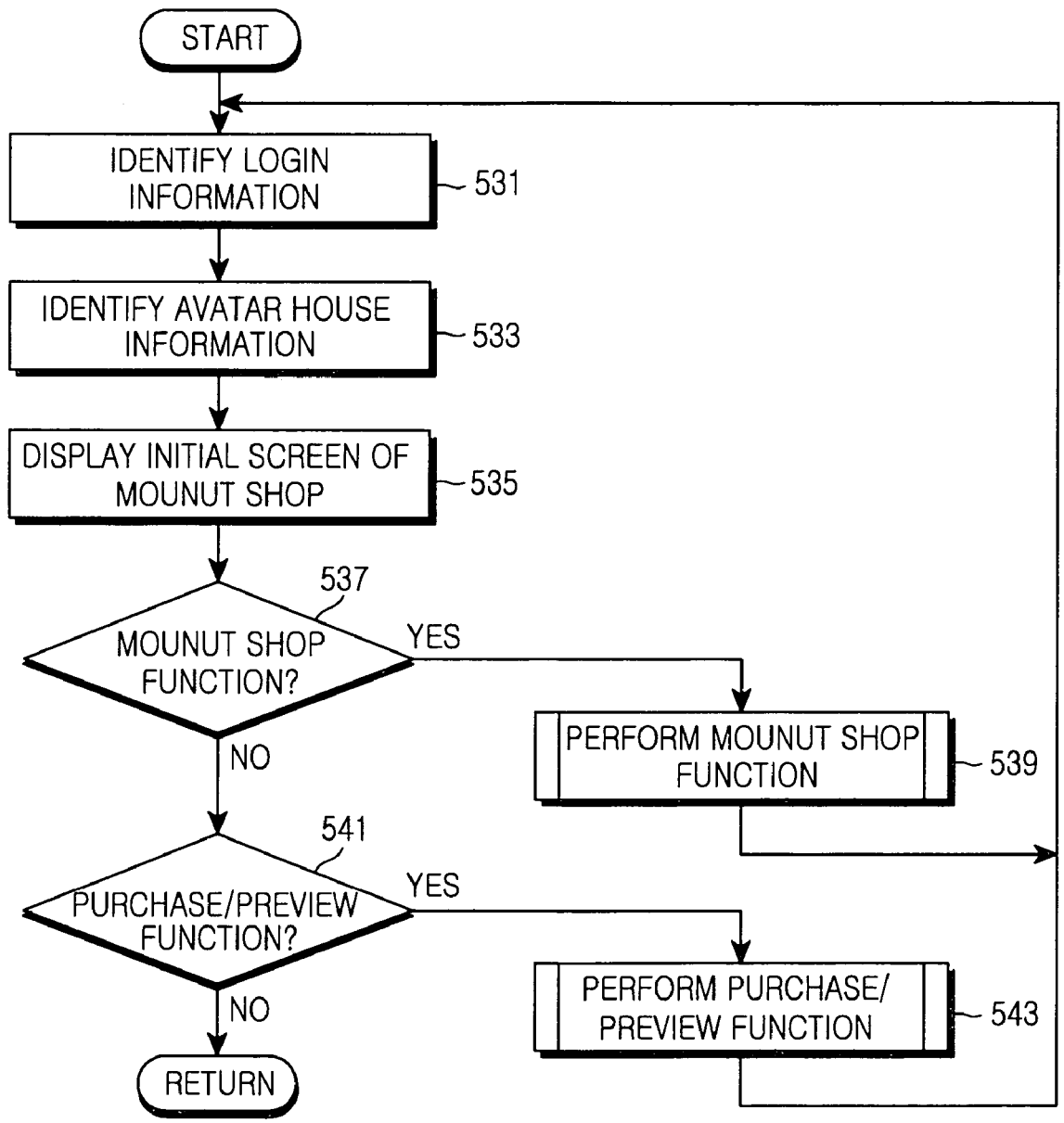
FIG. 15 is a flow chart illustrating an avatar service procedure when a Mounut (Avatar) Shop menu is selected in accordance with an embodiment of the present invention.

Second, when the Mounut Shop button 355 is clicked, the computer 60 senses the clicked button and notifies the character content server 40 of the clicked button. The character content server 40 senses the clicked button in step 321, and downloads a Mounut Shop screen to the computer 60 in step 323. Accordingly, the computer 60 displays the Mounut Shop screen downloaded from the character content server 40. In this case, the computer 60 displays the Mounut Shop screen in the structure-as illustrated in FIG. 14, and a Mounut Shop function is processed as the procedure of FIG. 15 is performed. Accordingly, the computer 60 and the character content server 40 perform a Mounut Shop processing procedure while performing the procedure of FIG. 15 in step 323.

Figure 18:
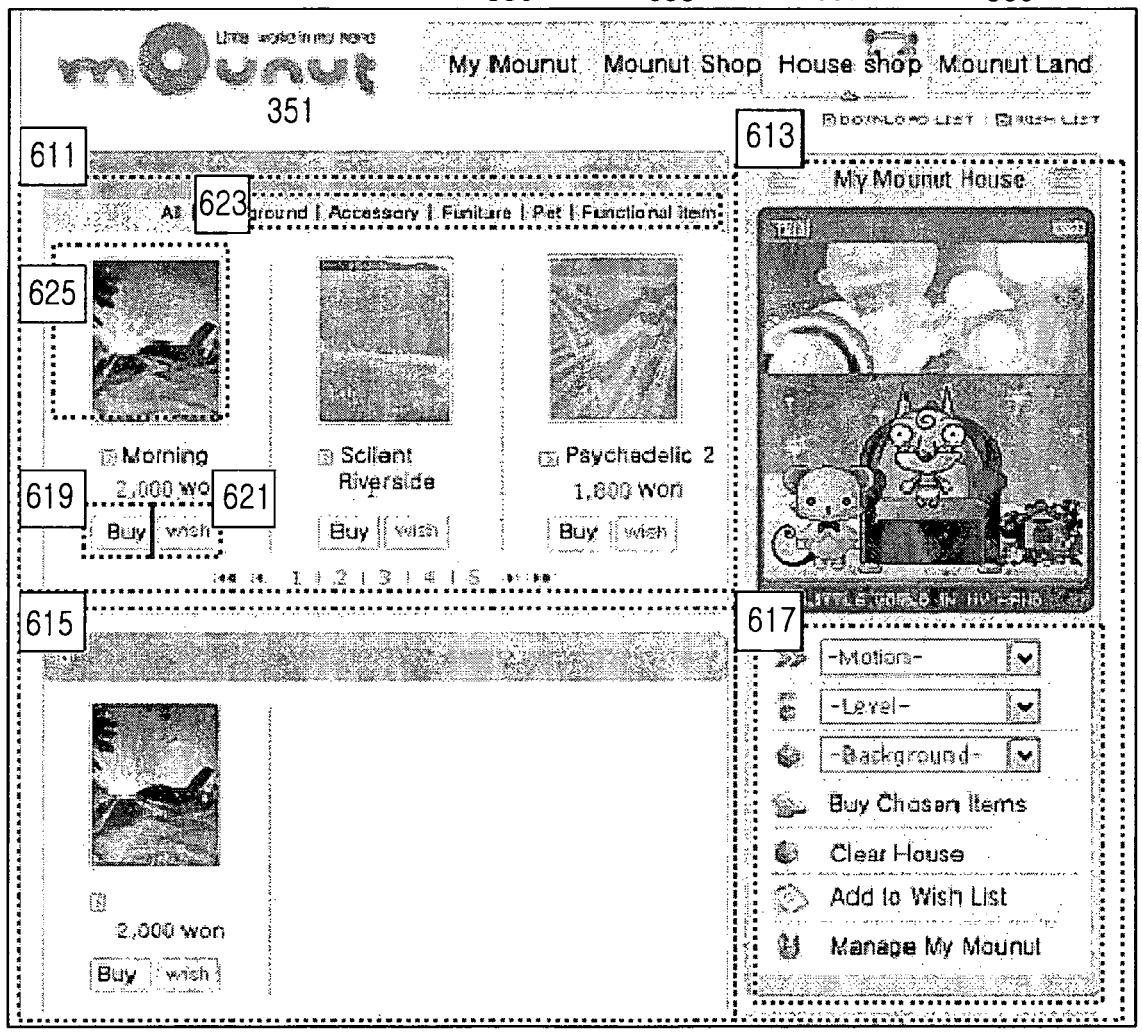
FIG. 18 illustrates a structure of an initial screen of House Shop (Item Shop) in accordance with an embodiment of the present invention.
Figure 19:
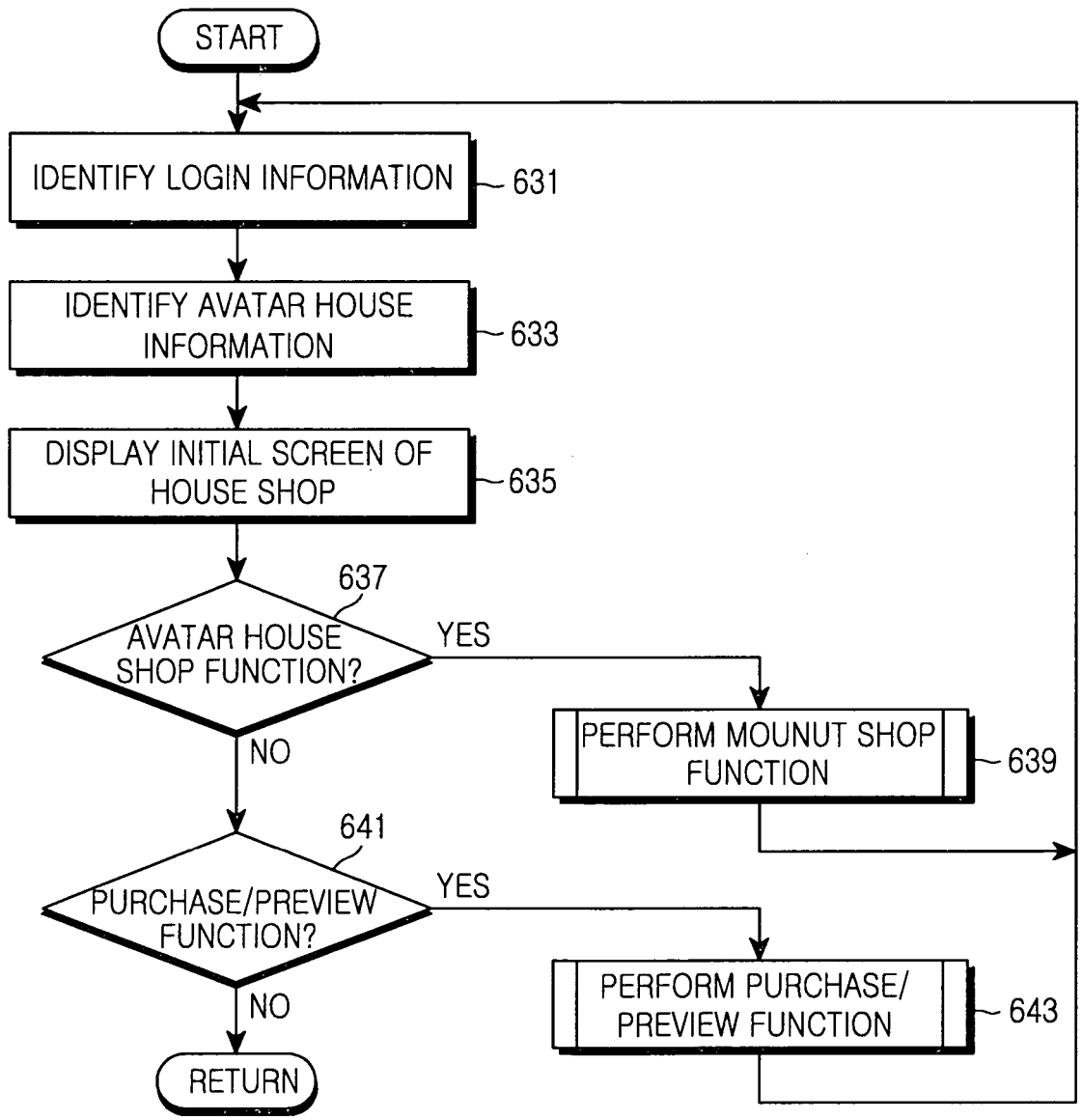
FIG. 19 is a flow chart illustrating a procedure for performing a character service with a House Shop (Item Shop) menu in accordance with an embodiment of the present invention.

Third, when the House Shop button 357 is clicked, the computer 60 senses the clicked button and notifies the character content server 40 of the clicked button. The character content server 40 senses the clicked button in step 325, and downloads a House Shop screen to the computer 60 in step 327. Accordingly, the computer 60 displays the House Shop screen downloaded from the character content server 40. In this case, the computer 60 displays the House Shop screen in the structure as illustrated in FIG. 18, and a House Shop function is processed as the procedure of FIG. 19 is performed. Accordingly, the computer 60 and the character content server 40 perform a House Shop processing procedure while performing the procedure of FIG. 19 in step 327.

Fourth, when the Mounut Land button 359 is clicked, the computer 60 senses the clicked button and notifies the character content server 40 of the clicked button. The character content server 40 senses the clicked button in step 329, and downloads a Mounut Land screen to the computer 60 in step 331. Accordingly, the computer 60 displays the Mounut Land screen downloaded from the character content server 40. In this case, the computer 60 displays the Mounut Land screen. Mounut Land serves as a web space capable of being used commonly between the users, and can be used as a space for opening web notification information and Avatar Houses created by the users. Accordingly, the computer 60 and the character content server 40 display notification information of the character content server 40 to the user in step 331, and can perform a procedure for displaying Open House data according to the user's selection.

Fifth, when the Buy button is clicked, the computer 60 senses the clicked button and notifies the character content server 40 of the clicked button. The character content server 40 senses the clicked button in step 333, and downloads a purchase screen to the computer 60 in step 335. The computer 60 displays the downloaded purchase screen. In this case, a character can be purchased in the initial screen of FIG. 5, the Mounut. Shop screen of FIG. 14, the House Shop screen of FIG. 18, and so on. When a purchase request is generated from the user, the computer 60 and the character content server 40 display the purchase screen in step 335 to sell a character image desired by the user. At this time, the sold character image may be an item and Mounut capable of being individually sold. Alternatively, an avatar and/or items arranged on the House screen may be collectively sold.

Sixth, when the Wish List button 363 is clicked, the computer 60 senses the clicked button and notifies the character content server 40 of the clicked button. The character content server 40 senses the clicked button in step 337 and checks a login state of the user in step 339. When the checked state is the logoff state, a Wish button-processing procedure is terminated and the procedure returns to step 311. However, when the login procedure has been performed normally in step 339, the character content server 40 senses the normal login state and downloads a Wish List screen of a login subscriber to the computer 60 in step 341. Accordingly, the computer 60 displays a wish list downloaded from the character content server 40. In this case, a Wish button can be generated in the initial screen of FIG. 5, the Mounut Shop screen of FIG. 14, the House Shop screen of FIG. 18, and so on.

Seventh, when the Download List button 361 is clicked, the computer 60 senses the clicked button and notifies the character content server 40 of the clicked button. The character content server 40 senses the clicked button in step 343 and checks a login state of the user in step 345. When the checked state is the logoff state, a Wish button-processing procedure is terminated and the procedure returns to step 311. However, when the login procedure has been performed normally in step 345, the character content server 40 senses the normal login state and downloads a Wish List screen of a login subscriber to the computer 60 in step 347. Accordingly, the computer 60 displays the Download List screen downloaded from the character content server 40.

When an End button is clicked while the above-described procedure is performed, the computer 60 notifies the character content server 40 of the clicked button. The character content server 40 senses the clicked button in step 349 and ends the procedure of FIG. 4.

A character service method in accordance with an embodiment of the present invention accesses the character content server 40 using the computer 60, and sends a download request for desired characters (of Mounut, items, House, and so on) to the character content server 40 using the computer 60. After the downloaded characters are arranged or processed in a form desired by the user, they are purchased. The purchased characters can be stored and kept in the character content database 50 connected to the character content server 40. If needed, desired characters can be accessed and transmitted to a wireless terminal. The user of the wireless terminal can process characters available in the wireless terminal in a desired form using the computer 60 and can store the processed characters in the wireless terminal. Accordingly, the wireless terminal can display its use state using an associated character, and can realize a House screen for displaying its specific state.

The processing procedure of FIG. 4 will be described in more detail.

First, a procedure for processing My Mounut will be described.

FIG. 6 illustrates an initial screen for My Mounut in accordance with an embodiment of the present invention. Here, the My Mounut function can keep Mounut and items purchased by the user, House stored after decoration, and so on. When the My Mounut function is selected according to need, an identification function, a change function, or a function of download to the wireless terminal can be performed.

Referring to FIG. 6, a screen of My Mounut displays Mounut and a list of items purchased and possessed by the user, and displays items of an associated House currently selected by the user. House can be created or corrected through a preview screen according to the user's selection. The created House can be stored. An area 411 in the screen of My Mounut displays items selected by the user. The items to be displayed on the area 411 can be displayed according to types of items using item selection buttons displayed on an area 423. In an embodiment of the present invention, the item types are classified into a Background item to be used as a background screen of House, Article, Furniture and Pet items to be used to decorate House, and Functional item to be used to decorate House and display a specific state of the wireless terminal. The above-described item types will be described in more detail in House Shop to be described below. An area 415 displays Mounuts selected by the user. Mounut may be an avatar with an emotional expression. The emotional expression and bring-up of the avatar are disclosed in more detail in applications of Korean Patent Application Nos. 2004-28411 (filed on Apr. 23, 2004), 2004-52407 (filed on Jul. 6, 2004), and 2005-33875 (filed on Apr. 22, 2005). Items and Mounuts displayed on the item display area 411 and the Mounut display area 415 of the My Mounut screen may be character images purchased by the user.

The user can select items and Mounuts displayed on the My Mounut screen and generate a screen to be displayed in a specific state of the wireless terminal. A size of a preview area 413 of FIG. 6 can be set to be the same as, or similar to, a size of the display unit 143 of the wireless terminal. In this case, a screen displayed on the area 413 may be the above-described House screen. The area 413 is a preview area for displaying Mounut and items selected by the user from items and Mounuts displayed on the item display area 411 and the Mounut display area 415 of the My Mounut screen. A Use button and a Delete button are present below character images of the item display area 411 and the Mounut display area 415 as displayed on areas 419 and 421, respectively. When the user presses the Use button 419, the computer 60 displays a selected item or Mounut on the preview area. When the user presses the Delete button 421, the computer 60 deletes a selected item or Mounut from the preview area 413. When the items and Mounut displayed on the preview area 413 are dragged using a mouse, their positions are shifted and displayed.

Menu buttons displayed on an area 417 are used to process screen and character images displayed on the preview area 413. Motion displayed on the area 417 is a menu for selecting motion of Mounut. Level displayed on the area 417 is a menu for selecting a growth model of Mounut. Background displayed on the area 417 is a menu for selecting a background screen for each time part. Store House is a menu for storing a screen displayed on the preview area 413 as a House screen in the character content server 40. Open House is a menu for selecting House screens stored in the character content server 40. Original is a menu for returning to the last storage state. Send To Phone is a menu for sending the House screen displayed on the preview area 413 or the items and/or Mounut selected by the user to a set wireless terminal.

FIG. 7 is a flow chart illustrating a procedure for performing functions desired by the user after the My Mounut screen is selected as illustrated in FIG. 6.

Referring to FIG. 7, the My Mounut screen of FIG. 6 is available only when the user performs a login operation. That is, the character content server 40 assigns character areas for registered subscribers to the character content database 50. The database 50 stores characters (of avatars and items) purchased by the users and information about House screens created by the users on a user-by-user basis. Accordingly, the user must perform the login operation to select his/her own Mounut screen (or My Mounut screen). When the user performs the login operation, the computer 60 notifies the character content server 40 of the login state. The character content server 40 identifies login information transferred from the computer 60 in step 431. When the login information is valid, the character content server 40 identifies items and Mounuts selected by the user and information of House created by the user while performing steps 433 to 437, and generates an initial screen of My Mounut to transfer the generated initial screen to the computer 60 in step 439. Then, the computer 60 displays the initial screen of My Mounut as illustrated in FIG. 6. In a state in which the initial screen of My Mounut is displayed, the user can select and delete an item decoration function, a Mounut decoration function, a House function, and so on. That is, first, when the item decoration function is selected, the computer 60 and the character content server 40 sense the selected function in step 441 and process an item decoration operation of the function selected by the user in step 443. Second, when the Mounut decoration function is selected, the computer 60 and the character content server 40 sense the selected function in step 445 and process a Mounut decoration operation of the function selected by the user in step 447. Third, when the House function is selected, the computer 60 and the character content server 40 sense the selected function in step 449 and perform the House function selected by the user in step 451.

The item decoration function performed in steps 441 and 443 of FIG. 7 will be described. When the user selects the item selection and deletion function, the character content server 40 senses the selected function in step 441 and performs a function for processing an item according to the selected item decoration function in step 443. The item selection and deletion function is performed though the Item Menu button 423, the Use button 419, and the Delete button 421 displayed on the area 411. A result after the item function is performed is displayed on the preview area 413.

Figure 8A:
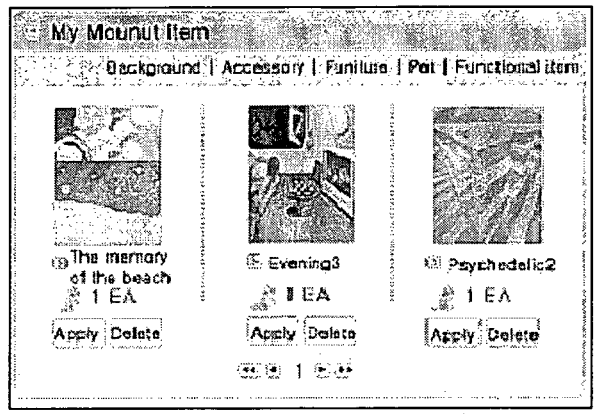
FIGS. 8A to 8E illustrate examples of displaying item images according to various item types in My Mounut (Avatar)
Figure 8B:
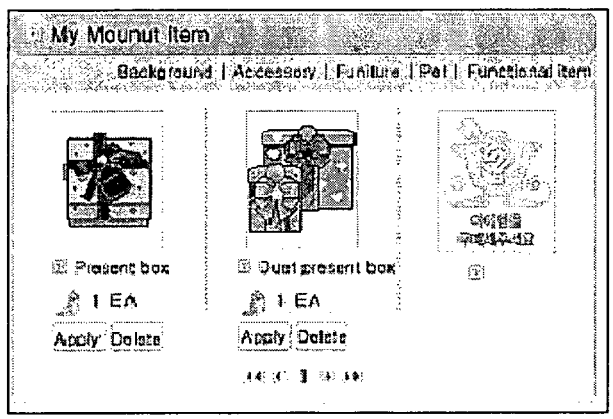
Figure 8C:
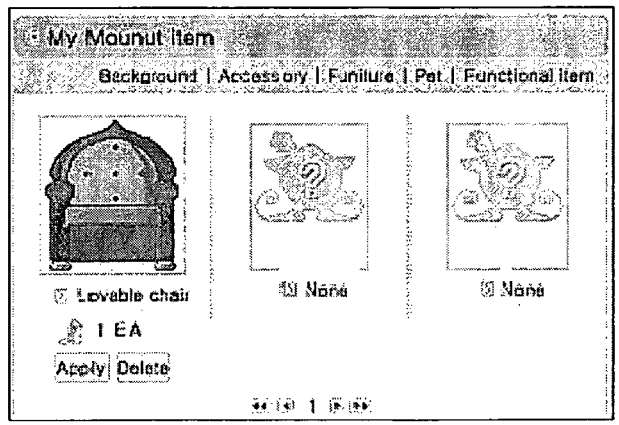
Figure 8D:
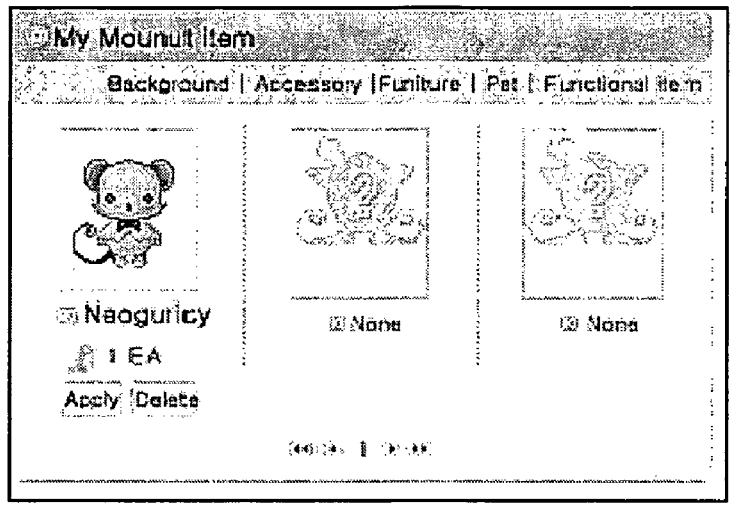
Figure 8E:
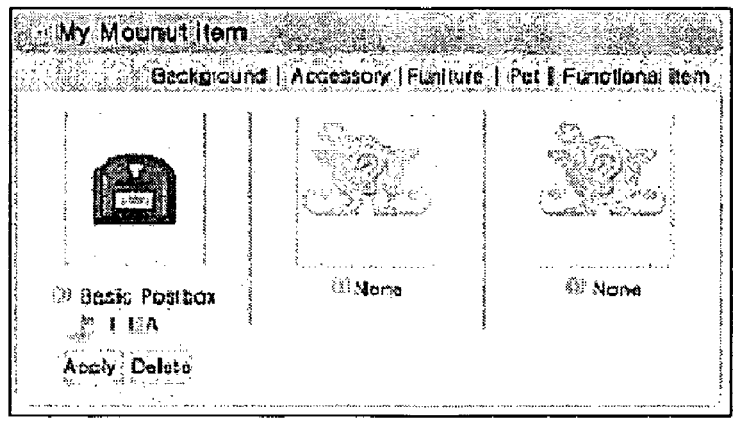

When the Item button 423 is pressed, the character content server 40 downloads items of the user associated with a selected item menu. The types of items may be Background, Article, Furniture, Pet, and Functional items as illustrated in FIG. 6. When these item buttons are pressed, the character content server 40 downloads associated item images to the character content database 50 as illustrated in FIGS. 8A to 8E. The computer 60 displays the downloaded item images as illustrated in FIGS. 8A to 8E on the item display area 411. FIG. 8A illustrates background item images. FIG. 8B illustrates article item images. FIG. 8C illustrates furniture item images. FIG. 8D illustrates pet item images. In an embodiment of the present invention, the four types of item images have been described, but more types of items can be configured. FIG. 8E illustrates a mailbox item image as an example of the functional item. In an embodiment of the present invention, the mailbox item image is an item for displaying an unread text message, and can display the number of unread text messages along with the mailbox. The functional item of the wireless terminal can display various functions such as a missed call, morning call and schedule alarm in addition to the unread text message. The missed call can be expressed by a phone image. The morning call can be expressed by a clock image. The schedule alarm can be expressed by a diary image. The functional items are associated with the operation of the wireless terminal, and can display a state associated with the operation of the wireless terminal.

Figure 9A:
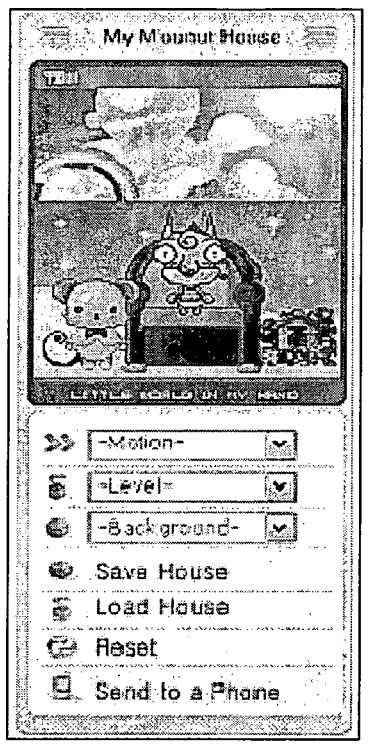
FIGS. 9A to 9G illustrate examples of displaying an item selected from My Mounut (Avatar) on a preview area.
Figure 9B:
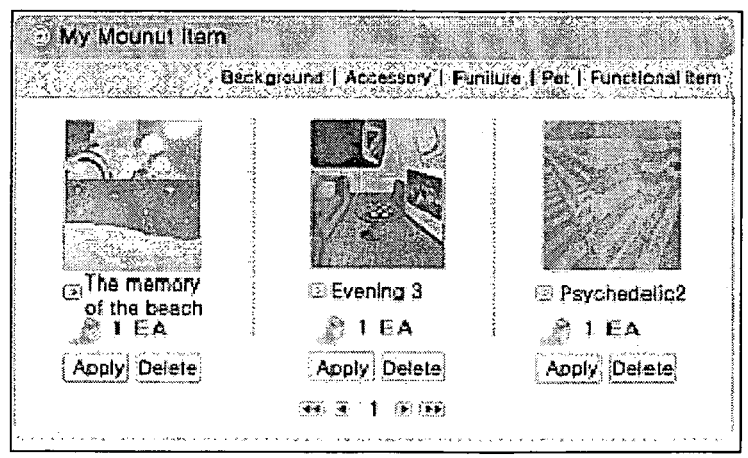
Figure 9C:
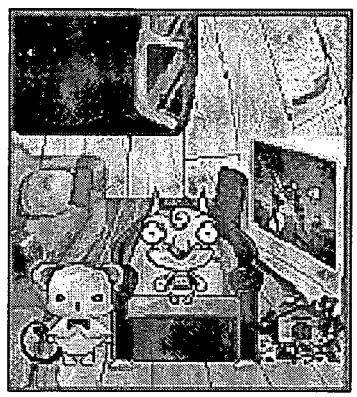
Figure 9D:
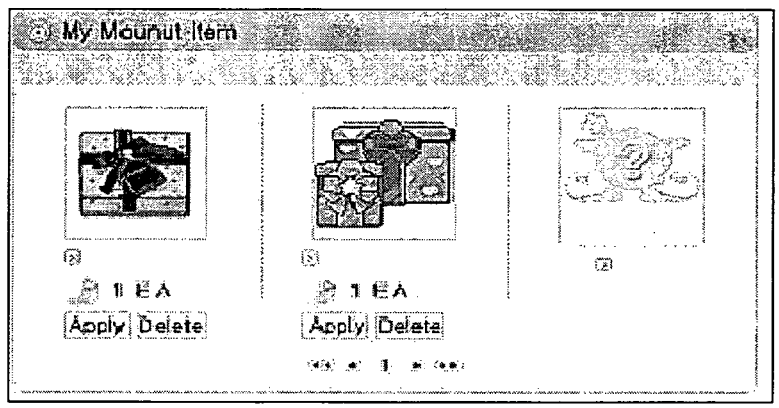
Figure 9E:
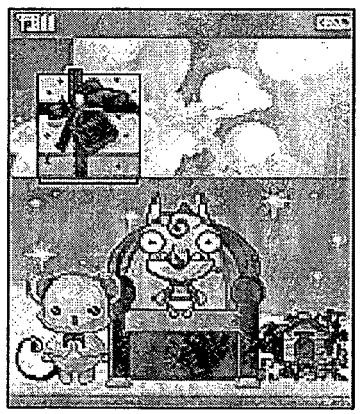
Figure 9F:
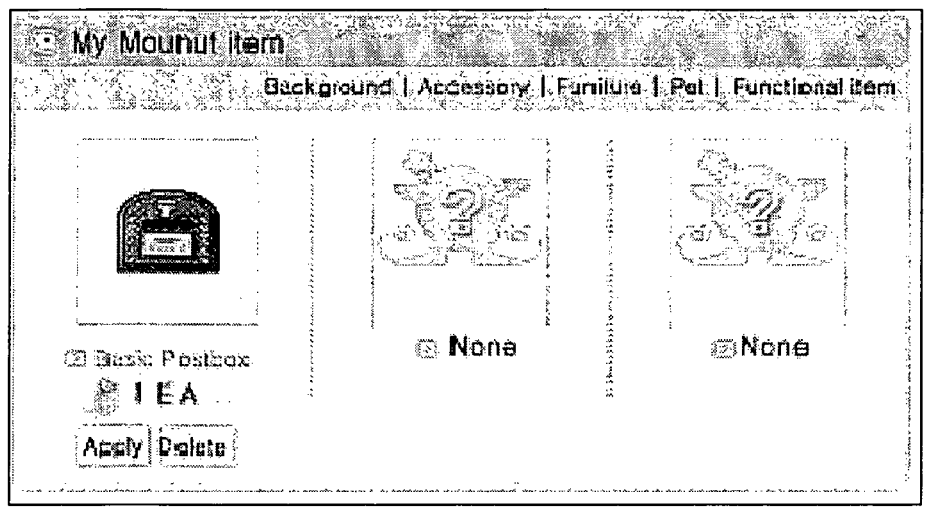
Figure 9G:
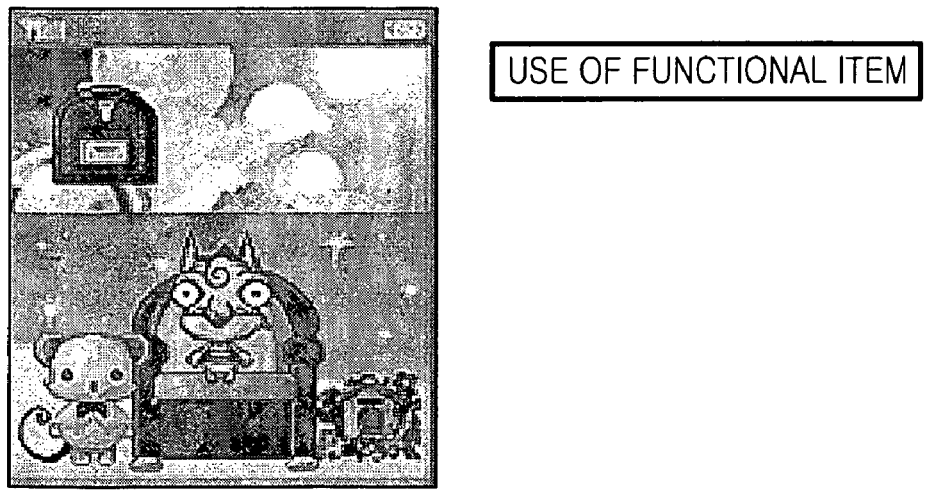

The Use button 419 and the Delete button 421 arranged below an item image of the item display area 411 perform a function for displaying a selected item on the preview area 413 and a function for deleting a selected item from the preview area 413, respectively. That is, when the Use button for a background item image of FIG. 9B is pressed in a state in which the preview screen of FIG. 9A is displayed, the background item image as illustrated in FIG. 9A is changed to the image of FIG. 9C. When the Use button for an item image as illustrated in FIG. 9D is pressed, the selected item image is additionally displayed on the preview screen as illustrated in FIG. 9E. In this case, the selected item image is displayed in a preset position of the preview screen. When the user changes a position using a dragging operation, the item image is displayed in a changed position of the preview screen. Even when the Use button for a functional item image as illustrated in FIG. 9F is pressed, an associated item image is additionally displayed on the preview screen as illustrated in FIG. 9G.

Figure 10A:
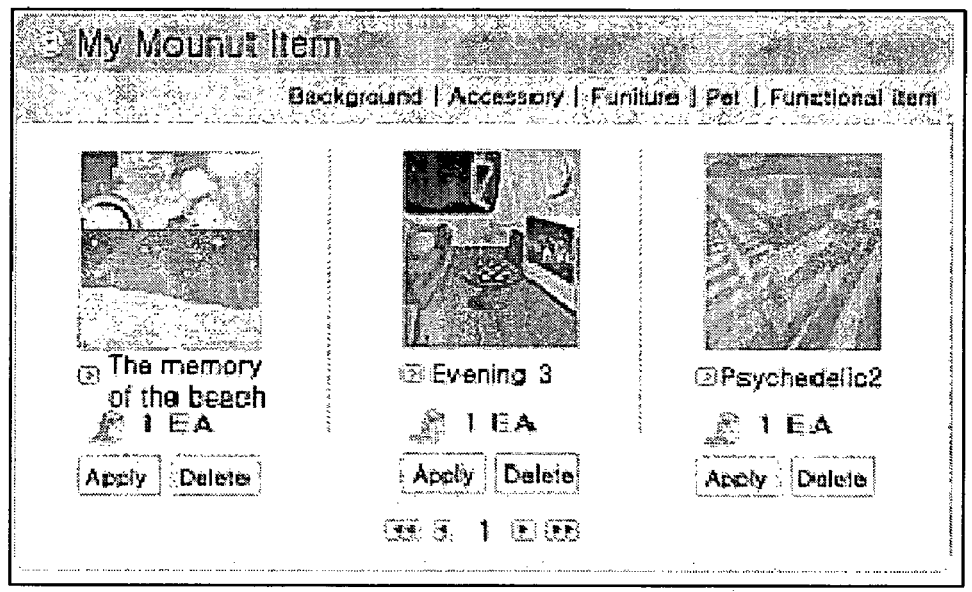
FIGS. 10A and 10B illustrate examples of deleting an item selected from My Mounut (Avatar) on a preview area.
Figure 10B:
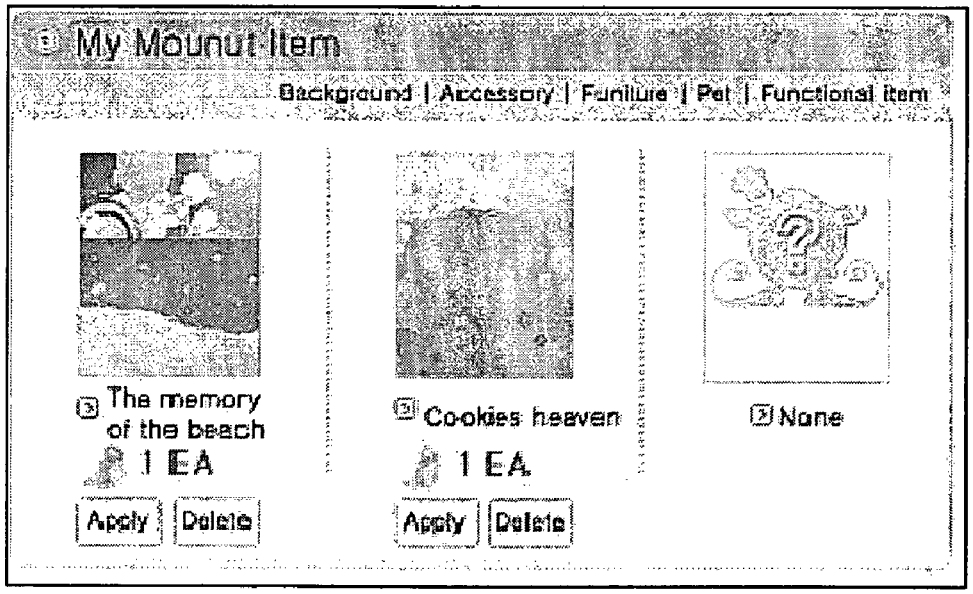

FIGS. 10A and 10B illustrate a process for deleting an item image. The item deletion procedure will be described. When the Delete button 421 positioned below an item image displayed on the item display area 411 is pressed, an associated item is deleted. FIGS. 10A and 10B illustrate a procedure for deleting a background item image. That is, when the Delete button for an item image of FIG. 10A is pressed, the computer 60 senses the pressed button and notifies the character content server 40 of the pressed button. Then, the character content server 40 determines if a user-selected item to be deleted is a purchased item. If the user-selected item is a purchased item, the character content server 40 deletes an associated item from a purchase list and the computer 60 deletes an associated item image from the item display area 411 as illustrated in FIG. 10B. When an image to be deleted is displayed on the preview area 413, an associated item image displayed on the preview area 413 is also deleted. When a selected item to be deleted is a basically provided item image, an associated item image is deleted from the item display area 411 without a change of the purchase list. When an item image currently being displayed on the preview area 413 is to be deleted, a pointer of the mouse is positioned on an associated item image and then a deletion function can be performed with a mouse click. When the displayed item image is deleted, an operation for deleting an item image positioned on the item display area 411 is not performed.

Figure 11A:
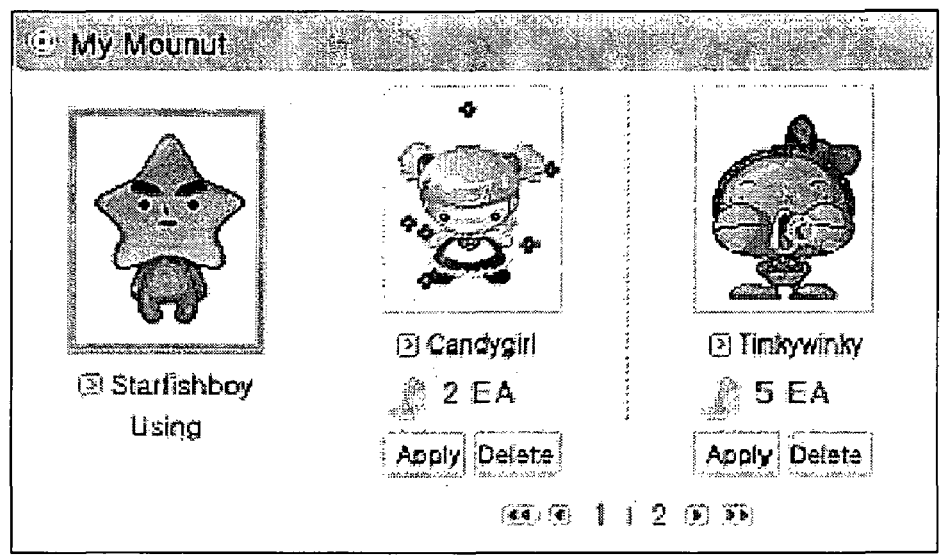
FIGS. 11A to 11D illustrate examples of displaying an avatar selected from My Mounut (Avatar) on a preview area.
Figure 11B:
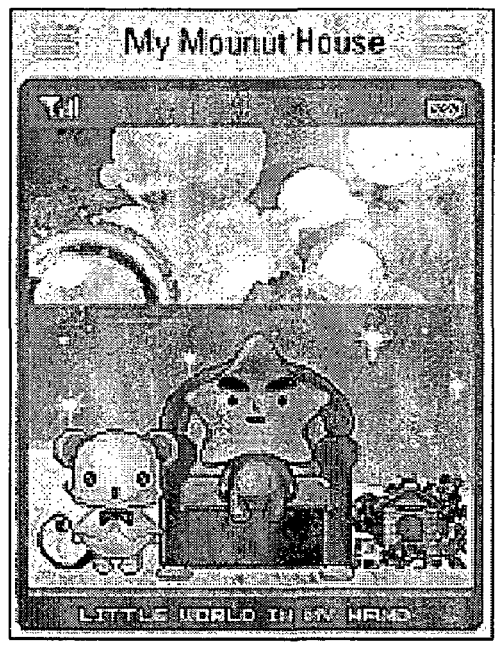
Figure 11C:
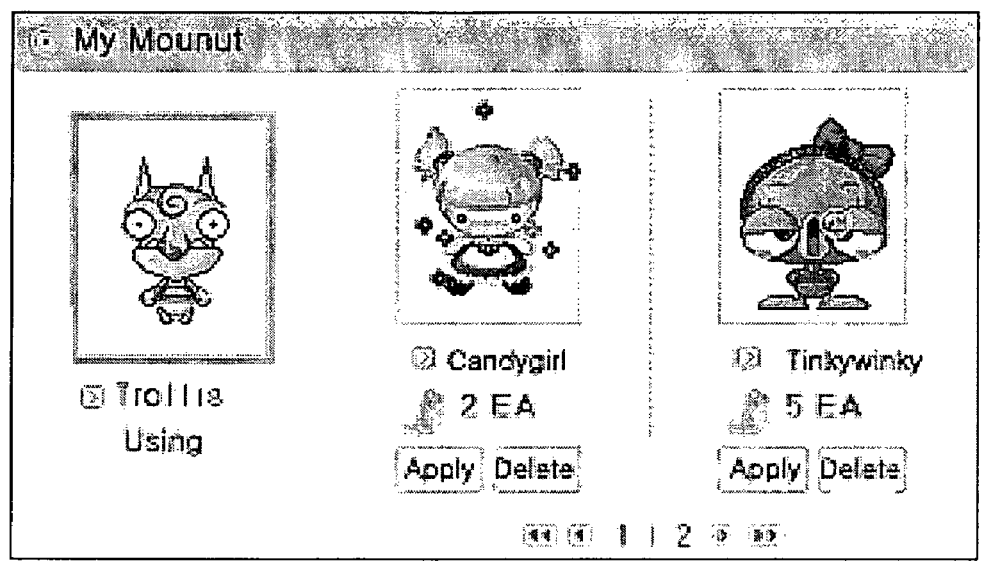
Figure 11D:
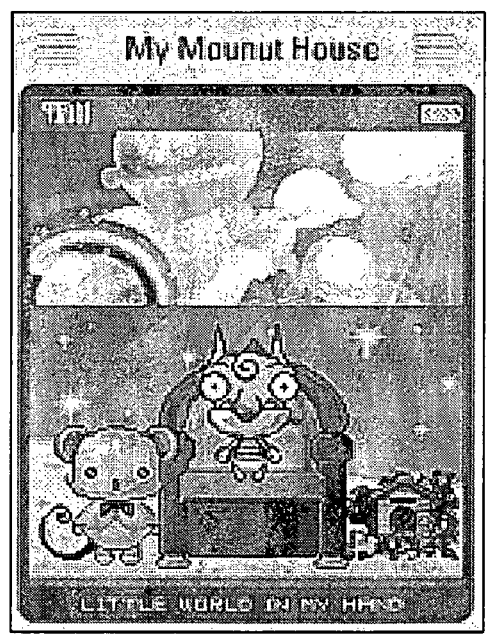

Second, the Mounut decoration function performed in steps 445 and 447 of FIG. 7 will be described. Mounuts displayed-on the Mounut display area 415 can be displayed as avatars on the preview area 413 according to the user's selection. In this case, Mounut displayed on the preview area 413 is indicated by "In Use" as illustrated in FIGS. 11A and 11C. That is, when Mounut images displayed on the Mounut display area 415 are selected, the user presses the Use button 419 positioned below a desired Mounut image. Then, the selected Mounut image is displayed on the preview area 413 as illustrated in FIGS. 11B and 11D, and is indicated by "In Use" on, the Mounut display area 415. When the Delete button 421 is pressed, the computer 60 transfers Mounut image information in which the deletion function is selected to the character content server 40. Then, the character content server 40 deletes an associated Mounut image in the same manner as in the procedure for deleting the item image, and the computer 60 deletes the associated Mounut from the Mounut display area. As illustrated in FIGS. 11B and 11D, only one Mounut is displayed on one House screen. The Mounut image cannot be directly deleted from the preview area 413. When the Mounut image of the House screen is changed, the Use button for Mounut to be used for replacement or the Delete button for Mounut to be deleted needs to be pressed in the Mounut display area 415.

Figure 12A:
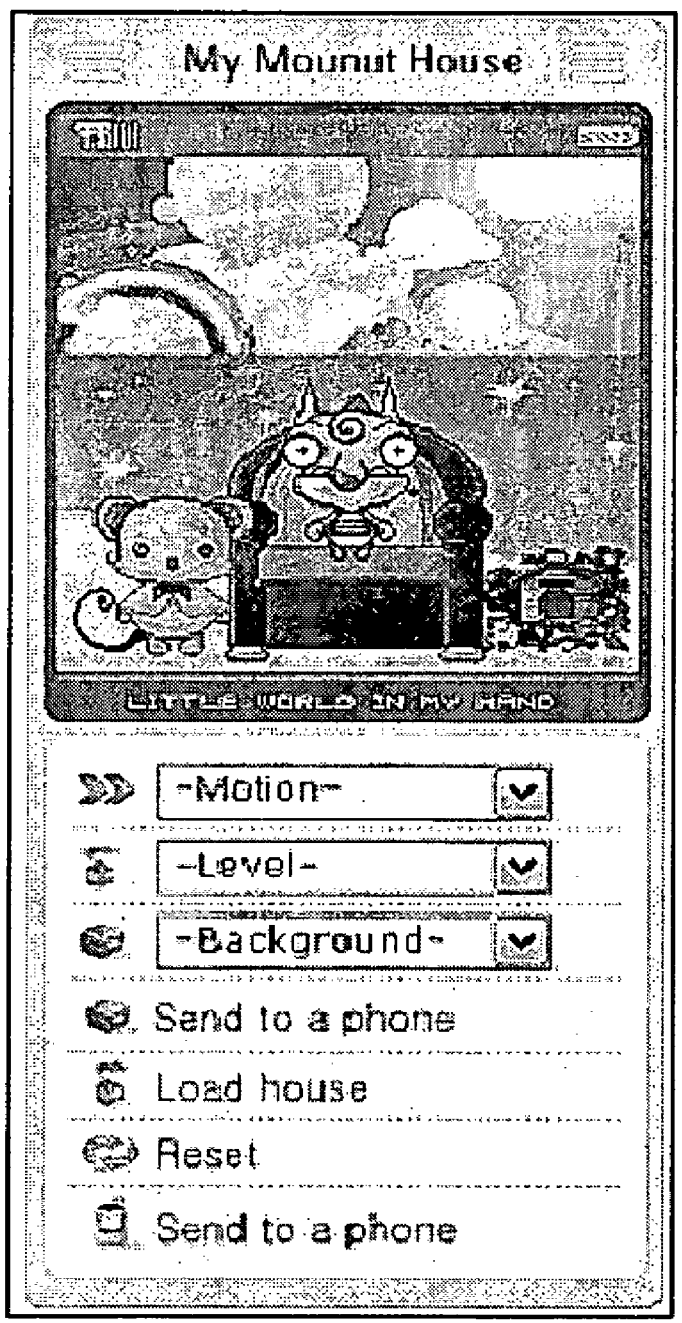
FIGS. 12A and 12B illustrate examples of displaying character features on a preview area in My Mounut (Avatar)
Figure 12B:
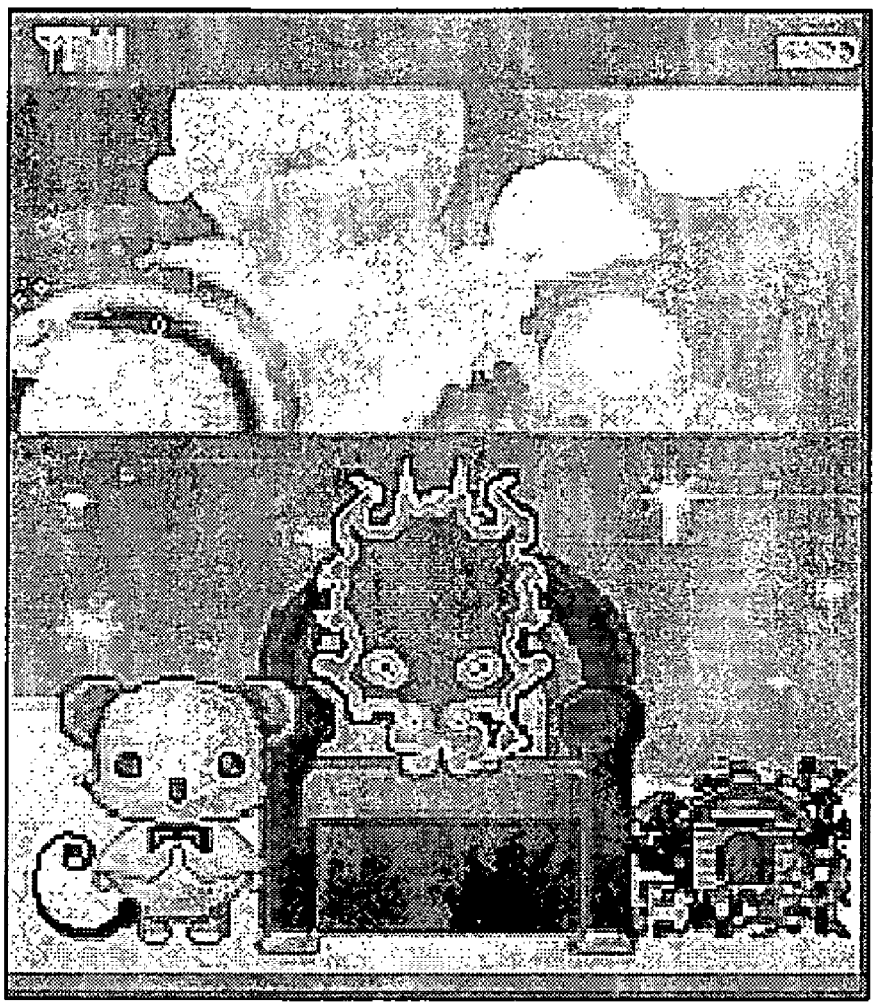

Third, the operation of steps 449 and 451 of FIG. 7 will be described. As illustrated in FIG. 6, the My Mounut screen in accordance with an embodiment of the present invention displays thumbnail images of items and Mounuts on the left side of the screen. On the right side, the My Mounut screen includes the preview area 413 for displaying a House screen using Mounut and item images and the menu area 417 for selecting, identifying, and sending the Mounut, item, and House images. FIGS. 12A and 12B illustrate structures and characteristics of the preview area 413 and the menu area 417.

Referring to FIG. 12A, Motion of the menu area 417 is used to display an emotional expression of Mounut of the preview area 413 (or the House screen). In this case, when the Motion menu of the menu area 417 is clicked, types of emotional expressions of Mounut are displayed on the menu area 417. It is assumed that the emotional expressions in accordance with an embodiment of the present invention include seven expressions of Very Happy, Happy, Normal, Sad, Sulky, Tired, and Angry. Accordingly, when the user selects Motion, the menu area displays the seven types of emotional expressions. When a specific emotional expression is selected from the above-described emotional expressions, Mounut of the preview area 413 has an emotional expression according to an animation operation of selected emotional mode.

Second, Level of the menu area 417 is used to display a growth model of Mounut. When the user presses the Level menu, the computer 60 displays the growth model of Mounut on the menu area. In an embodiment of the present invention, it is assumed that Mounut levels (or growth stages) include four growth models of infancy, adolescence, adulthood, and maturity. Accordingly, when the user clicks Level, the menu area displays the four types of growth models. When a specific growth model is selected from the growth models, Mounut of the preview area 413 is changed to the selected growth model and the changed Mounut is displayed. In this case, Mounut grows according to use of the wireless terminal, and a result of the growth is expressed as the growth of Mounut. Accordingly, the user can identify a growth model of Mounut displayed on the preview area 413. When a growth model of Mounut is opened, other growth models except Mounut in infancy are indicated by a silhouette as illustrated in FIG. 12B. This can increase the expectation of a growth model as the appearance of the grown-up Mounut is hidden.

Third, Background of the menu area 417 displays a varied image in a background item to be displayed on the preview area 413 according to each time part. That is, the background item is configured by a plurality of background images according to time parts. As the time is elapsed: a background image mapped to an associated time part is displayed. Images of the background item are classified according to the time parts of dawn, morning, afternoon, evening, night, and so on. When the user clicks Background, the menu area displays background image types of the five time parts. When a background image for a specific time part is selected from the displayed background images, the background item of the preview area 413 is changed to a background image of the selected time part to be displayed.

If Motion, Level, and Background have been selected, the user can identify the next image while manually performing a click operation when he or she desires to view another image associated with Motion, Level, and Background. When Motion, Level, and Background are clicked and a predetermined time (e.g., approximately 5 seconds) is elapsed, the next image can be automatically displayed.

Figure 13A:
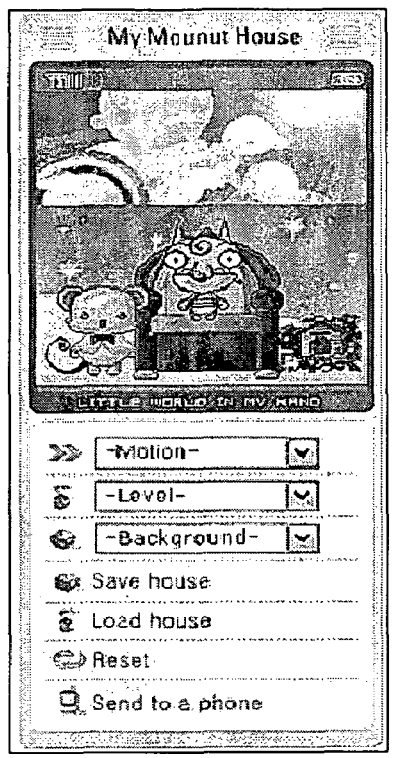
FIGS. 13A to 13D illustrate structures of a preview area and a function menu area in My Mounut (Avatar)
Figure 13B:
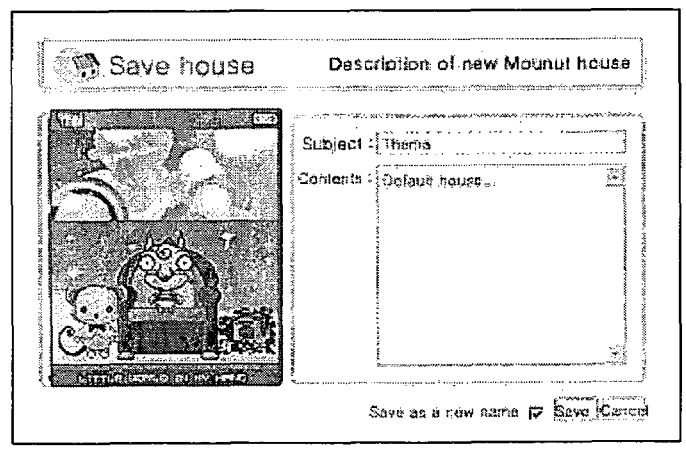
Figure 13C:
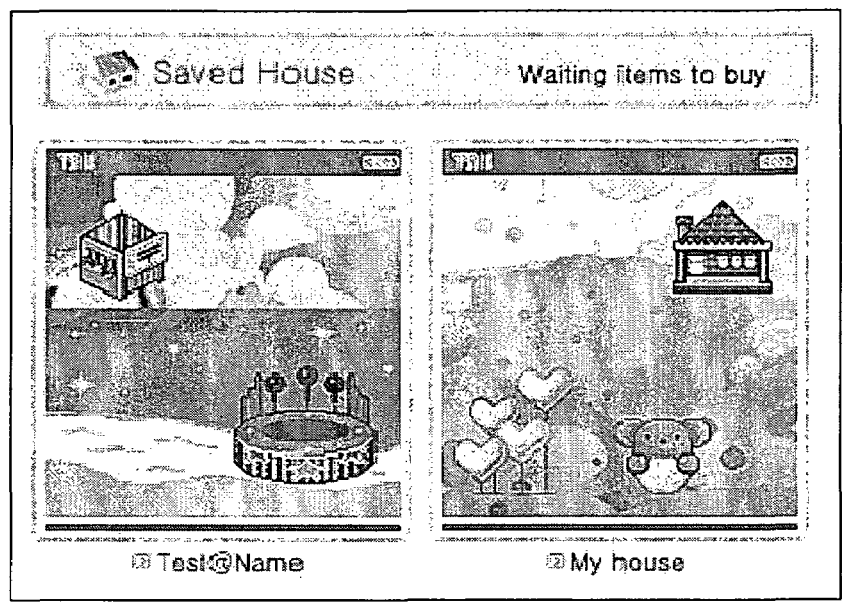
Figure 13D:
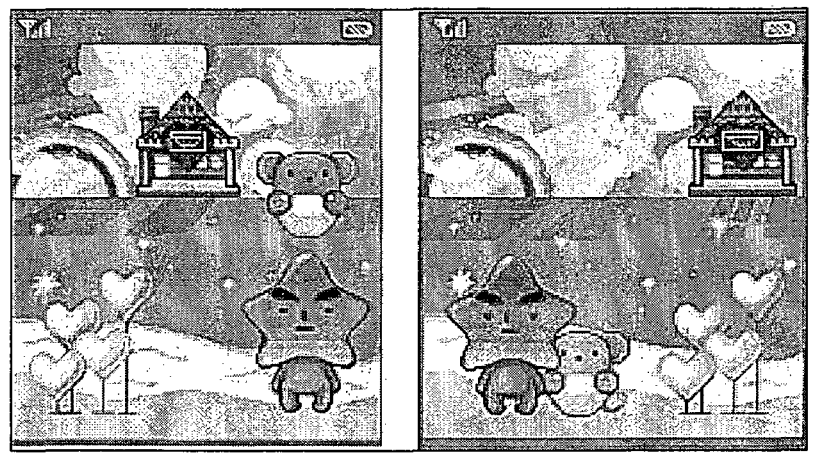

FIGS. 13A and 13D illustrate structures and characteristics of the preview area 413 and the menu area 417 in the screen of My Mounut as illustrated in FIG. 6. Store House, Open House, Original, Send To Phone, and so on of the menu area 417 will be described in more detail. First, when Store House is selected, the character content server 40 analyzes a House screen of the preview area 413 displayed on the display unit of the computer 60. In this case, the House screen is configured by items of Mounut, background, and other types as illustrated in FIG. 13A. Accordingly, when Store House is selected, the screen of the computer 60 displays a guidance message for requesting the input of a House title and content as illustrated in FIG. 13B, and stores the House title and content according to the input in a new name. Moreover, when Store House is selected, House information of the preview area 413 is stored. If needed, the House information is accessed and the House title and content can be additionally input and changed. After House is stored, the My Mounut screen as illustrated in FIG. 6 is displayed. The new House information, i.e., information about an item and Mounut of the preview area (including name and position information, and so on), is transferred from the computer 60 to the character content server 40. The character content server 40 stores the House screen information in the character content database 50.

Second, when Open House is pressed, the character content server 40 downloads a stored House list to the computer 60. The computer 60 displays the downloaded House list. When the user clicks a specific House in the House list, the computer 60 notifies the character content server 40 of the clicked specific House. Then, the character content server 40 downloads information of the selected House and its image from the character content database 50 to the computer 60. Then, the computer 60 displays the downloaded House on the preview area 413. In this case, when a deleted item is present in House, it is changed to a basic item that cannot be deleted when House is displayed on the preview area 413, and is automatically removed from the preview. FIG. 13C illustrates an example of displaying the stored House.

Third, when Original is pressed, a previous operation is ignored and House returns to the last storage state. That is, when Original is pressed in a state in which a House screen is displayed on the left of FIG. 13D, the House screen returns to the last storage state as illustrated on the right of FIG. 13D.

Fourth, when Send To Phone is pressed, the user can send an item, Mounut, House, and so on displayed on the screen of My Mounut of the computer 60 to a desired wireless terminal. That is, the user can selectively send an item, and/or Mounut, and/or House from the computer 60 to the wireless terminal. In this case, when House or two character images are transmitted, the computer 60 generates and transmits the character images in a message of a transmission form.

A procedure for processing a screen of Mounut Shop in steps 321 and 323 of FIG. 4 will be described. First, when the Mounut Shop menu is selected as illustrated in FIG. 4, the computer 60 senses the selected menu and transfers the selected menu to the character content server 40 in step 321. The character content server 40 accesses an initial screen of Mounut Shop and downloads the initial screen to the computer 60 in step 323. Then, the computer 60 displays the screen of Mounut Shop downloaded from the character content server 40 in step 323. Then, Mounut is purchased or registered in a wish list according to the user's request.

FIG. 14 illustrates an initial screen of Mounut Shop, and FIG. 15 is a flow chart illustrating a procedure for performing a Mounut Shop function in step 323 of FIG. 4.

Referring to FIG. 14, areas 511 and 515 display Mounut images capable of being purchased. The area 511 is the Mounut display area (hereinafter, referred to as the first Mounut display area) for displaying Mounuts of types selected by the user from all Mounuts capable of being purchased. The area 515 is the area (hereinafter, referred to as the second Mounut display area) for displaying bestseller Mounuts (most preferred by users). The second Mounut display area 515 can display latest Mounuts as well as the bestseller Mounuts or display specific Mounuts according to anniversary days (Christmas, Thanksgiving Day, Independence Day, and- so on) or specific states (Worldcup Soccer period, Olympic period, and so on). The areas 511 and 515 include areas 525 for displaying thumbnail images for a plurality of Mounuts, respectively. A lower part of the area 525 includes a Buy button 519 for purchasing an associated image and a Wish button 521 for adding an associated image to a wish list. An area 513 includes a button area for selecting Mounut types. In an embodiment of the present invention, the Mounut types may be Human, Fairy, Pet, and so on. Buttons for the bestseller Mounuts, latest Mounuts, anniversary days, or specific states associated with the Mounut types may be further included in the area 513. In this case, the area 511 can display more various types of Mounuts. The area 515 can also include buttons for selecting Mounut types as in an area 523 of the area 511. In this case, the user can display desired types of Mounuts in the areas 511 and 515.

The preview area 513 displays a preview screen for Avatar House. The preview area 513 configures House by only default items when a login operation is not performed, and can be commonly used in House Shop. An area 517 displays menus for implementing a function of Mounut Shop. In the area 517, Motion is a button for displaying types of emotional expressions of Mounut. Level is a button for displaying growth models of Mounut. Quick Buy is a button for purchasing Mounut displayed on the preview area 513. Original is a button for returning to the last storage state. Add To Wish List is a button for registering the displayed Mounut in a wish list. My Mounut Management is a button for implementing a shortcut function for My Mounut.

FIG. 15 is a flow chart illustrating a procedure for implementing a function of Mounut Shop in the screen of Mounut Shop of FIG. 14.

Referring to FIG. 15, the user can perform the Mounut function in a state in which the screen of Mounut Shop is displayed. When the user selects the Mounut Shop function, the computer 60 notifies the character content server 40 of the selected function. In step 531, the character content server 40 identifies the login state of the user. In step 533, the character content server 40 generates an initial screen for Mounut as illustrated in FIG. 14 according to the login state and then downloads the generated initial screen to the computer 60. In step 535, the computer 60 displays the initial screen for Mounut Shop downloaded from the character content server 40. A structure of House displayed on the preview area 513 for Mounut Shop differs according to the login state of the user. That is, when the login operation is performed, House displayed on the preview area 513 is displayed as a House screen set by the user. However, when the login operation is not performed, a House screen configured by set default items is displayed on the preview area 513.

Then, the computer 60 and the character content server 40 perform the Mounut Shop function while performing steps 537 and 539, and perform a Mounut purchase function and a preview function while performing steps 541 and 543. That is, the areas 511 and 515 display Mounuts. When the area 525 for displaying an avatar image, the area 523 for displaying buttons based on the Mounut types, and the Buy button 519 and the Wish button 521 arranged below a Mounut image are selected in step 537, the computer 60 and the character content server 40 sense a selected area or button in step 537 and then process the selected Mounut Shop function in step 539. This operation will now be described in more detail. First, when the Mounut Type button of the area 523 is pressed, the computer 60 notifies the character content server 40 of the pressed button. The character content server 40 accesses selected Mounut types, and downloads Mounuts associated with the selected Mounut types to the computer 60. Then, the computer 60 displays the downloaded Mounuts associated with the selected Mounut types on the area 511. Accordingly, when the Mounut Type button of the area 523 is pressed, associated Mounut types are displayed on the area 511. The Mounut types may be All, Human, Fairy, Pet, and so on.

Figure 16A:
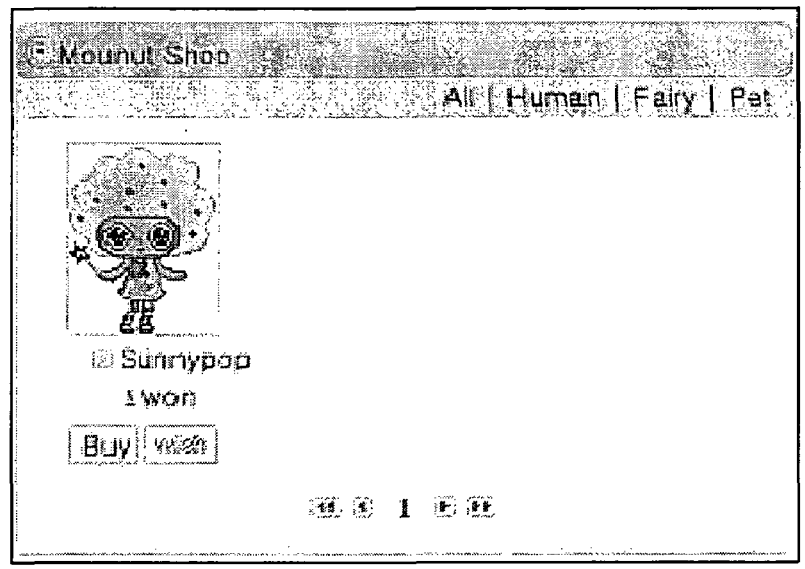
FIGS. 16A to 16G illustrate examples of displaying an avatar purchased from Mounut (Avatar) Shop on a preview area.
Figure 16B:
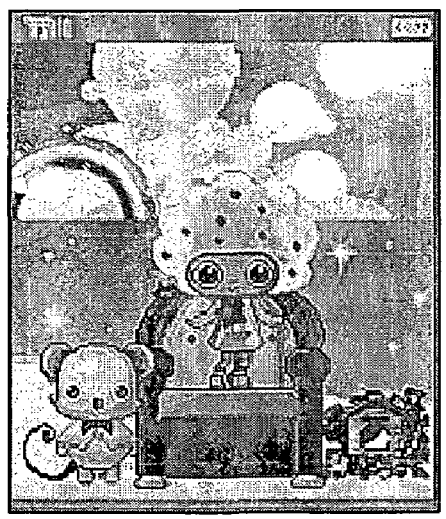
Figure 16C:
Figure 16D:
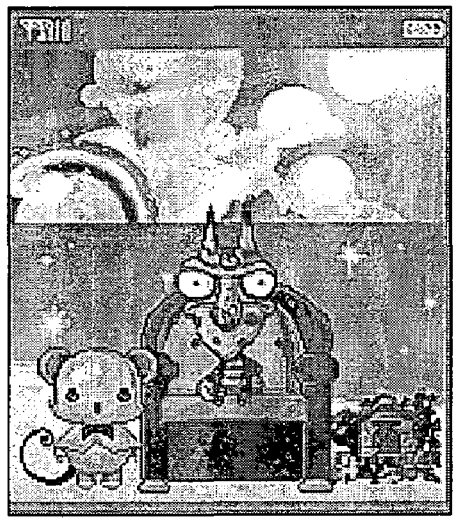
Figure 16E:
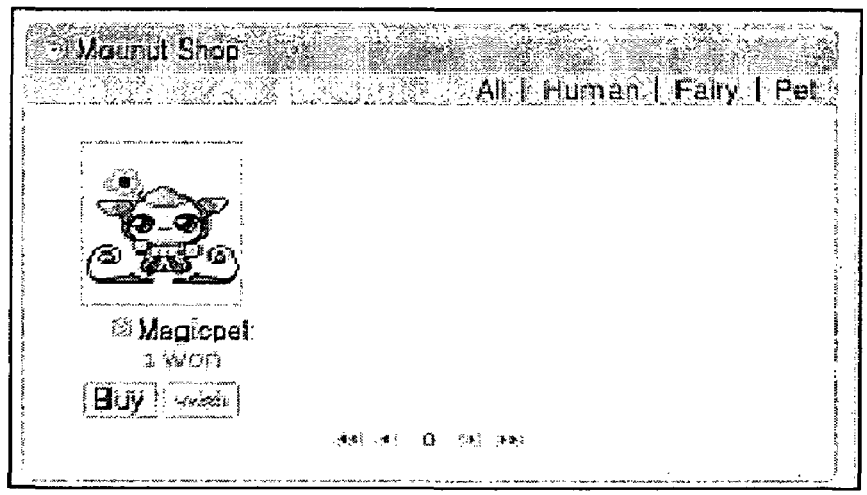
Figure 16F:
Figure 16G:
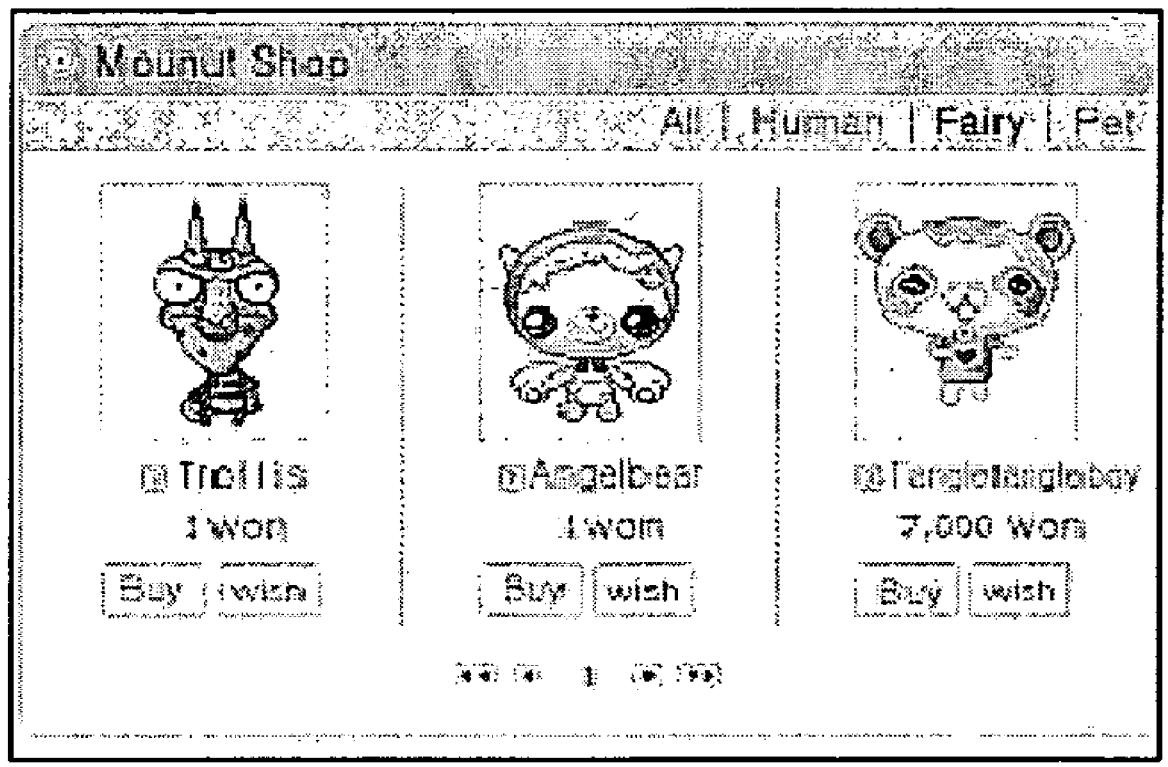

When the user clicks the area 525 for displaying a Mounut image in a state in which Mounuts are displayed on the area 511, a selected Mounut is displayed in a Mounut display position of the preview area 513. That is, when a Mounut image as illustrated in FIG. 16A is clicked, the selected Mounut is displayed on the preview area 513 as illustrated in FIG. 16B. Furthermore, when a Mounut image displayed on the Mounut Shop area as illustrated in FIGS. 16C and 16E is selected, the selected Mounut is displayed on the preview area 513 as illustrated in FIGS. 16D and 16F. An associated Mounut can be purchased or registered in the wish list using the Buy button 519 or the Wish button 521 arranged below the area 525 for displaying the Mounut image as illustrated in FIG. 16G.

Figure 17A:
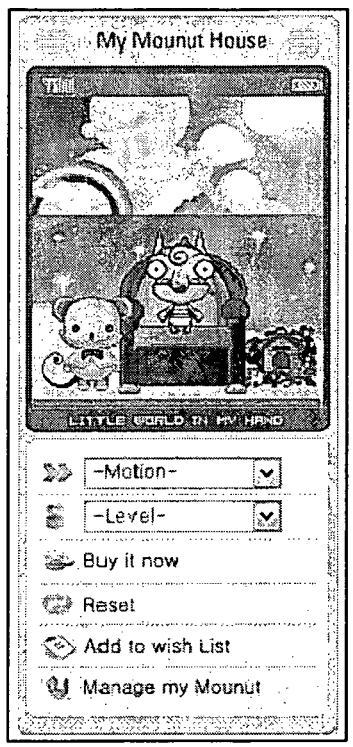
FIGS. 17A and 17B illustrate examples of displaying character features on a preview area in Mounut (Avatar) Shop.
Figure 17B:
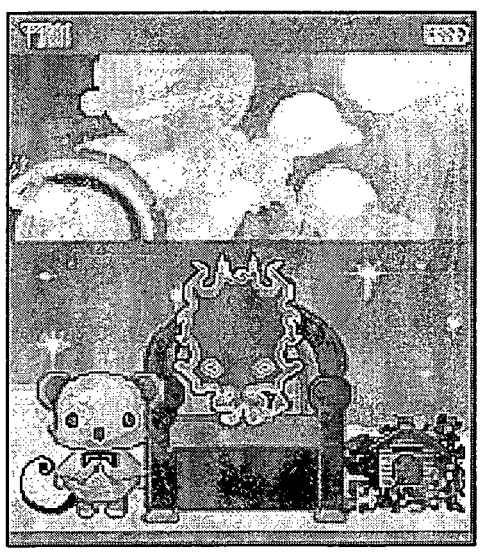

When the purchase/preview function is requested, the computer 60 senses the request and sends the request to the character content server 40 in step 541. The character content server 40 identifies the request in steps 541 and 543, accesses a requested character image in the character content database 50, and downloads the requested character image to the computer 60. Then, the computer 60 processes the Mounut Shop function while displaying the downloaded character image on the preview area 513. Preview function menus arranged below the preview area 513 include the buttons for identifying Mounut Motion, Level, and so on, the Quick Buy button, the Original button, the Add To Wish List button, and the My Mounut Management button. When the Motion button is pressed, menus for displaying emotional expressions of Mounut displayed on the preview area 513 of FIG. 17A are displayed. The number of emotional expression menus may be the same as described in relation to the screen for My Mounut. When the Level button is pressed, growth model types of Mounut displayed on the preview area 513 are displayed. The growth models may be the same as described in relation to the screen for My Mounut. When the growth model is displayed, other growth models except the growth model in infancy can be processed by a silhouette as illustrated in FIG. 17B. Mounut can be purchased using the Buy button 519, or can be purchased using the Quick Buy button of the view button area 517 according to the Mounut types. The Original button is a button for returning to the last storage state of the House screen, and may be the same as that of the screen of My Mounut. The Add To Wish List button has the same function as the Wish button 521, and can perform a function for registering an item or Mounut displayed on the preview area 513 in a wish list. The My Mounut Management button can perform a function such as a shortcut function for My Mounut of the initial screen.

When the Mounut Shop function is selected, the computer 60 displays the screen for Mounut Shop as illustrated in FIG. 14. The user can decorate House with a desired Mounut using images or buttons displayed on the screen of Mounut Shop or identify emotional expressions and growth models of Mounut. The user can buy the desired Mounut or register the desired Mounut in the wish list.

A procedure for processing a screen of House Shop in steps 325 and 327 of FIG. 4 will be described. First, when the House Shop menu is selected as illustrated in FIG. 4, the computer 60 senses the selected-menu and transfers the selected menu to the character content server 40 in step 325. The character content server 40 accesses an initial screen of House Shop and downloads the initial screen to the computer 60 in step 327. Then, the computer 60 displays the House Shop screen downloaded from the character content server 40 in step 327. Then, Mounut is purchased or registered in the wish list according to the user's request.

FIG. 18 illustrates the initial screen of House Shop, and FIG. 19 is a flow chart illustrating a procedure for performing a Mounut Shop function in step 327 of FIG. 4.

Referring to FIG. 18, areas 611 and 615 display item images capable of being purchased. The area 611 is the item display area (hereinafter, referred to as the first item display area) for displaying items of types selected by the user from all items capable of being purchased. The area 615 is the area (hereinafter, referred to as the second item display area) for displaying bestseller items (most preferred by users). The second item display area 615 can display latest items as well as the bestseller items or display specific items according to anniversary days (Christmas, Thanksgiving Day, Independence Day, and so on) or specific states (Worldcup Soccer period, Olympic period, and so on). The areas 611 and 615 include areas 625 for displaying thumbnail images for a plurality of items, respectively. A lower part of the area 625 includes a Buy button 619 for purchasing an associated image and a Wish button 621 for adding to a wish list. An area 613 includes a button area 623 for selecting item types. In an embodiment of the present invention, the Mounut types may be All, Background, Article, Furniture, Pet, and Functional items. Buttons for the bestseller items, latest items, anniversary days, or specific states associated with the item types may be further included in the area 623. In this case, the area 611 can display various types of items. The area 615 can also include a button area for selecting item types as in the area 623 of the area 611. In this case, the user can display desired types of items in the areas 611 and 615.

The preview area 613 displays a preview screen for Avatar House. The preview area 613 configures House by only default items when a login operation is not performed, and can be commonly used in Mounut Shop. An area 617 displays menus for implementing a function of House Shop. In the area 617, Motion is a button for displaying emotional models of an avatar. Level is a button for displaying growth models of Mounut. Background is a button for displaying a varied background screen at each time part. Buy Arranged Items is a button for collectively purchasing items displayed on the preview area 613. Empty House is a button for a change to House of the screen of My Mounut, and has the same function as the Original button of the screen of My Mounut. Add To Wish List is a button for registering the displayed Mounut in a wish list. My Mounut Management is a button for implementing a shortcut function for My Mounut.

FIG. 19 is a flow chart illustrating a procedure for implementing a House Shop function in the House Shop screen of FIG. 18.

Referring to FIG. 19, the user can perform the House Shop function in a state in which the screen of House Shop as illustrated in FIG. 18 is displayed. When the user selects the House Shop function, the computer 60 notifies the character content server 40 of the selected function. In step 631, the character content server 40 identifies the login state of the user. In step 633, the character content server 40 generates an initial screen of House Shop as illustrated in FIG. 18 according to the login state and then downloads the generated initial screen to the computer 60. In step 635, the computer 60 displays the initial screen of House Shop downloaded from the character content server 40. A structure of House displayed on the preview area 613 for House Shop differs according to the login state of the user. That is, when the login operation is performed, House displayed on the preview area 613 is displayed as a House screen set by the user. However, when the login operation is not performed, a House screen configured by set default items is displayed on the preview area 613.

Figures 20A, 20B:
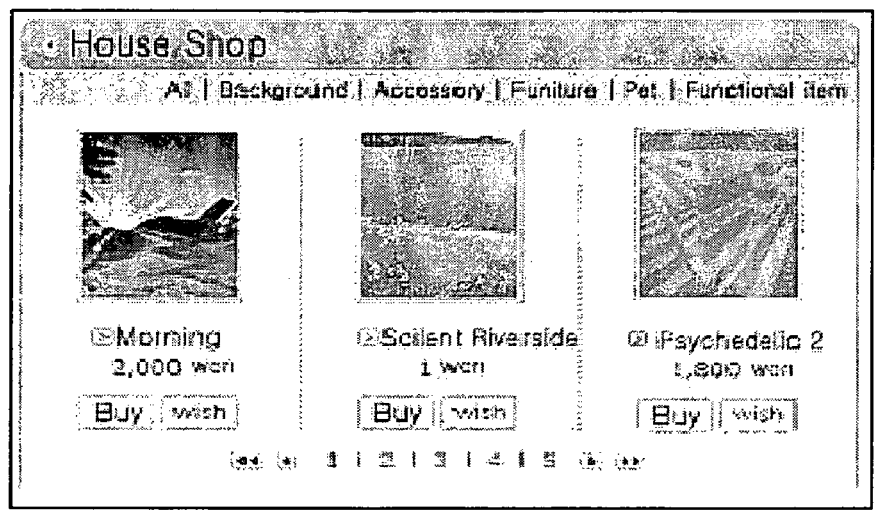
FIGS. 20A to 20E illustrate examples of displaying items according to item types in House Shop (Item Shop)
Figure 20C:
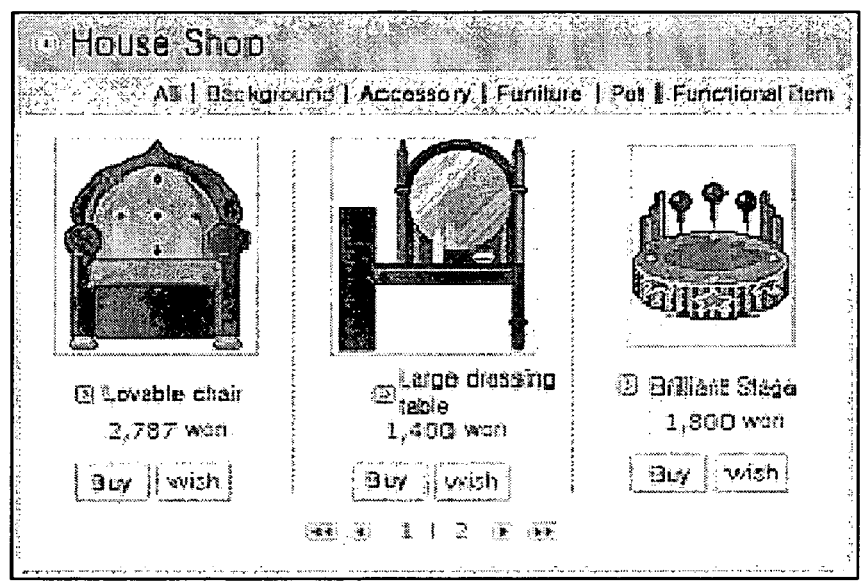
Figure 20D:
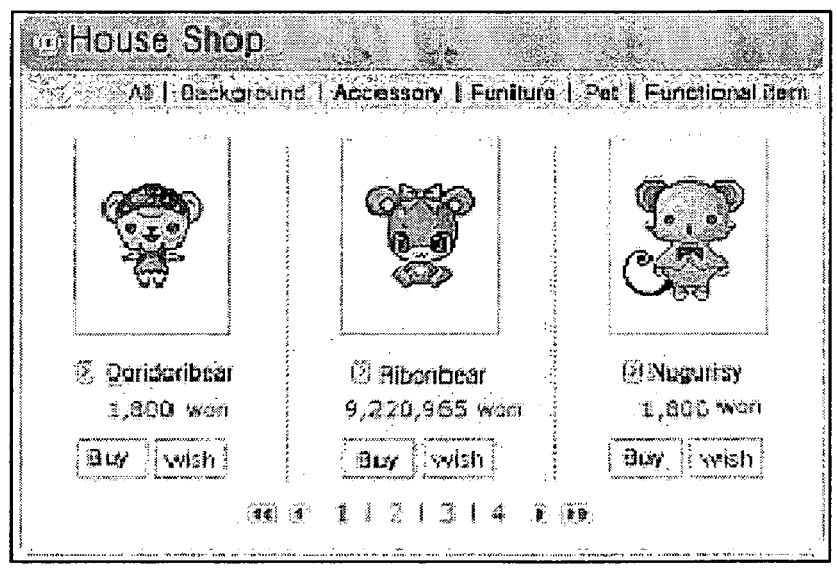
Figure 20E:
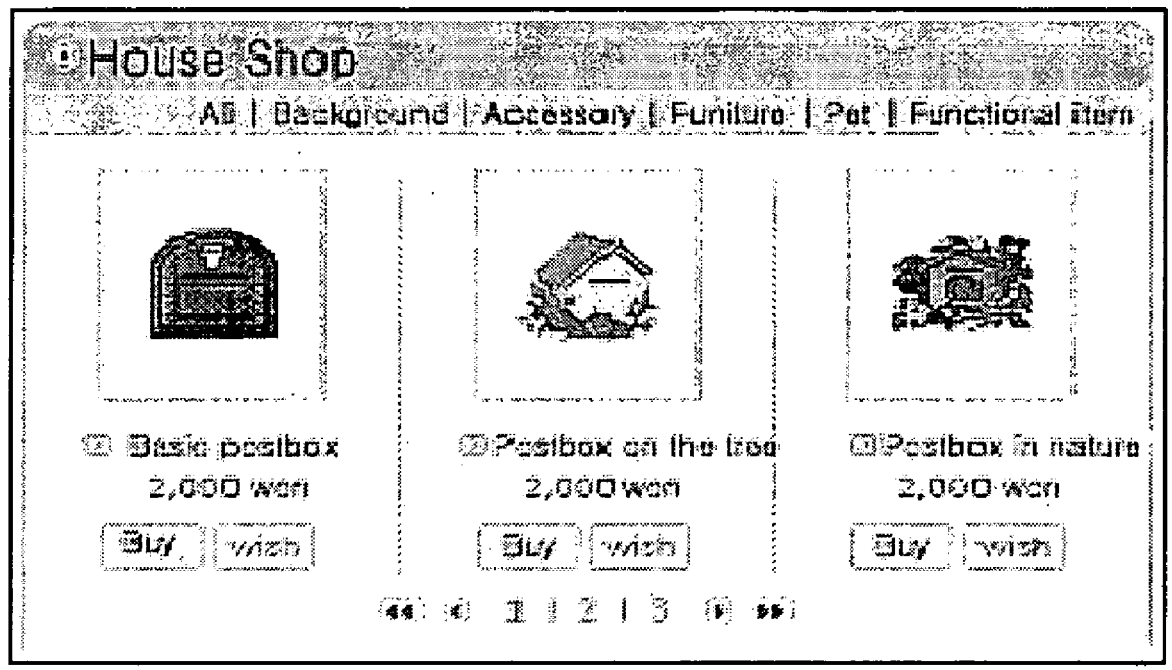

Then, the computer 60 and the character content server 40 perform the Mounut Shop function while performing steps 637 and 639, and perform a Mounut purchase function and a preview function while performing steps 641 and 643. That is, the areas 611 and 615 display Mounuts. When the area 625 for displaying an avatar image, the area 623 for displaying buttons based on the Mounut types, and the Buy button 619 and the Wish button 621 arranged below a Mounut image are selected in step 637, the computer 60 and the character content server 40 sense a selected area or button in step 637 and then process the selected House Shop function in step 639. This operation will now be described in more detail. First, when the Item Type button of the area 623 is pressed, the computer 60 notifies the character content server 40 of the pressed button. The character content server 40 accesses selected item types and downloads items associated with the selected item types to the computer 60. Then, the computer: 60 displays the downloaded items associated with the selected item types on the area 611. Accordingly, when the Item Type button of the area 623 is pressed, item images of associated item types are displayed on the area 611. The item types may be All, Background, Article, Furniture, Pet, and Functional items. FIGS. 20A to 20E illustrate examples of displaying item images for item types on the item display area 611. Here, FIG. 20A illustrates an example of displaying an item image when the Background item is selected. FIG. 20B illustrates an example of displaying an item image when the Article item is selected. FIG. 20C illustrates an example of displaying an item image when the Furniture item is selected. FIG. 20D illustrates an example of displaying an item image when the Pet item is selected. FIG. 20E illustrates an example of displaying an item image when the Functional item is selected.

Figure 21A:
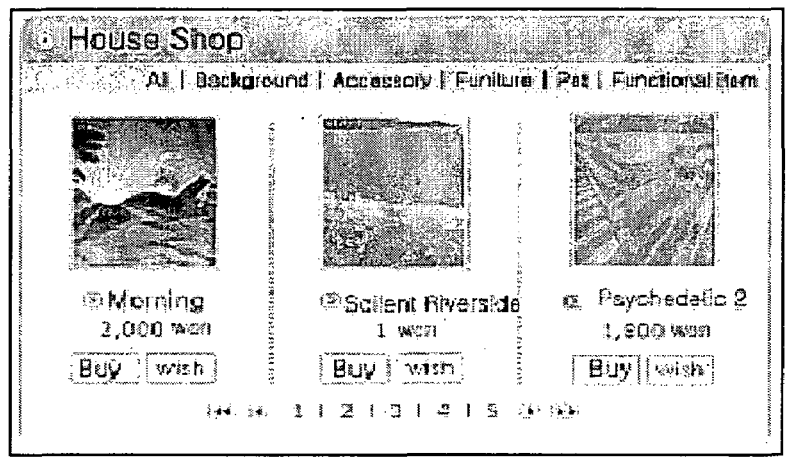
FIGS. 21A to 21F illustrate examples of displaying an item purchased from House Shop (Item Shop) on a preview area.
Figure 21B:
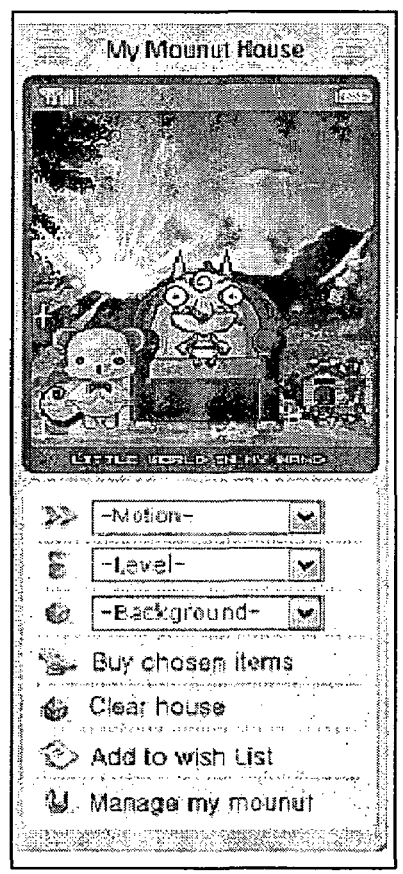
Figure 21C:
Figure 21D:
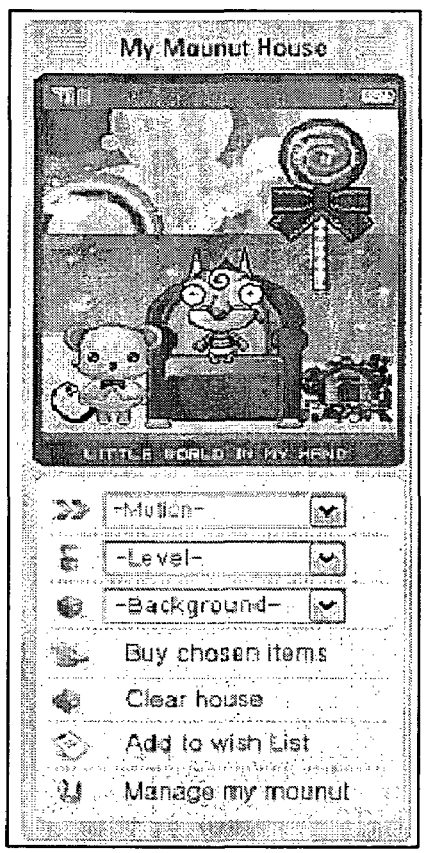
Figure 21E:
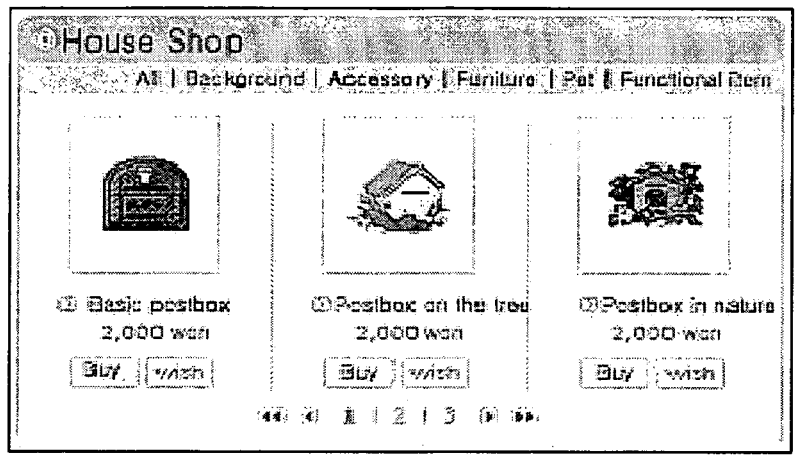
Figure 21F:
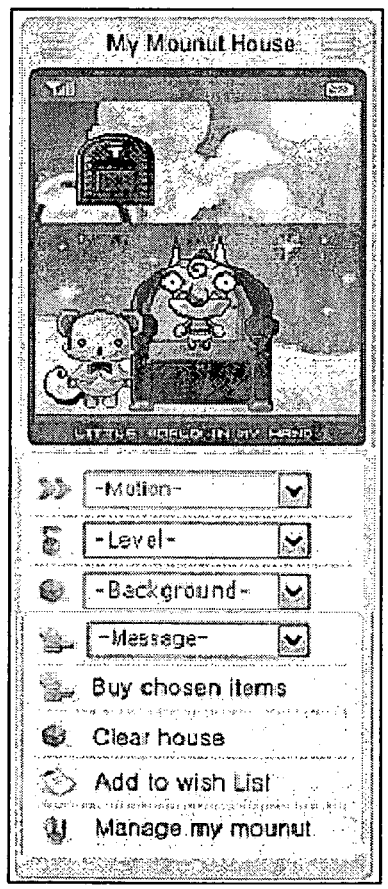
Figure 22A:
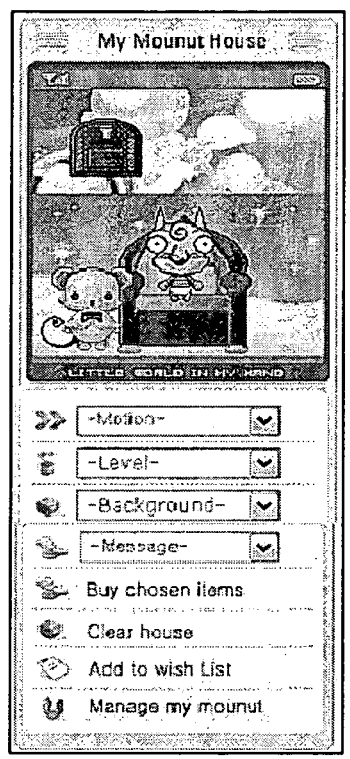
FIGS. 22A and 22B illustrate examples of displaying character features on a preview area in House Shop (Item Shop)
Figure 22B:
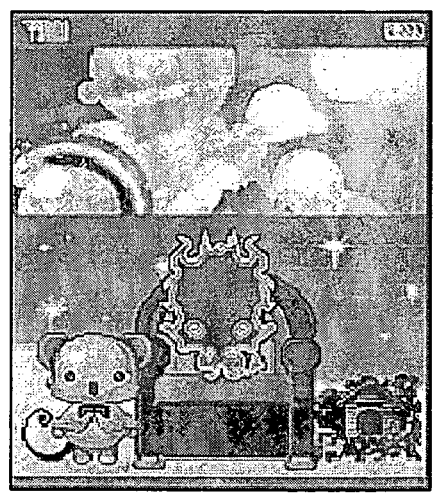

When the user clicks the area 625 for displaying an item image in a state in which the item images are displayed on the area 611, a selected item is displayed on the preview area 613. That is, when the Background item image as illustrated in FIG. 21A is clicked, the selected Background item image is displayed on the preview area 613 as illustrated in FIG. 21B. When the Article item image as illustrated in FIG. 21C is selected, the selected Article item is displayed on the preview area 613 as illustrated in FIG. 21D. When the Functional item image as illustrated in FIG. 21 E is selected, the selected Functional item is displayed on the preview area 613 as illustrated in FIG. 21F. When the Functional item image is selected, a message menu is displayed on a House preview menu area 617. At this time, when the user clicks the message menu, a description of the Functional item is displayed. The Buy button 619 and the Wish button 621 are arranged below an item image of the item display area 611. In this case, when the button 619 or 621 is pressed, an associated item is registered in a purchase list or a wish list.

When the purchase/preview function is requested, the computer 60 senses the request and sends the request to the character content server 40 iii step 641. The character content server 40 identifies the request in steps 641 and 643, accesses a requested character image in the character content database 50, and downloads the requested character image to the computer 60. Then, the computer 60 processes the House Shop function while displaying the downloaded character image on the preview area 613. House preview function menus arranged below the preview area 613 include buttons of Motion, Level, Background, Message, and so on. When the Motion button is pressed, the emotional models of Mounut are displayed as described above. When the Level button is pressed, types of growth models of Mounut displayed on the preview area 613 are displayed. The growth models may be the same as described in relation to the screen for My Mounut. When the growth model is displayed, other growth models except the growth model in infancy can be processed by a silhouette as illustrated in FIG. 12B. The Background button is used to display menus of time parts for the Background item. When the Background button is pressed, menus of morning, afternoon, evening, night, and so on are displayed. When a specific menu is selected from the displayed background menus, a background item image of the selected menu is displayed on the preview area 613. The Message button is used to display message content of the Functional item displayed on the preview area 613. This button is generated only in case of the Functional item. That is, when the Functional item is not present in House, the button is not generated. Button content differs according to a function of the Functional item. That is, when the Functional item is a mailbox, the mailbox is an item for displaying an unread text message, and displays the number of unread messages if an unread message is present. Here, the functional item may be an unread text message, a missed call, an alarm, and so on.

Figure 23A:
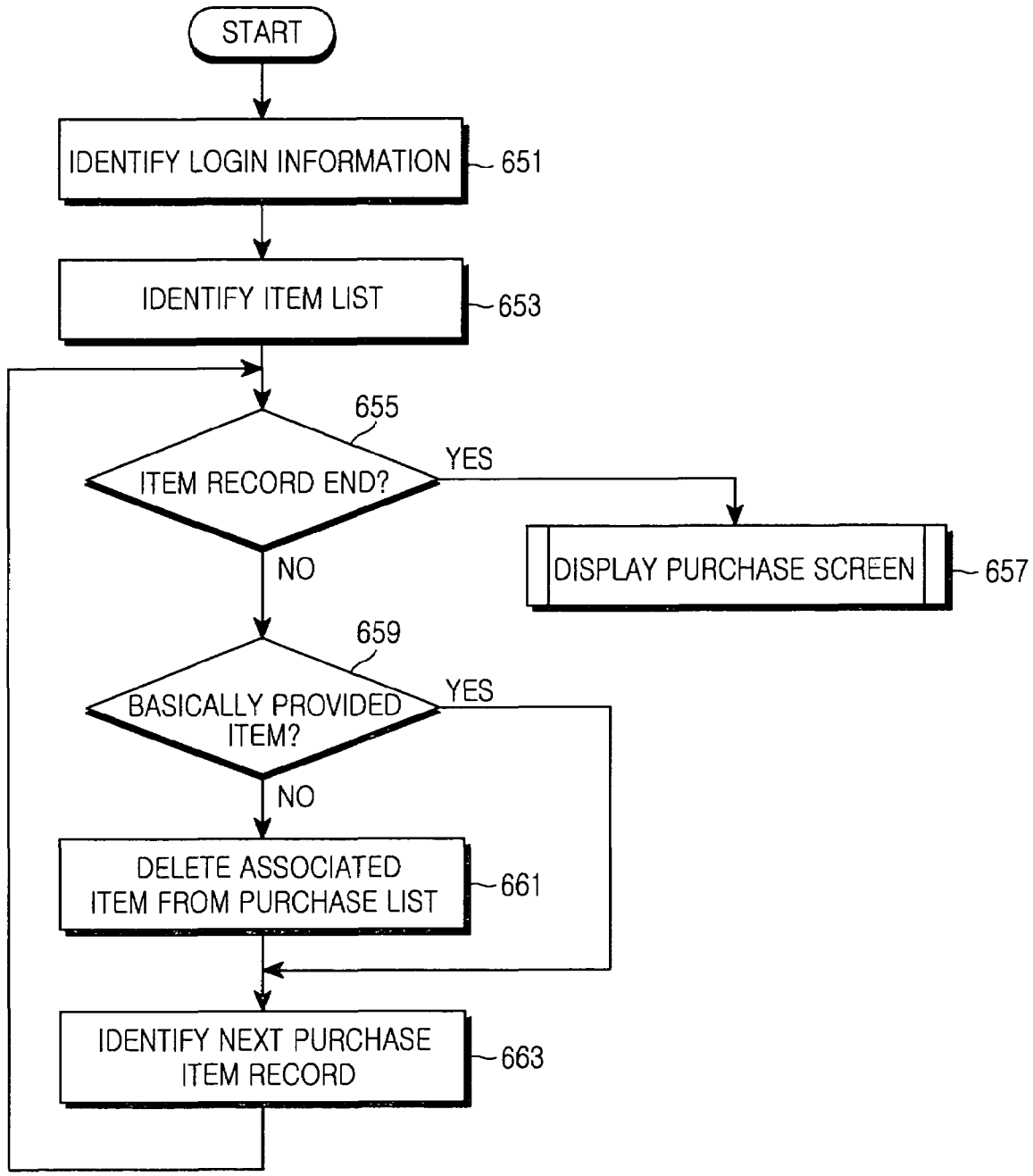
FIGS. 23A to 23C illustrate a procedure for purchasing an item from House Shop (Item Shop)
Figure 23B:
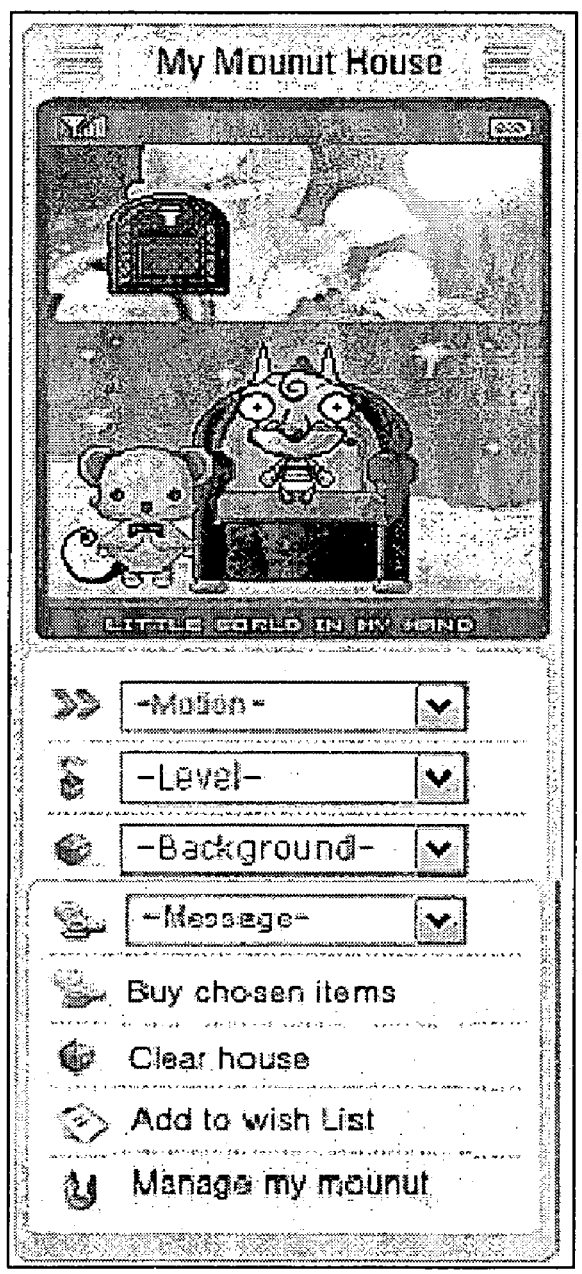
Figure 23C:
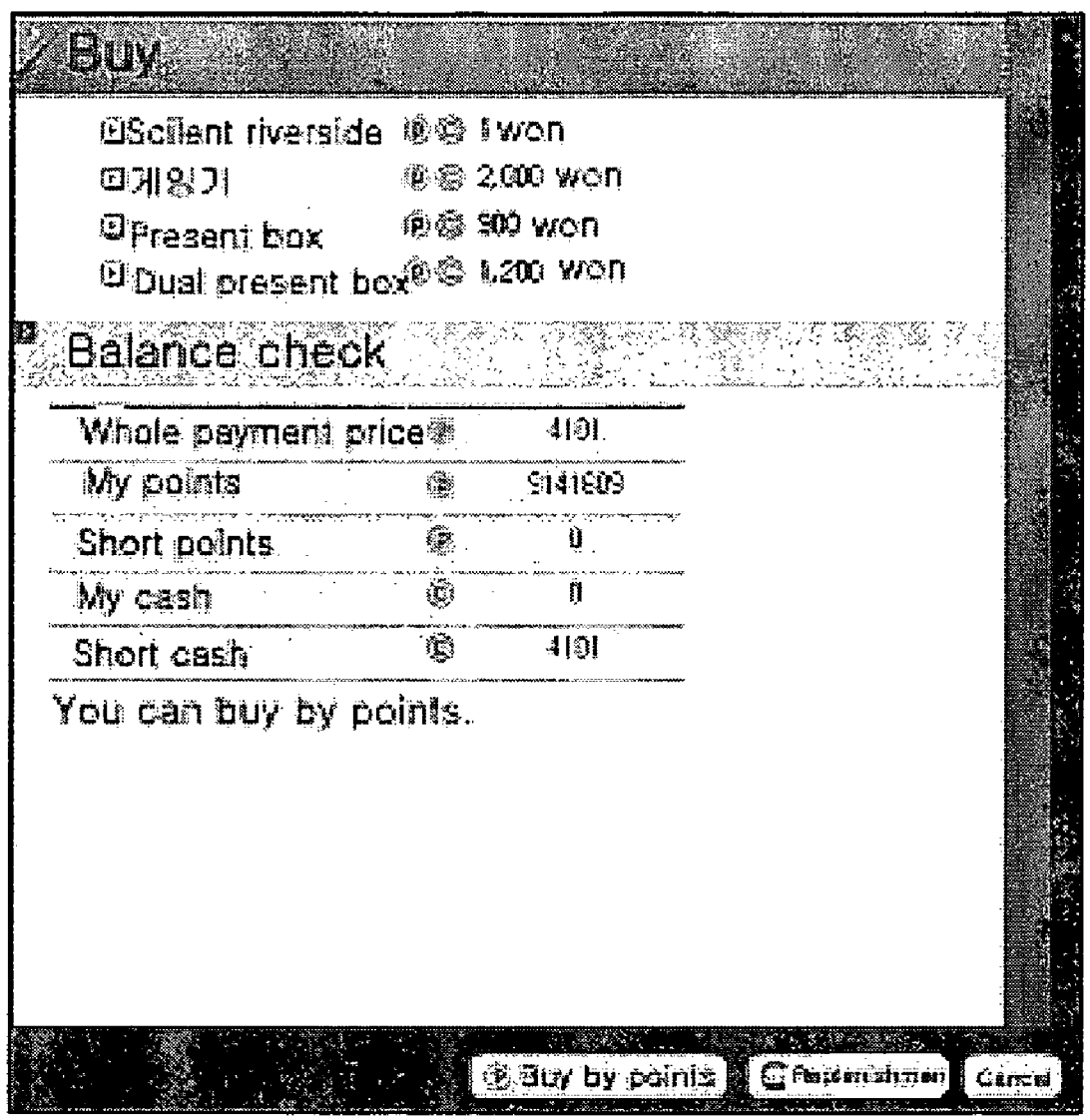

The Buy Arranged Items button is a button for collectively purchasing items displayed on the preview area 613, and is a button for purchasing items arranged by the user on the preview area 613 as illustrated in FIGS. 23A to 23C. The Empty House button has the same function as the Original button in House for My Mounut. The Add To Wish List button has the same function as the Add To Wish List button of the initial screen for House Shop of FIG. 18. The My House Management button has the same function as the shortcut button for My Mounut of the initial screen of FIG. 18.

A procedure for purchasing arranged items will be described with reference to FIGS. 23A to 23C. The user selects desired item images in a process for the House Shop function and arranges the selected item images in the preview area 613. In this case, when an item image displayed on the item display area 611 or 615 is clicked, the selected item image is displayed on the preview area 613. The item image displayed on the preview area 613 can be dragged such that it is arranged in a desired position. When the above-described operation is repeated, desired items can be selected and the selected items can be arranged in desired positions on the screen of the preview area 613. When desiring to purchase the arranged items, the user presses the Buy Arranged Items button of the area 617.

The computer 60 and the character content server 40 perform a procedure for purchasing items arranged on the preview area 613 while performing the procedure of FIG. 23A.

In step 651, login information is identified. Then, if the login has been performed normally, a list of items arranged on the preview area 613 is identified in step 653. A determination is made as to whether an item belonging to the item list is a basically provided item in step 659. If the item is a basically provided item, the procedure proceeds to step 663 because the item does not-need to be purchased. The next item record is identified from the item list and the procedure proceeds to step 655. However, if the item is not a basically provided item in step 659, the procedure for purchasing an associated item is performed and the associated item is deleted from the purchase list in step 661. The procedure proceeds to step 663. While steps 659 to 663 are repeatedly performed, an item purchase procedure for records of the arranged item list is performed. When the procedure for purchasing the last item of the item list is completed, the procedure completion is sensed in step 655, and a screen of a list of the purchased items is displayed in step 657 as illustrated in FIG. 23C. As illustrated in FIG. 23C, the purchase screen displays names and unit costs of the purchased items in the item list, and also displays the remainder of the user after purchasing the items.

Characters can be purchased in the screens of My Mounut, Mounut Shop, House Shop, and so on and can be registered in a wish list. House decoration functions can be performed. The characters can be transmitted to a desired wireless terminal. A procedure for purchasing and transmitting characters will be described in more detail.

Figure 24A:
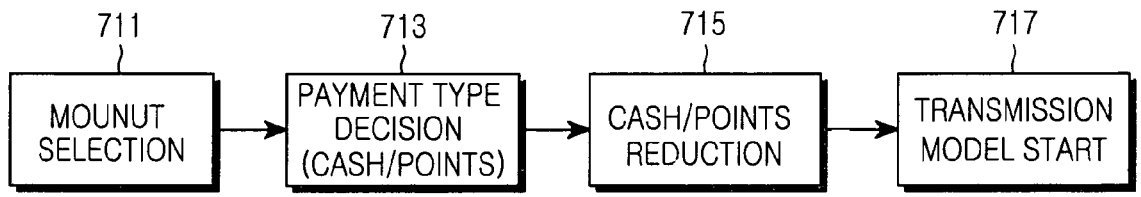
FIGS. 24A and 24B illustrate a procedure for purchasing a character in accordance with an embodiment of the present invention.
Figure 24B:
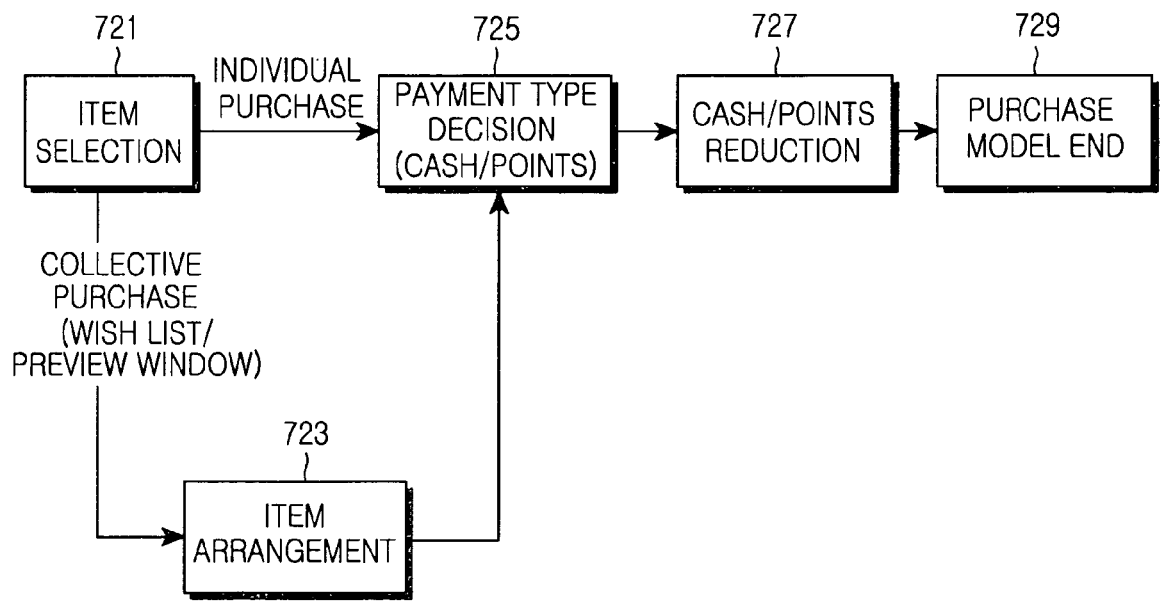
Figure 25A:
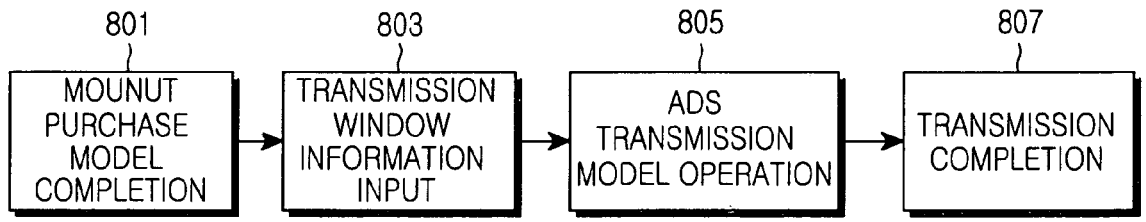
FIGS. 25A and 25B illustrate a procedure for transmitting a character to the wireless terminal in accordance with an embodiment of the present invention.
Figure 25B:
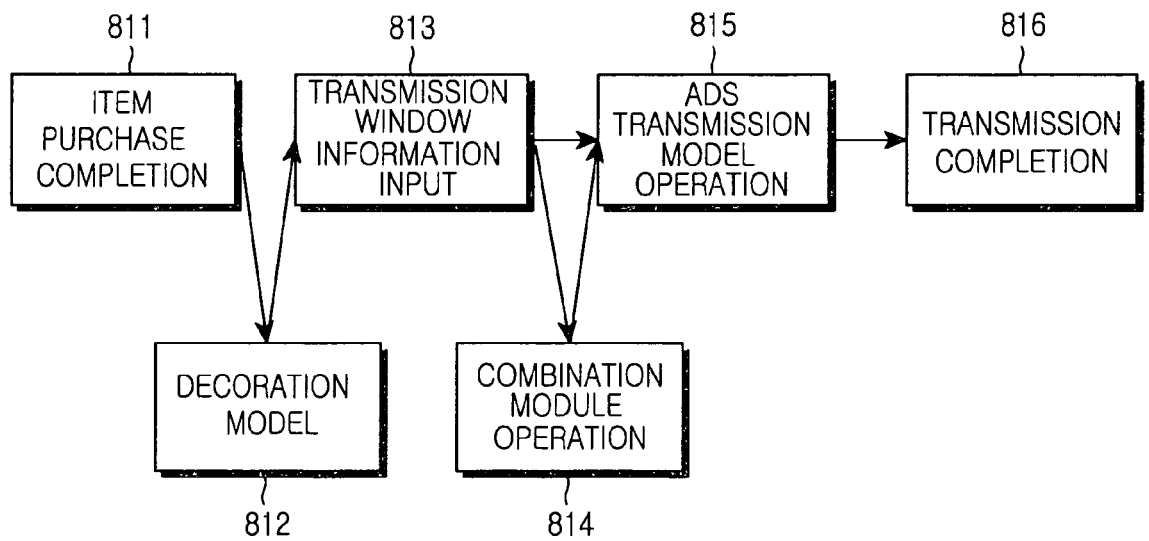

FIGS. 24A and 24B illustrate the procedure for purchasing characters, and FIGS. 25A and 25B illustrate the procedure for transmitting characters. Here, it is assumed that the purchase procedure is performed in the character content server 40, and the computer 60 transfers purchase information generated from the user to the character content server 40 and displays a result downloaded from the character content server 40. In a different method, the character content server 40 downloads character information, and the purchase procedure may be performed in the computer 60.

A procedure for purchasing Mounut will be described with reference to FIG. 24A. When Mounut to be purchased is selected, the character content server 60 senses the selected Mounut in step 711 and provides guidance for a payment method for purchasing the selected Mounut in step 713. In this case, payment types may be cash and points. When the user selects the payment type of cash or points, the character content server 40 senses the selected payment type, reduces cash or points by the amount of money for the purchase of Mounut in step 715, and registers an associated Mounut in My Mounut of the user in step 717. At this time, when the user makes a transmission request, the associated Mounut is transmitted.

A procedure for purchasing items will be described with reference to FIG. 24B. The items can be individually and collectively purchased. That is, items displayed on the item display area 611 or 615 as illustrated in the House Shop screen of FIG. 18 can be individually purchased. After desired items are selected and arranged in the preview area 613, the items displayed on the preview screen can be collectively purchased using the Buy Arranged Items button of the menu area 617. The character content server 40 can sense the individual purchase in step 711, and can sense the collective purchase in steps 711 and 723. When the individual or collective purchase for items is requested, the character content server 40 gives guidance for selection of a payment type in step 725. When the user selects the payment type, cash or points are reduced according to the payment type in step 727 and then the procedure for processing a purchase model ends in step 729

A procedure for transmitting Mounut will be described with reference to FIG. 25A. FIG. 25A illustrates a procedure for transmitting one Mounut. First, when Mounut transmission is requested in a state in which the purchase of Mounut is completed in step 801, the character content server 40 displays transmission window information for transmitting Mounut and gives guidance for an input in step 803. When the input is generated, an ADS transmission module is driven and Mounut transmission starts in step 805. When the transmission is completed, the Mounut transmission ends in step 807.

A procedure for transmitting items will be described with reference to FIG. 25B. The items can be individually transmitted. Alternatively, the transmission for multiple items can be performed. The character content server 40 performs steps 811 and 813 in case of the individual item transmission and provides guidance for item selection and a transmission window to be transmitted. In case of the transmission for multiple items, the character content server 40 generates a decoration model such that the items can be transmitted, generates a transmission window for transmitting the decoration model, and operates a combination module, while performing steps 811 to 814. Subsequently, the character content server 40 drives an ADS transmission module to transmit the items in step 815, and ends the transmission procedure when the transmission is completed in step 816.

FIG. 25A illustrates a procedure for transmitting Mounut, and FIG. 25B illustrates a procedure for transmitting an item. After House is configured by an item and Mounut, House itself can be transmitted. Multiple Mounuts are configured and transmitted as in case of the item transmission.

A procedure for processing a wish list of characters and a procedure for processing a purchase operation will be described in more detail.

Figure 26A:
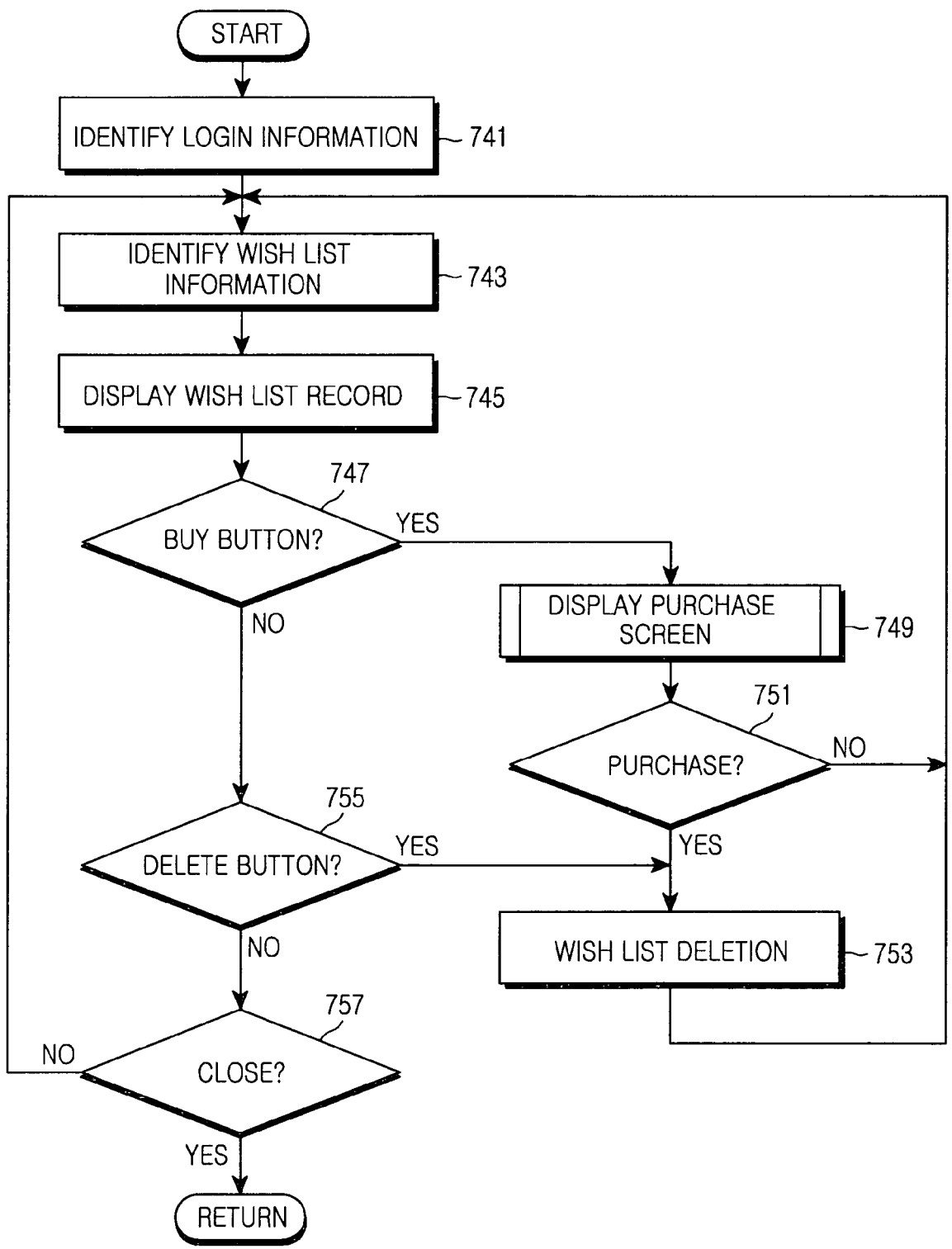
FIGS. 26A and 26B illustrate a procedure for processing a wish list in accordance with an embodiment of the present invention.
Figure 26B:

FIG. 26A is a flow chart illustrating the procedure for processing a wish list of characters, and FIG. 26B illustrates an example of a view screen for the wish list.

Referring to FIGS. 26A and 26B, when a wish list 363 is clicked in a character display screen (e.g., a web site initial screen, a My Mounut screen, a Mounut Shop screen, or a House Shop screen) of the computer, the character content server 40 identifies login information in step 741. The character content server 40 identifies wish list information, and downloads the record of the wish list to the computer 60 in steps 743 and 745. Then, the user can identify wish lists of Mounuts and items as illustrated in FIG. 25B through the computer 60. When the Buy button for purchasing a specific Mounut and/or a specific item in the wish lists is pressed, the character content server 40 senses the pressed button in step 747, and displays a purchase screen in step 749. When the user makes a purchase request, the character content server 40 senses the request in step 751, deletes the purchased Mounut and/or item from the wish list as illustrated in FIG. 26B in step 753, and proceeds to step 743. When the purchase is not confirmed after the Buy button is pressed, the character content server 49 senses the unconfirmed purchase, and terminates the purchase procedure in step 751. When the user presses the Delete button for the specific Mounut and/or item in a state in which the wish list as illustrated in FIG. 26B is displayed, the character content server 40 senses the pressed button in step 755, deletes the Mounut and/or item of the deletion request from the wish list as illustrated in FIG. 26B in step 753, and proceeds to step 743. This operation is repeated until the user makes a close request. When the close request is generated, the character content server 40 senses the close request and terminates the procedure for displaying the wish list screen in step 757.

As described above, the user can register, in the wish list, characters to be purchased in the screen on which the characters are displayed using the Wish button. That is, the users can make a reservation to buy a character while viewing the characters on the screen. The reservation characters to be purchased are registered in the wish list. Then, after the wish list is identified, a purchase or deletion operation can be selectively performed.

Figure 27A:
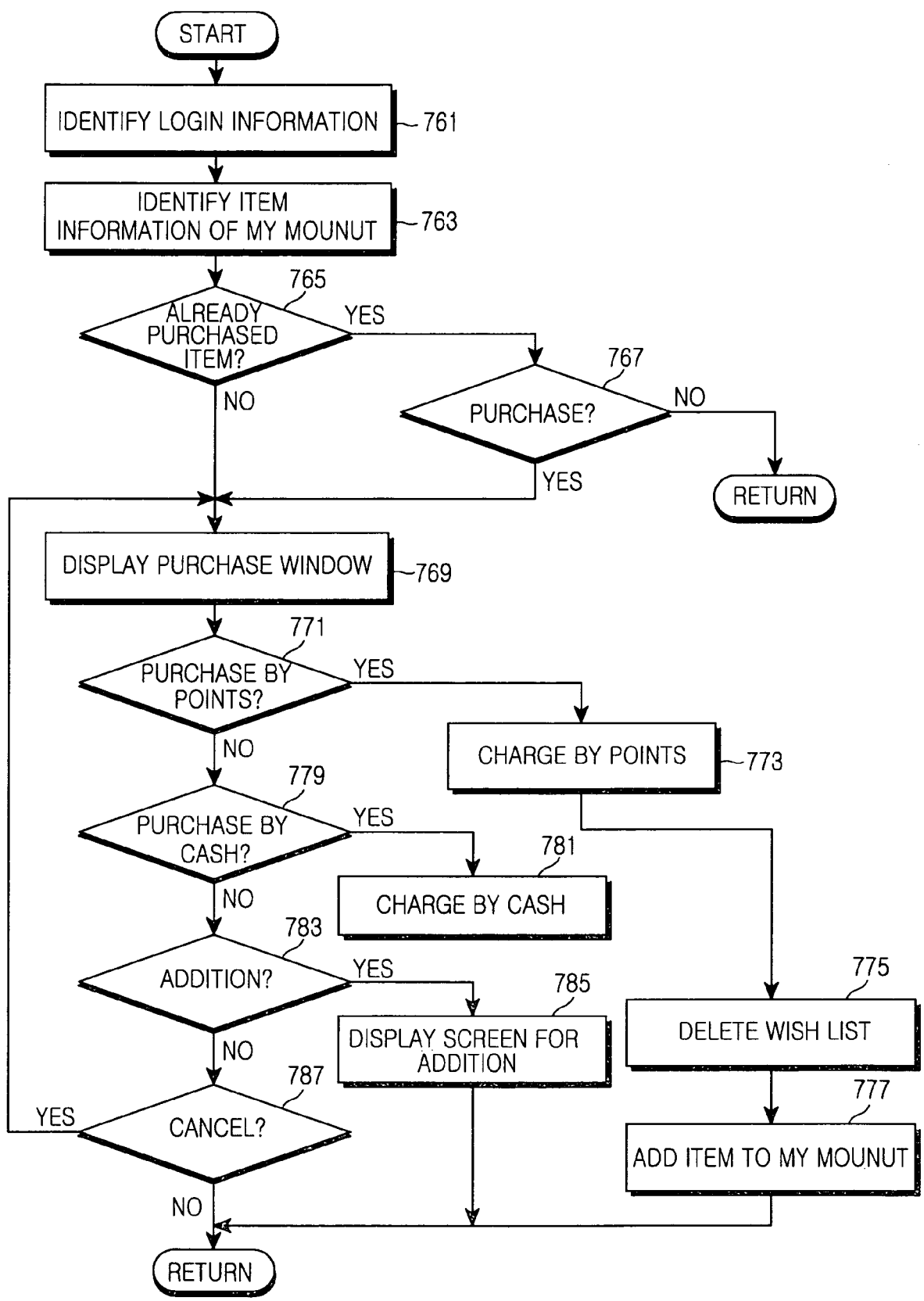
FIGS. 27A and 27B illustrate a procedure for purchasing a character in accordance with an embodiment of the present invention.
Figure 27B:
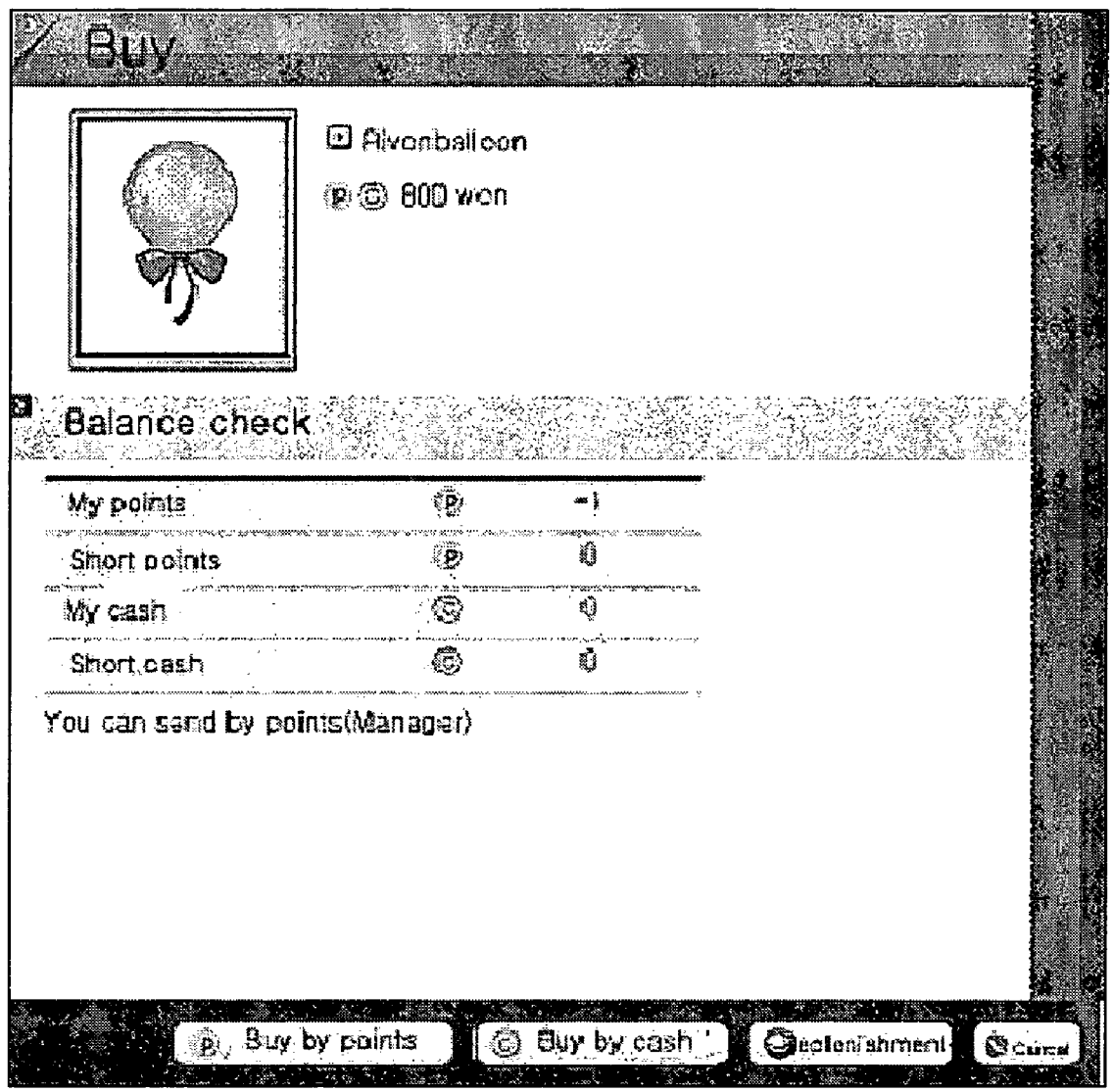

FIG. 27A is a flow chart illustrating a procedure for purchasing characters, and FIG. 27B illustrates an example of a purchase screen.

The procedure for purchasing characters will be described with reference to FIGS. 27A and 27B. When a purchase request is generated, the character content server 40 identifies login information of the user in step 761. If the login operation has been performed normally, the character content server 40 identifies characters registered in My Mounut in step 763. In this case, the characters registered in My Mounut can be identified from the My Mounut screen displayed as illustrated in FIG. 6. Then, the character content server 40 determines if a character associated with the purchase request is an already purchased character in step 765. If the character has already been purchased, a guidance message indicating that the character has already been purchased is provided and a determination is made as to whether the user desires to buy the character in step 767. When the user cancels the purchase operation, the character content server 40 senses the cancelled purchase operation and terminates the purchase procedure in step 767.

However, if it is determined that a purchase request is made for a new character that has not been purchased or that the already purchased character is re-purchased in step 765, the character content server 40 downloads a purchase window screen to the computer 60 in step 769. In this case, the purchase window screen has a structure as illustrated in FIG. 27B. FIG. 27B illustrates an example of a ribbon balloon item (whose type is Article). The purchase window displays a character, a character price, and information of the current remainder (of held points and cash, and so on) available for the user. In a state in which the purchase window is displayed, the character content server 40 identifies a payment type of the user. When the user makes a request for purchase by points, the character content server 40 senses the request in step 771, reduces points by the character price in step 773, and adds the purchased character to My Mounut. If the purchased character has been registered in the wish list, the character content server 40 deletes the purchased character from the wish list in step 775 and performs step 789. When the user makes a request for purchase by cash, the character content server 40 senses the request in step 781, imposes charges such that they can be paid for the purchased character by cash in step 783, and registers the purchased character in My Mounut while performing steps 775 and 779.

When currently held points and/or cash are not enough to buy a character as illustrated in FIG. 27B, the user can add points and/or cash. When the user makes an addition request, the character content server 40 senses the request in step 785 and downloads a screen for addition in step 787. The computer 60 displays the downloaded screen for addition, and the user can add points and/or cash after viewing the screen for addition. When a cancel request is generated after the user makes a purchase request for a character, the character content server 40 senses the request in step 789 and ends the purchase procedure as illustrated in FIG. 27A.

When the user issues the purchase command for a character, the character content server 40 displays a purchase window for the requested character for purchase. When the user selects a payment type through the purchase window, the character content server 40 registers the purchased character in My Mounut while performing a procedure for purchasing a character according to a payment method of the user. When the requested character for purchase is a character registered in My Mounut, a message indicating that the character has already been purchased is displayed. If the user desires to buy the character, the purchase procedure is performed. When the user issues the cancel command after the purchase request, the character content server 40 terminates the purchase procedure for a character. When the user makes the purchase request for a character, the character content server 40 displays the remainder along with an image of an associated character and its price. When the user makes an addition request because the remainder is insufficient, the procedure for addition will be performed.

A procedure for processing a download list and a transmission processing procedure will be described in more detail.

Figure 28A:
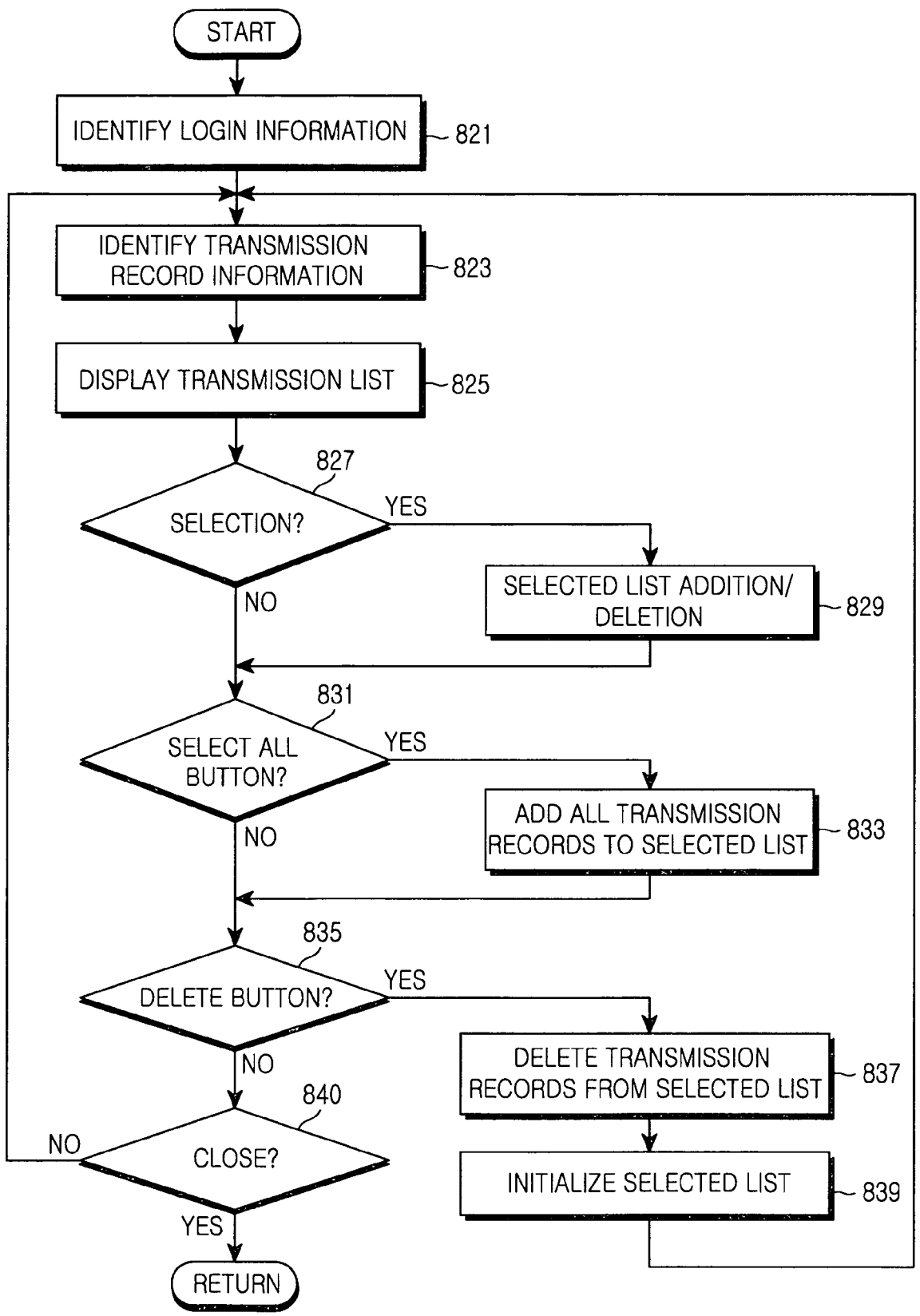
Figure 28B:
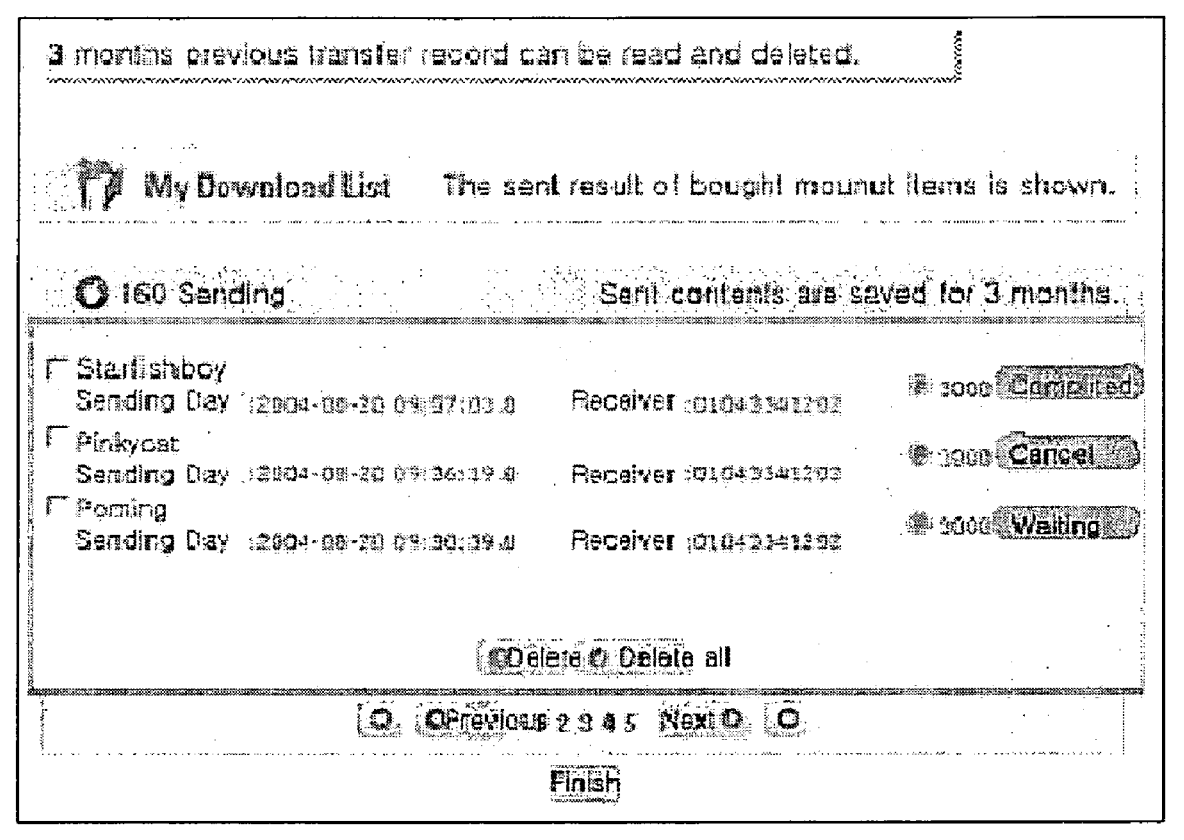

FIG. 28A is a flow chart illustrating the procedure or processing the download list, and FIG. 28B illustrates an example of a view screen for the download list.

Referring to FIGS. 28A and 28B, when a download list 361 is clicked in a character display screen (e.g., a web site initial screen, a My Mounut screen, a Mounut Shop screen, or a House Shop screen) of the computer, the character content server 40 identifies login information in step 821. The character content server 40 identifies download list information, and downloads and displays the download list information to the computer 60 in steps 823 and 825. Then, the user can identify the download list as illustrated in FIG. 28B through the computer 60. When the user selects the download list and generates an addition or deletion command, the character content server 40 performs an operation for adding a record to the selected download list or deleting a record from the selected download list while performing steps 827 and 829. When the user presses a Select All button, the character content server 40 adds all transmission records to the selected list while performing steps 831 to 833. When the user presses a Delete button, the character content server 40 deletes transmission records from the selected list and initializes the selected list while performing steps 835 to 839. When a Close button is pressed, the character content server 40 terminates the procedure for processing the download list.

Figure 29A:
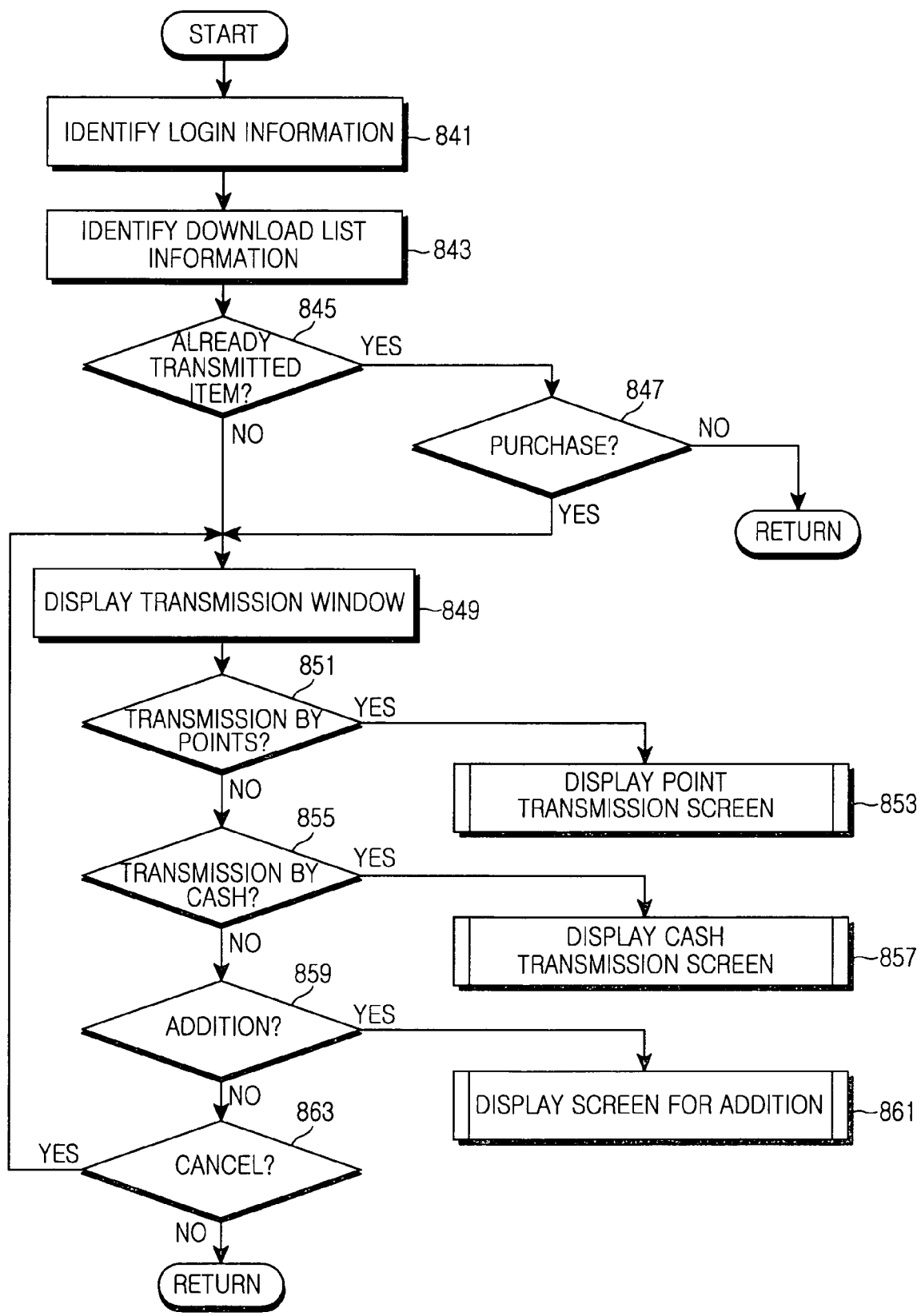
FIGS. 29A and 29B illustrate a procedure for downloading a character in accordance with an embodiment of the present invention.

After the download list is identified, characters can be transmitted to a wireless terminal or another computer. FIG. 29A is a flow chart illustrating a procedure for transmitting a character of the download list, and FIG. 29B illustrates an example of a transmission screen.

A procedure for transmitting a character will be described with reference to FIGS. 29A and 29B. When a transmission request is generated, the character content server 40 identifies login information of the user in step 841. If the login operation has been performed normally, the character content server 40 identifies the download list to determine if a character to be transmitted is the already transmitted character in step 843. Characters registered in the download list can be identified from a download list screen as illustrated in FIG. 28B. Then, if a character to be transmitted is the already transmitted character in step 765, the character content server 40 provides a message indicating that a character to be transmitted is the already transmitted character in step 847. The character content server 40 determines if the character is to be transmitted. When the user cancels the transmission, the character content server 40 senses the cancelled transmission and ends the transmission procedure in step 847.

If it is determined that the character to be transmitted has not been previously transmitted, or the character is re-transmitted in step 845, the character content server 40 downloads a screen of a transmission window to the computer 60 in step 849. In this case, the screen of the transmission window can have the structure as illustrated in FIG. 29B. FIG. 29B illustrates an example of Ascidian (Mounut). The transmission window displays a character, a character price, and information of the current remainder (of held points and cash) available for the user. The character content server 40 identifies a transmission method of the user in a state in which the transmission window is displayed. When the user makes a request for transmission by points, the character content server 40 senses the request in step 851 and transfers points while displaying a point transmission screen in step 853. When the user makes a request for transmission by cash, the character content server 40 senses the request in step 855 and transfers cash while displaying a cash transmission screen in step 857.

Figure 29B:
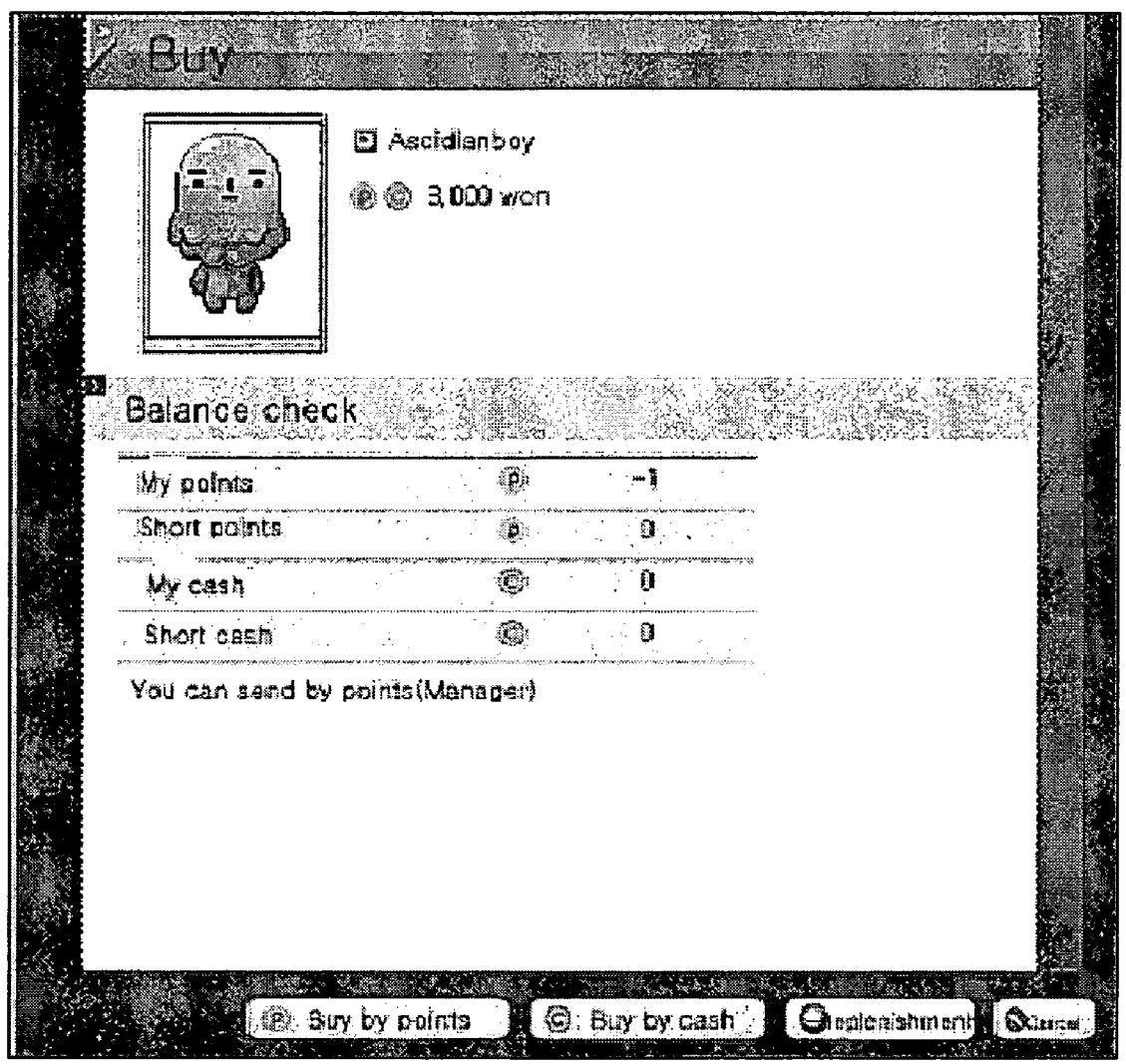

When currently held points and/or cash are not enough to buy a character as illustrated in FIG. 29B, the user can add points and/or cash. When the user makes an addition request, the character content server 40 senses the request in step 859 and download a screen for addition in step 861. The computer 60 displays the downloaded screen for addition, and the user can add points and/or cash after viewing the screen for addition. When a cancel request is generated after the user makes the transmission request, the character content server 40 senses the request in step 863 and ends the purchase procedure as illustrated in FIG. 29A.

When a character image is transmitted as described above, points and/or cash for purchasing the character image can be transferred. A wireless terminal or another computer can receive the points or cash, purchases a desired character by points and/or cash, and download the desired character. In this case, when the points and/or cash are transferred, information of the character capable of being purchased by points and/or cash can also be transmitted.

Figure 30A:
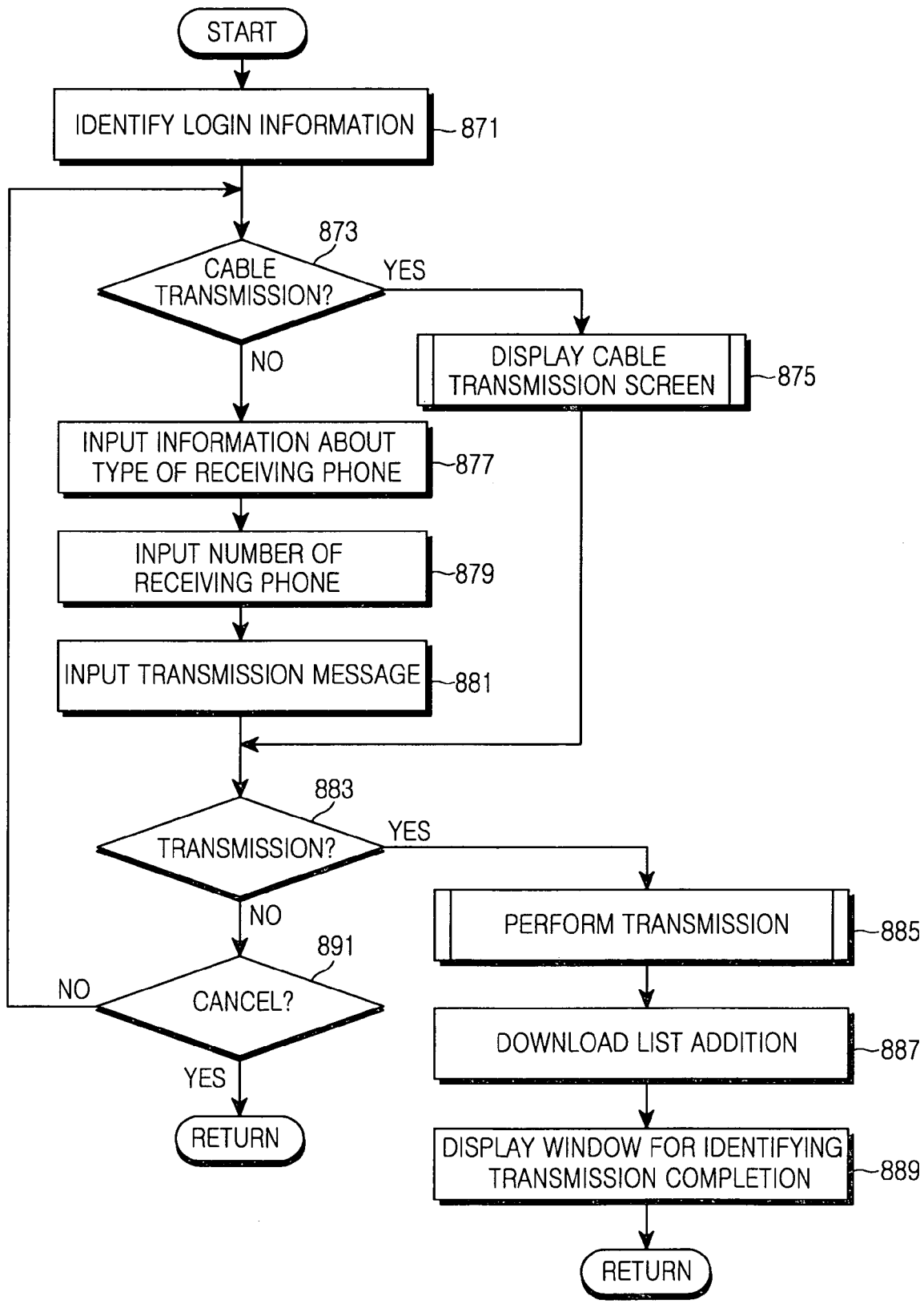
FIGS. 30A and 30B illustrate a procedure for transmitting a character to another terminal in accordance with an embodiment of the present invention.
Figure 30B:
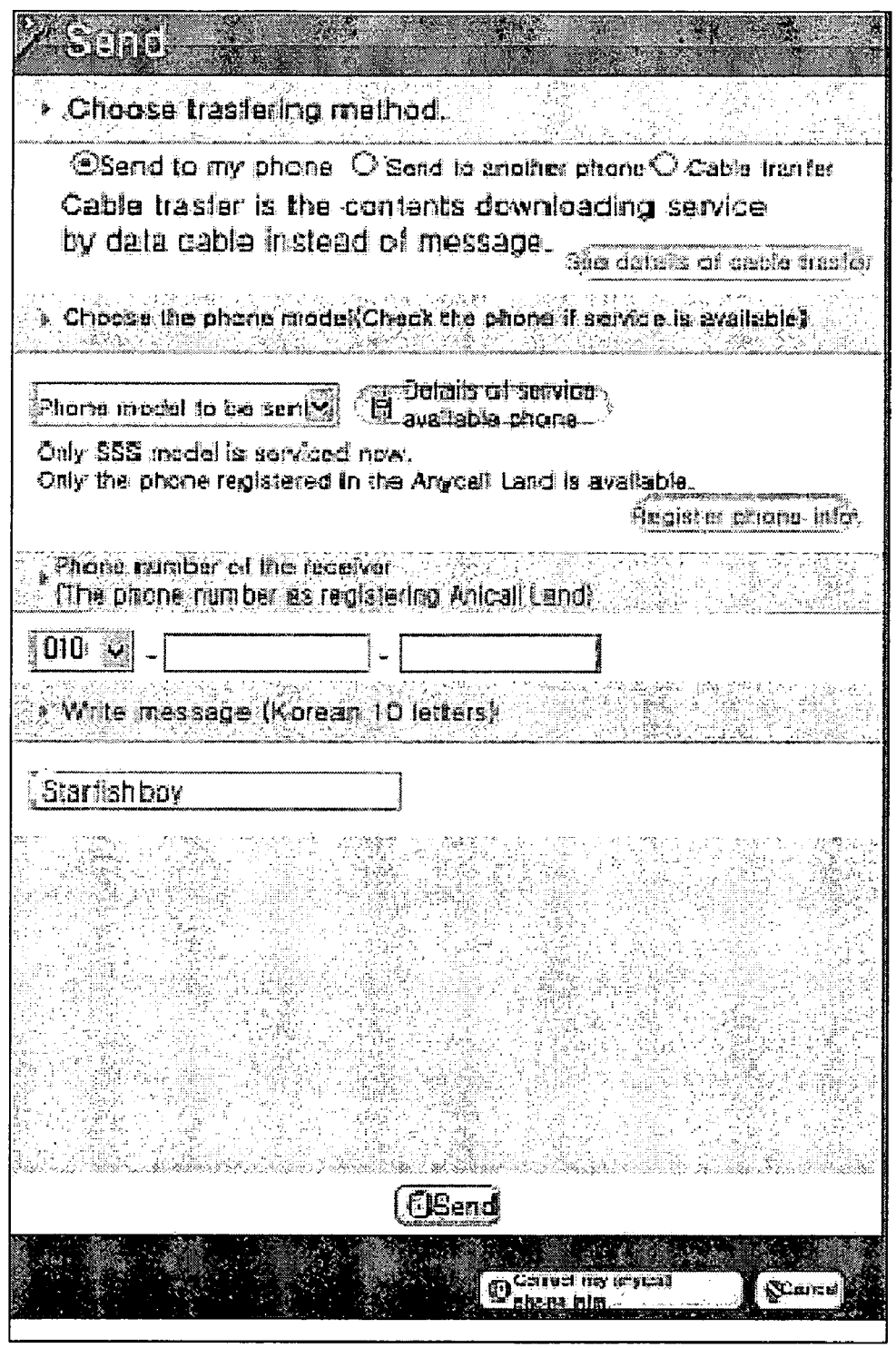
Figure 31A:
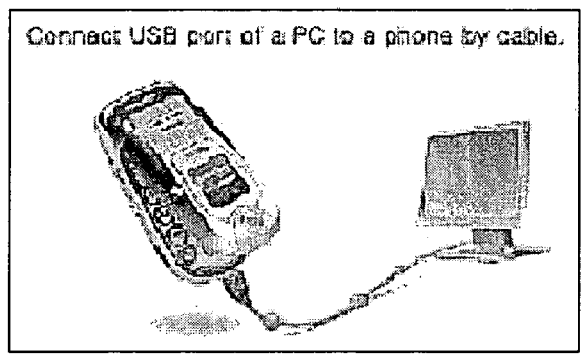
FIGS. 31A to 31D illustrate a screen structure when a character is transmitted in accordance with an embodiment of the present invention.
Figure 31B:
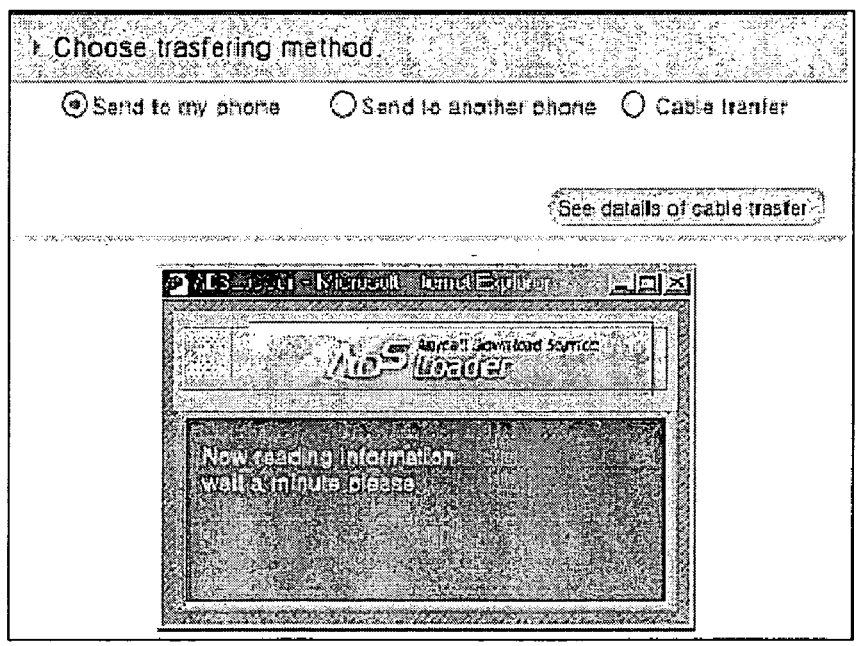
Figure 31C:
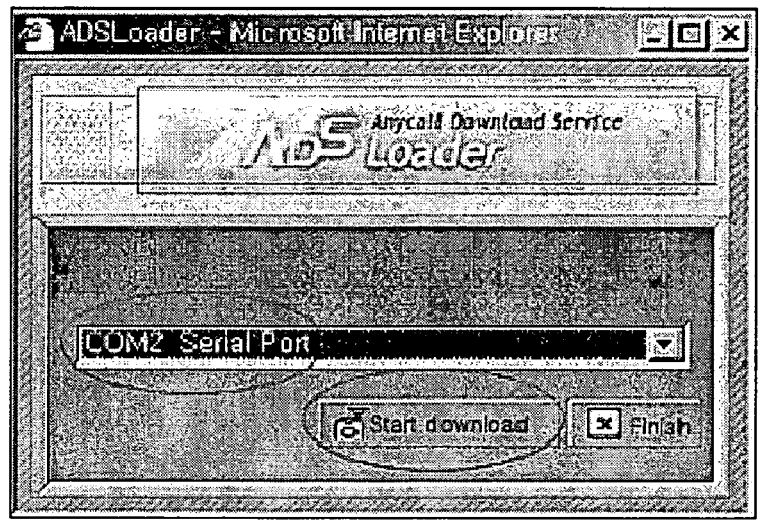
Figure 31D:
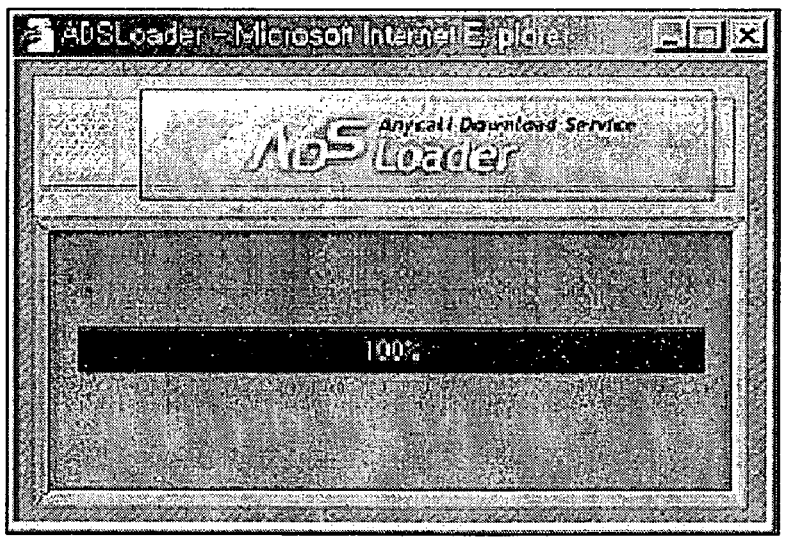

FIG. 30A is a flow chart illustrating a procedure for transmitting (gifting) a character selected by the user to another terminal, and FIG. 30B illustrates an example of displaying a transmission window when the character is transmitted.

Referring to FIGS. 30A and 30B, the character content server 40 identifies login information of the user in step 871. If the login operation has been performed normally, the character content server 40 downloads the transmission window as illustrated in FIG. 30B. Then, the computer 60 displays the downloaded transmission window as illustrated in FIG. 30B. When the user inputs a desired transmission method to the transmission window as illustrated in FIG. 30B, the computer 60 notifies the character content server 40 of the transmission method. The character content server 40 examines the transmission method in step 873. When the transmission method is a cable communication (or local area communication of IrDA or Bluetooth) method, a cable transmission screen is downloaded in step 875. The computer 60 displays the cable transmission screen. Then, the user selects characters to be transmitted through the cable communication (or local area communication) while identifying the transmission screen. FIGS. 31A to 31D illustrate transmission methods using a cable. However, when the transmission method is a method for transmission to a wireless terminal, the character content server 40 senses the transmission method in step 873 and receives information about a type and number of the wireless terminal in steps 877 and 879. Then, a user selected character and a transmission message of the character are received in step 881.

When a transmission command is generated after the transmission method (including a type and number of a wireless terminal) is set while the above-described procedure is performed, the character content server 40 senses the command in step 883 and transmits the selected characters through the set transmission method in step 885. After the transmission is completed, the character content server 40 adds the transmitted characters to the download list in step 887 and displays character transmission completion in step 889. When a Cancel key is generated in step 891, the character content server 40 stops the transmission procedure of FIG. 30A and performs a return operation.

In relation to FIGS. 3 to. 31, the computer 60 is connected to the character content server 40 and a character service function is performed as illustrated in FIGS. 1B and 1C. That is, the user accesses the character content server 40 through the computer 60, downloads desired character information from the character content server 40 through the computer 60, and purchases the downloaded characters. Alternatively, the user decorates House with the characters to buy the decorated House, and registers the characters or House in My Mounut. The characters (of Mounut, items, and House) registered in My Mounut are transmitted to the wireless terminal. Accordingly, the user can select characters to be used in the wireless terminal through the computer 60 or decorate House to be used in a specific state.

As illustrated in FIG. 1A, the wireless terminal 10 directly accesses the character content server 40, such that it can implement a character service function. That is, the wireless terminal 10 accesses the character content server 40 through the wireless network as illustrated in FIG. 1A, and can select and download desired characters using the character content server 40. In this case, a user interface must be implemented differently from the way that the character service function is implemented using the computer 60. That is, because the wireless terminal 10 uses the wireless network, communication charges occur. Because the display unit of the wireless terminal 10 is smaller than that of the computer, character display is limited in the wireless terminal 10. Accordingly, a user interface capable of reducing the time of accessing the character content server 40 is required, and a user interface capable of effectively displaying the characters is required. In an embodiment of the present invention, it is assumed that a My Mounut screen and a Mounut Land screen are not used. In an embodiment of the present invention, it is assumed that a Mounut Shop screen, a House Shop screen, a purchase screen, and a download screen are used. However, information of all screens used in the computer 60 may be used regardless of the communication fees and limitations of the display unit.

FIGS. 32A to 32E illustrate a procedure in which the wireless terminal 10 accesses the character content server 40 and purchases Mounut.

Figure 32A:
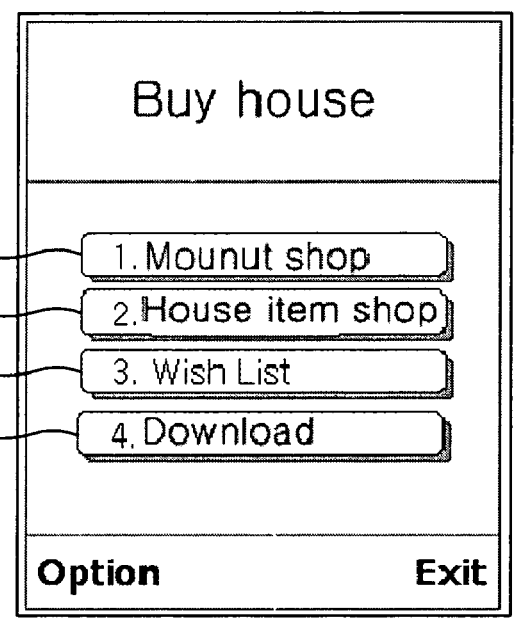
FIGS. 32A to 32E illustrate a procedure for purchasing Mounut (avatar) in the wireless terminal in accordance with an embodiment of the present invention.

Referring to FIGS. 32A to 32E, when a character service is requested, the wireless terminal 10 displays a House Purchase menu as illustrated in FIG. 32A on the display unit 143. The House Purchase menu displays a menu for selecting a Mounut Shop button 911, a House Item Shop button 913, a Wish List button 915, a Download button 917, and so on.

Figure 32B:
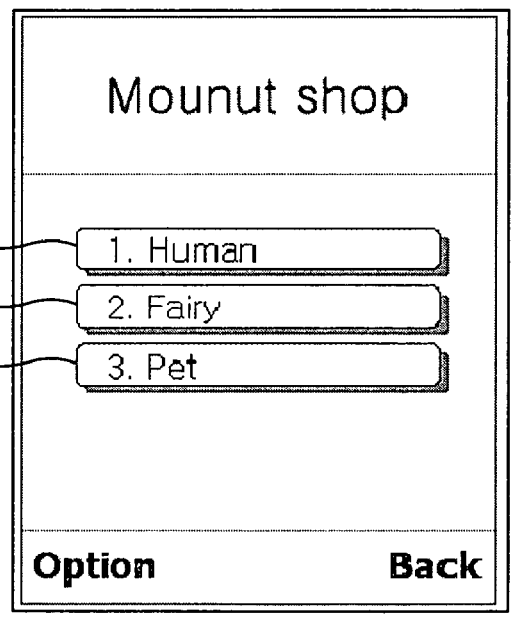

When the user selects the Mounut Shop button 911 in the House Purchase menu, the controller 110 of the wireless terminal 10 displays Mounut types as illustrated in FIG. 32B. In accordance with an embodiment of the present invention, it is assumed that the Mounut types are Human, Fairy and Pet as described above. When the user selects a Mounut type (or a Fairy button 923 of FIG. 32B) in a state in which the Mounut types are displayed, the controller 110 displays Mounut of the selected type as illustrated in FIG. 32C on the display unit 143.

Figure 32C:
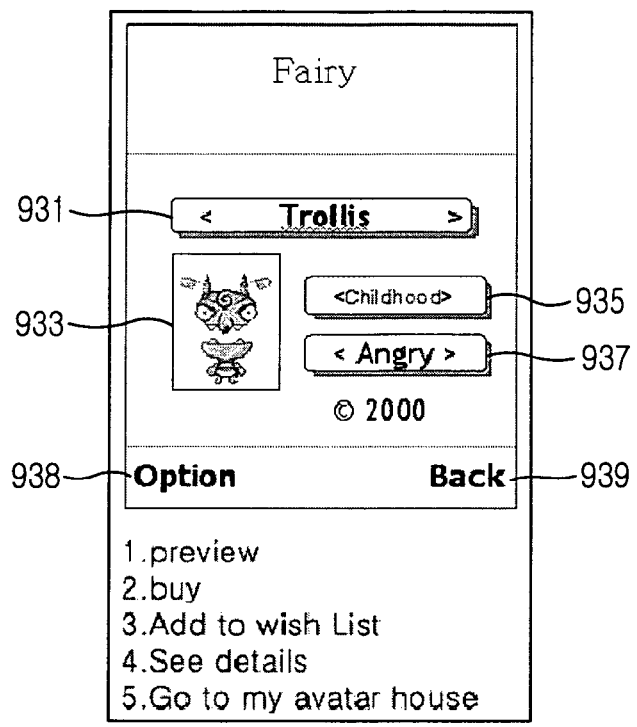
Figure 32D:
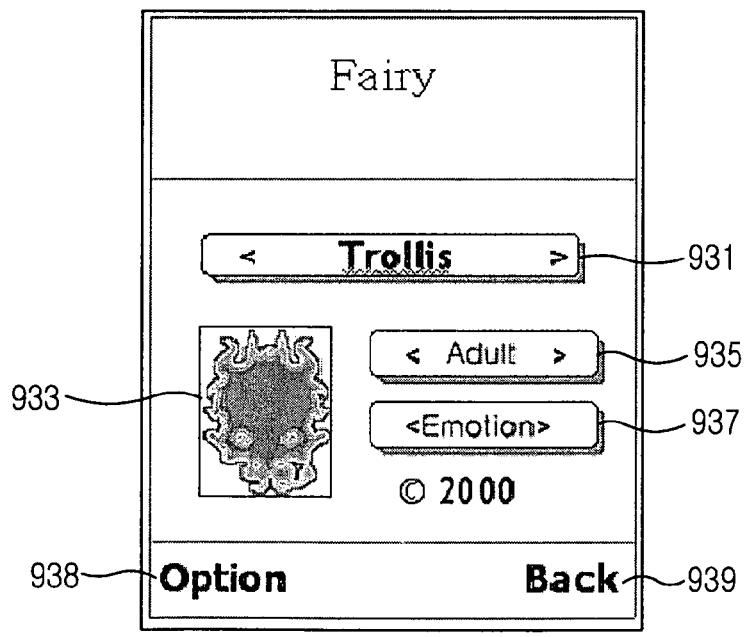

When the Mounut type is selected, the controller 110 displays a screen as illustrated in FIG. 32C on the display unit 143. In this case, the screen of FIG. 32C displays an image 933, a name 931, a growth model 935, and an emotional expression 937 of Mounut. An Option button 938 has option menus such as Preview for applying the displayed Mounut image 933 to House, Buy for purchasing Mounut, Add To Wish List for registering Mounut in the wish list, Detail Info View for Mounut, Go To My Avatar House, and so on. The Mounut name 931 has Left/Right Display buttons. When the user clicks the Left/Right display button, Mounut after/before the currently displayed Mounut is selected. In this case, the Mounut image 933 and the Mounut name 931 are changed to an image and name of the selected Mounut. The growth model 935 has Left/Right buttons. When the Left/Right button is clicked, a growth model is changed. In this case, the Mounut image 933 is changed to a Mounut image of the selected growth model. The growth models may include infancy, adolescence, adulthood, and maturity as described above. The emotional model 937 has Left/Right buttons. When the user clicks the Left/Right button, the emotional model of Mounut is changed to a Mounut image of the selected emotional model. The emotional models may be expressed by Very Happy, Happy, Normal, Sad, Sulky, Tired, Angry, and so on. Accordingly, the user can select Mounut different from Mounut displayed in FIG. 32C, identify a different growth model of the selected Mounut, and identify a different emotional model of the selected Mounut. FIG. 32D illustrates an example of changing the growth model and the emotional model of FIG. 32C. Here, the growth model of Mounut may be processed by a silhouette as described above. In this case, the emotional model is also not expressed.

Figure 32E:
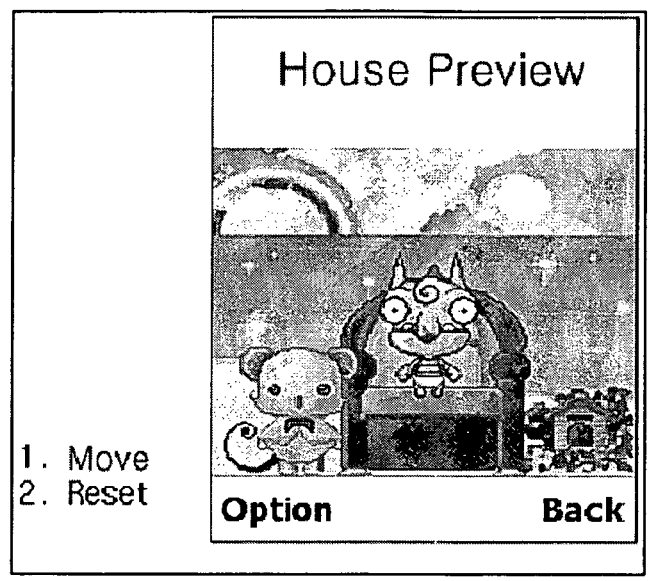

When the Option button 938 in FIG. 32C is clicked, the above-described option menu buttons are displayed. First, when the Preview button is clicked in the Option button 938, the controller 110 changes Mounut of a House screen of the wireless terminal set to a default as illustrated in FIG. 32E to Mounut displayed in FIG. 32C and displays the changed Mounut. The default House screen may be a House screen currently being used in the wireless terminal, and may be a House screen of the default set by the user. Second, when the Buy button is clicked in the Option button 938, the wireless terminal 10 notifies the character content server 40 of the clicked button. The character content server 40 registers Mounut associated with a purchase request from the wireless terminal in My Mounut of a subscriber. In this case, the charges are directly imposed on the wireless terminal. The charges are added to service fees for the wireless terminal. The purchased Mounut can be transmitted to the wireless terminal when the charges are imposed. When the wireless terminal makes a transmission request, the purchased Mounut can be transmitted. Third, when the Add To Wish List button is clicked in the Option button 938, the controller 110 notifies the character content server 40 of the clicked button. The character content server 40 senses the clicked button and registers the selected Mounut in the wish list of the wireless terminal subscriber. Fourth, when the Detail Info View button is clicked in the Option button 938, detail information about the displayed Mounut is displayed. Here, the detail information may be successive variations of a type, birth background, growth model, and emotional model of Mounut. Fifth, the Go To My Avatar House button is clicked in the Option button 938, the controller 110 moves to a House decoration screen of the wireless terminal. Items are arranged in Mounut displayed on the House decoration screen, and the House screen can be decorated. When a Back button 939 is pressed in a screen as illustrated in FIG. 32C, the controller 110 returns to the screen of FIG. 32B.

FIGS. 33A to 33E illustrate a procedure in which the wireless terminal 10 accesses the character content server 40 and purchases a House item.

Figure 33A:
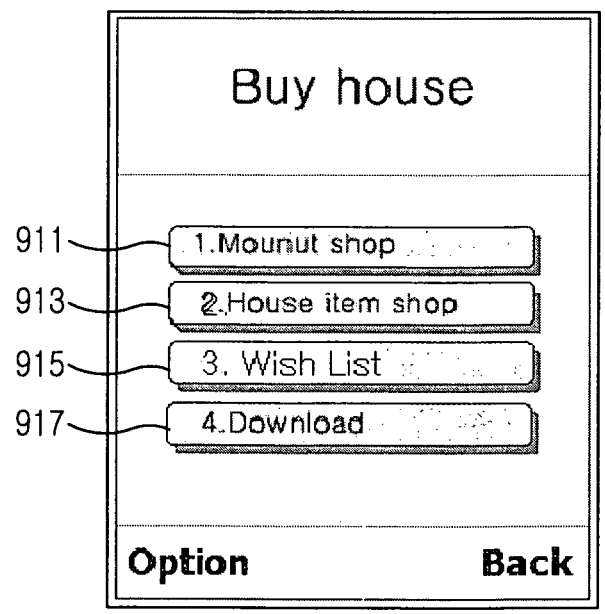
FIGS. 33A to 33E illustrate a procedure for purchasing an item in the wireless terminal in accordance with an embodiment of the present invention.

Referring to FIGS. 33A to 33E, when a character service request is made, the wireless terminal 10 displays a House Purchase menu as illustrated in FIG. 33A on the display unit 143. As described above, the House Purchase menu can be configured by the Mounut Shop button 911 the House Item Shop button 913, the Wish List button 915, the Download button 917, and so on.

Figure 33B:
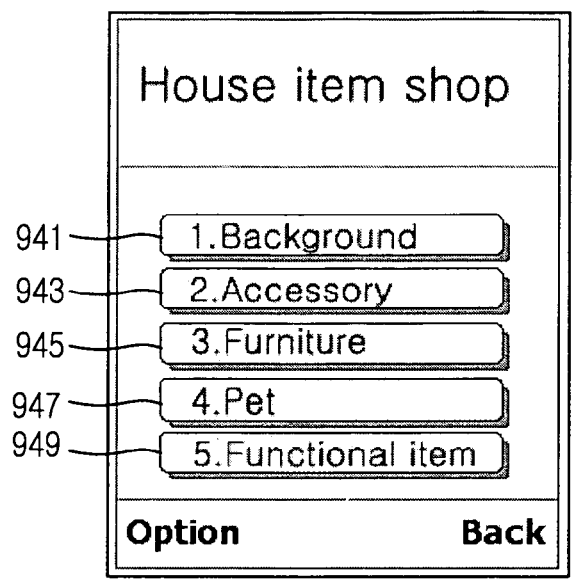
Figure 33C:
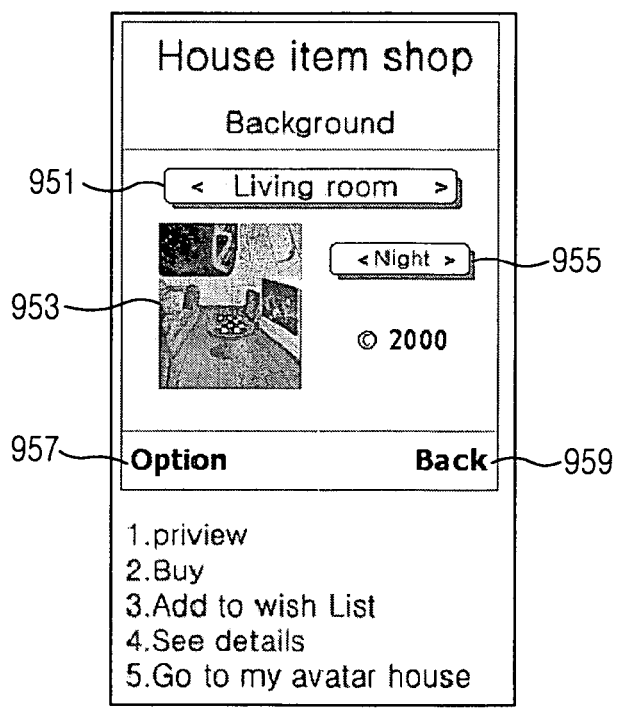
Figure 33D:
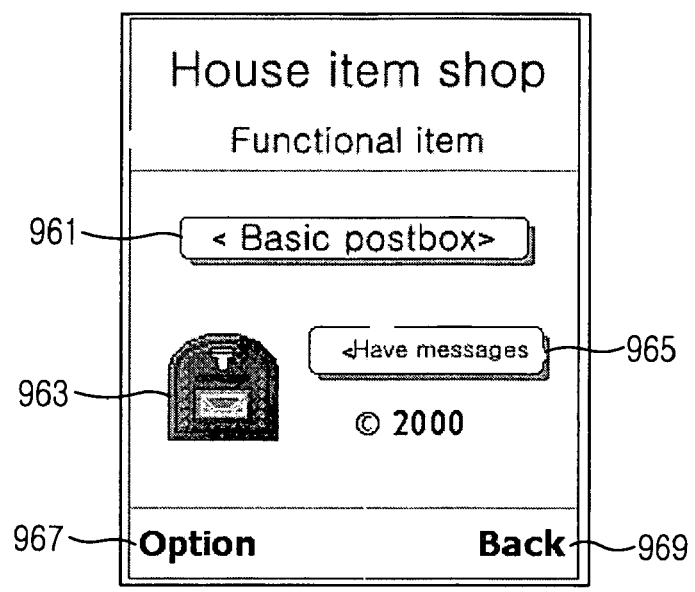

In this case, when the user selects the House Item Shop button 913 in the Mouse Purchase menu, the controller 110 of the wireless terminal 10 displays types of House items as illustrated in FIG. 33B on the display unit 143. In an embodiment of the present invention, it is assumed that the item types are Background, Article, Furniture, Pet, Functional items, and so on. When the user selects an item type in a state in which the item types are displayed, the controller 110 displays an item of the selected type as illustrated in FIGS. 33C and 33D on the display unit 143. FIG. 33C illustrates an example of selecting the Background item, and FIG. 33D illustrates an example of selecting the Functional item. Here, the Background item different from other items is an item in which a background image is changed according to the times (of morning, afternoon, evening, night, and so on). The Functional item may be an item in which a use state of the wireless terminal 10 is displayed. As an example of the Functional item, a Mailbox item can be an item for displaying the presence of an unread text message and the number of unread text messages. A Phone item can be an item for displaying the presence of a missed incoming call and the number of calls. An Alarm Clock item can be an item for displaying the presence of alarm setup and an alarm time. A Clock item can be an item for displaying the presence of a reservation and a reservation time. In an embodiment of the present invention, an example of the Mailbox item will be described.

When the item type (i.e., the Background item) is selected, the controller 110 displays the screen as illustrated in FIG. 33C on the display unit 143. In this case, the screen of FIG. 33C displays an image 953, a name 951, and a time 955 of the Background item, and so on. An Option button 957 has option menus such as Preview for applying the displayed item 953 to House, Buy for purchasing the item, Add To Wish List for registering the item in the wish list, Detail Info View for the item, Go To My Avatar House, and so on.

The item name 951 has Left/Right Display buttons. When the user clicks the Left/Right display button, an item after/before the currently displayed item is selected. In this case, the item image 953 and the item name 951 are changed to an image and name of the selected item. The time 955 has Left/Right buttons. When the Left/Right button is clicked, the displayed time is changed. In this case, a Background item image of the item image 953 is changed to a background image for an associated time part. Here, the time parts can be configured by morning, afternoon, evening, night, and so on, and can be configured by subdivided times, if needed. Background images for simplified time parts of day and night can be configured.

When the Functional item is clicked in the item menu as illustrated in FIG. 33B, the controller 110 displays a screen as illustrated in FIG. 33D on the display unit 143. The screen of FIG. 33D displays an image 963, a name 961, a message 965 of the Functional item, and so on, and displays an Option button 967 and a Back button 969. It is assumed that the Functional item is a mailbox item for displaying an unread message. The mailbox item image 963 and the mailbox item name 961 have the same functions as those of FIG. 33C. When the Message button 965 is clicked in the mailbox item, the presence of an unread message and the number of unread messages are displayed.

Figure 33E:
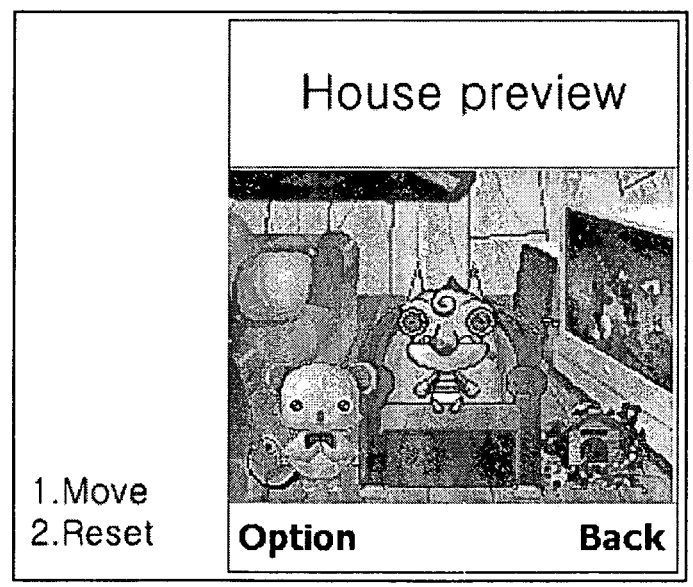

When the Option button 957 of FIG. 32C is clicked option menu buttons are displayed as described above. The Option button 957 can be configured by option menus such as Preview, Buy, Add To Wish List, Detail Info View, Go To My Avatar House, and so on. The function of the Option button 957 is similar to that of the Option button 938 of My Mounut Shop. When the Preview button is clicked, the currently displayed item is displayed on a House screen of the wireless terminal set to the default as illustrated in FIG. 33E. When a Back button 959 is pressed in the screen of FIG. 33C, the controller 110 returns to the screen of FIG. 33B.

When the Wish List button 915 is clicked in the House Purchase menu as illustrated in FIGS. 32A to 34A, the controller 110 of the wireless terminal 10 notifies the character content server 40 of the clicked button. The character content server 40 senses the clicked button, accesses a wish list set by the subscriber of the wireless terminal 10, and downloads the wish list to the wireless terminal 10. Then, the wireless terminal 10 displays the downloaded wish list on the display unit 143.

Figure 34A:
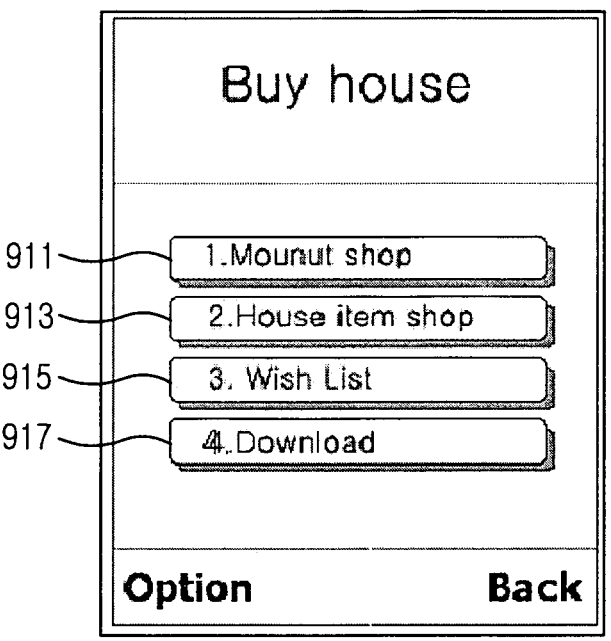
FIGS. 34A to 34C illustrate a procedure for downloading a character purchased in the wireless terminal in accordance with an embodiment of the present invention.
Figure 34B:
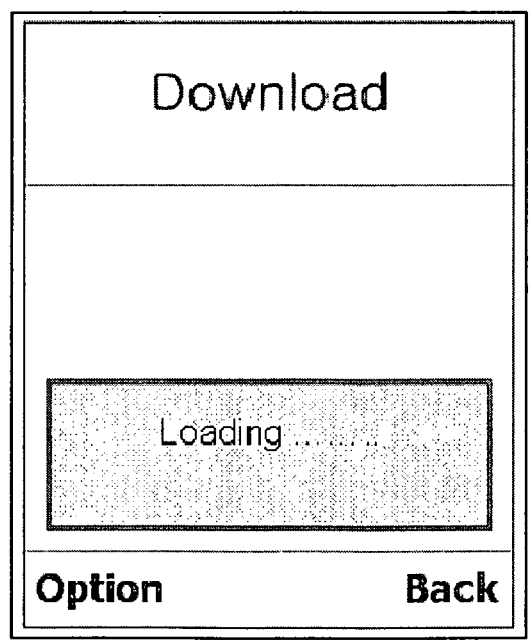
Figure 34C:
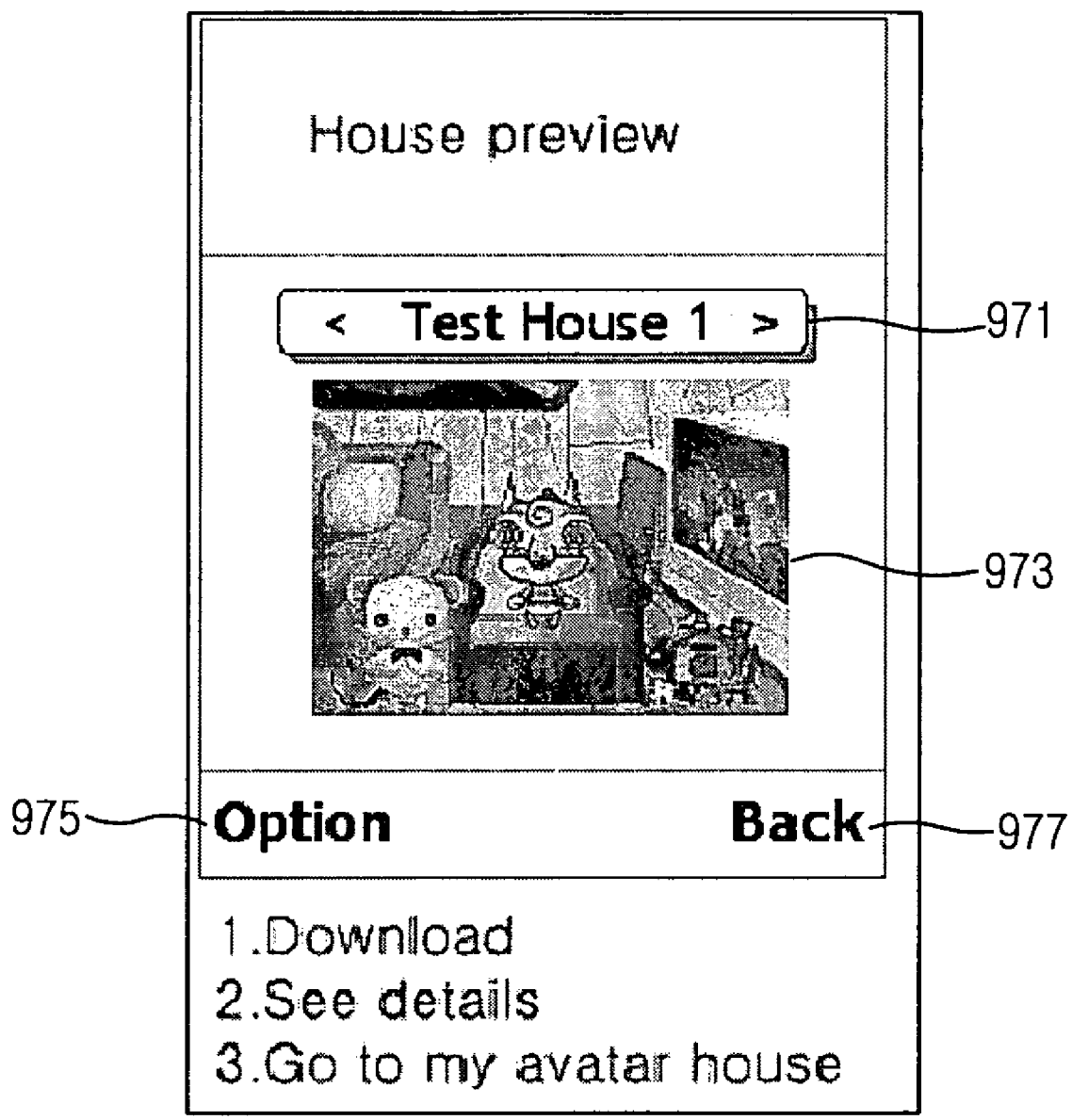

FIGS. 34A to 34C illustrate a procedure for performing a character download service after the character content server is accessed using the wireless terminal 10.

Referring to FIGS. 34A to 34C, when the user clicks a Download button of FIG. 34A, the controller 110 of the wireless terminal 10 notifies the character content server 40 of the clicked button. The character content server 40 accesses and downloads a House list registered in My Mounut of the subscriber of the wireless terminal 10. The controller 110 of the wireless terminal 10 displays a loading rate of the House list in a downloading state as illustrated in FIG. 33B. If the avatar House list has been completely received, the controller 110 displays a Rouse screen as illustrated in FIG. 34C. The House screen is configured by a House name 971, a House screen 973, an Option button 975, and a Back button 977.

In this case, the House screen name 971 has Left/Right buttons. When the Left/Right button is clicked, the downloaded avatar House is changed and the changed House is displayed. In this case, the displayed House screen is a test House image for displaying a structure of House configured by the user rather than a full image of all characters (of Mounut and items). That is, Mounut has the four growth models as described above. Each growth model has seven emotional models. The respective emotional models are displayed in the form of an animation, and are configured by a plurality of images. Because the Background item is configured by images for the time parts, it is configured by a plurality of background images. Accordingly, a significant time is required to download the entire House. Therefore, the character content server 40 downloads a simplified test House structure when the House list is downloaded. In this case, when the Left/Right key of the House name is clicked, the controller 110 displays the downloaded House name and its test House. When the user clicks the Download button is clicked in the Option button 975, the controller 110 sends a request for downloading the currently displayed House to the character content server 40. The character content server 40 downloads an associated House in response to the request of the wireless terminal.

When the user of the wireless terminal 10 selects a menu for downloading a character, the wireless terminal 10 displays character service menus. The character service menus includes a Mounut Shop menu for purchasing an avatar, an Item Shop menu for purchasing a House item, and a Download menu for downloading the purchased character.

When the user selects the Mounut shop menu, the wireless terminal 10 accesses the character content server 40 and makes a request for downloading Mounut (avatar). The character content server 40 senses the request, accesses Mounut in the character content database 50, and downloads the accessed Mounut. Then, the wireless terminal 10 displays the downloaded Mounut. In this case, the user can apply the displayed Mounut to House, implement the preview function, and purchase Mounut identified through the preview. The purchased Mounut can be immediately downloaded and registered in My Mounut of the character content server 40.

Second, when the user selects the House Shop menu, the wireless terminal accesses the character content server 40 and makes a request for downloading House. The character content server 40 senses the request and downloads items of an item type selected from the character content database 50. Then, the wireless terminal 10 can apply the downloaded items to House and can perform the House decoration function. Desired items can be purchased and downloaded, or can be registered in My Mounut of the character content server 40 as described above.

Third, when the user selects the Download menu, the wireless terminal can access the character content server 40, make a request for downloading a list (of Mounut, items, House, and so on) registered in My Mounut, and identify the downloaded list from the character content server 40 to download desired characters.

As described above, Mounut is configured by a plurality of growth models and a plurality of emotional models according to each growth model. Because the emotional models are expressed in the form of an animation, they have large capacity data. In an embodiment of the present invention, a download time can be reduced as a Mounut image associated with part of the growth models (or one growth model in an embodiment of the present invention) is downloaded. When Mounut is downloaded, the wireless terminal 10 makes a request for downloading only the selected Mounut, such that the wireless terminal 10 is not always connected to the character content server 40 but is connected to the character content server 40 only when needed. Accordingly, communication fees for the wireless terminal 10 can be reduced. The Background item of the items is configured by a plurality of images. In this case, as the wireless terminal 10 sends a download request to the character content server 40 if needed, communication fees can be reduced.

As described above, various display functions can be provided to a wireless terminal using an avatar. In an embodiment of the present invention, an avatar House screen configured by an avatar and items is generated in a web site and the generated avatar House screen can be downloaded. This downloaded screen can be displayed as a screen of a specific state (e.g., a standby state). Accordingly, a visual display screen set by a user can be displayed.

What is claimed is:

1. A character service apparatus for a wireless terminal, comprising:

a character content database for storing characters and storing lists of characters purchased by associated subscribers on a subscriber-by-subscriber basis;

a character content server, connected to a data communication network, for downloading character information to a connected data-terminal, registering a character purchased by the data terminal in a character list for an associated data terminal, and accessing a character registered in a character list for an associated terminal in the character content database to download the accessed character when a transmission request is made; and a data terminal for accessing the character content server through the data communication network, displaying downloaded character information, sending a purchase request for a character selected by a user to the character content server, and downloading a purchased character;

wherein the wireless terminal receives the character purchased by the data terminal, and uses the character for screen information to be displayed when the wireless terminal is in a specific state, and wherein the data terminal purchases an avatar from an Avatar Shop, purchases an item from the Item Shop, arranges the purchased avatar and item in a My Avatar, and generates a House screen when the wireless terminal is in a specific state.

2. A character service apparatus for a wireless terminal, comprising:
- a character content database for storing characters and storing lists of characters purchased by associated subscribers on a subscriber-by-subscriber basis;
- a character content server, connected to a data communication network, for downloading character information to a connected data terminal, registering a character purchased by the data terminal in a character list for an associated data terminal, and accessing a character registered in a character list for an associated terminal in the character content database to download the accessed character when a transmission request is made;
- a data terminal for accessing the character content server through the data communication network, displaying downloaded character information, sending a purchase request for a character selected by a user to the character content server, and downloading a purchased character;
- a wireless terminal for receiving the character purchased by the data terminal, and using the character for screen information to be displayed when the wireless terminal is in a specific state; and
- wherein the characters comprise an avatar and a House item, and wherein the character information downloaded from the content server comprises a screen for My Avatar configured by characters registered in a character list for a terminal, Avatar Shop configured by avatars capable of being purchased, and Item Shop configured by House items of House, and
- wherein the data terminal comprises a computer, the computer purchasing an avatar from the Avatar Shop, purchasing an item from the Item Shop, arranging the purchased avatar and item in the My Avatar, and generating a House screen to be used in a specific state of a wireless terminal.

3. The apparatus of claim 2, wherein the avatar includes at least two growth models, each of the growth models having a plurality of emotional models expressed by a plurality of emotions.

4. The apparatus of claim 3, wherein the items include a background item of the House, items for decorating the House, and a functional item for displaying an event state of the wireless terminal.

5. The apparatus of claim 4, wherein the House screen is displayed in a standby state of the wireless terminal, and is configured by the avatar and at least one item.

6. A character service apparatus for a wireless terminal, comprising:
- a character content database for storing characters and storing lists of characters purchased by associated subscribers on a subscriber-by-subscriber basis;
- a character content server, connected to a data communication network, for downloading character information to connected terminals, registering a purchased character in a character list for an associated connected terminal, and accessing a character registered in a character list for an associated connected terminal and accessing a character content database to download the accessed character when a transmission request is made; and
- a wireless terminal for accessing the character content server through a wireless network and the data communication network, displaying downloaded character information, sending a purchase request for a character selected by a user to the character content server, and registering received characters in screen information for displaying a specific state of the wireless terminal after a transmission request for the purchased character is made;
- wherein the wireless terminal receives the character purchased, and uses the character for screen information to be displayed when the wireless terminal is in a specific state;
- wherein the associated connected terminal purchases an avatar from an Avatar Shop, purchases an item from the Item Shop, arranges the purchased avatar and item in a My Avatar, and generates a House screen when the wireless terminal is in a specific state.

7. A character service apparatus for a wireless terminal, comprising:
- a character content database for storing characters and storing lists of characters purchased by associated subscribers on a subscriber-by-subscriber basis;
- a character content server, connected to a data communication network, for downloading character information to connected terminals, registering a purchased character in a character list for an associated connected terminal, and accessing a character registered in a character list for an associated connected terminal in the character content database to download the accessed character when a transmission request is made; and
- a wireless terminal for accessing the character content server through a wireless network and the data communication network, displaying downloaded character information, sending a purchase request for a character selected by a user to the character content server, and registering received characters in screen information for displaying a specific state of the wireless terminal after a transmission request for the purchased character is made;
- wherein the characters comprise an avatar and a House item, and wherein the character information downloaded from the character content server comprises a screen for My Avatar configured by characters registered in a character list for the wireless terminal, Avatar Shop configured by avatars capable of being purchased, and Item Shop configured by House items of House, and,
- wherein the wireless terminal displays Avatar Shop, Item Shop, and Download menus when a character purchase menu is selected, displays features of the selected character when the Avatar Shop or Item Shop menu is selected, sends a purchase request for an associated character when purchase is selected, and selects and downloads a desired character from a downloaded character list when the Download menu is selected.

8. The apparatus of claim 7, wherein the avatar includes at least two growth models, each of the growth models having a plurality of emotional models expressed by a plurality of emotions.

9. The apparatus of claim 8, wherein the items include a background item of the House, items for decorating the House, and a functional item for displaying an event state of the wireless terminal.

10. The apparatus of claim 9, wherein the House screen is displayed in a standby state of the wireless terminal, and is configured by the avatar and at least one item.

11. A character service apparatus for a wireless terminal, comprising:
- a character content database for storing characters and storing lists of characters purchased by associated subscribers on a subscriber-by-subscriber basis;

a character content server, connected to a data communication network, for downloading character-related initial screen information comprising My Character and at least one menu for Character Shop to a connected terminal downloading Character Shop screen information when a Character Shop menu is selected, registering a selected character in My Character, displaying purchased characters when a My Character menu is selected, and accessing selected characters in the character content database to download the accessed characters when a download request is made;

a data terminal for accessing the character content server through the data communication network, displaying the character-related initial screen information, sending a download request for screen information of a menu selected by a user to the character content server, displaying the screen information, selecting a character, making a download request for the selected character, and transmitting the downloaded character to a wireless terminal; and the wireless terminal for receiving the character transmitted from the data terminal and displaying a state of the wireless terminal using the character.

12. A character service apparatus for a wireless terminal, comprising:

a character content database for storing characters and storing lists of characters purchased by associated subscribers on a subscriber-by-subscriber basis;

a character content server, connected to a data communication network, for downloading character-related initial screen information comprising My Character and at least one menu for Character Shop to a connected terminal, downloading Character Shop screen information when a Character Shop menu is selected, registering a selected character in My Character, displaying purchased characters when a My Character menu is selected, and accessing selected characters in the character content database to download the accessed characters when a download request is made;

a data terminal for accessing the character content server through the data communication network, displaying the character-related initial screen information, sending a download request for screen information of a menu selected by a user to the character content server, displaying the screen information, selecting a character, making a download request for the selected character, and transmitting the downloaded character to a wireless terminal; and the wireless terminal for receiving the character transmitted from the data terminal and displaying a state of the wireless terminal using the character; and wherein the Character Shop is configured by Avatar Shop and House Shop, and wherein the Avatar Shop comprises an area for displaying avatars with at least two emotional models capable of expressing emotions in the wireless terminal, a preview area for displaying a selected avatar, and a Buy button area for purchasing the avatars, and wherein the House Shop comprises an area for displaying items configuring a House screen, a preview area for displaying a selected item, and a Buy button area for purchasing the items.

13. The apparatus of claim 12, wherein My Avatar comprises an area for displaying a purchased avatar and purchased items, a preview area for displaying the avatar and the items on a House screen, and a Send button area for transmitting the avatar and the items to the wireless terminal.

14. A character service method for a wireless terminal, comprising the steps of:

displaying character-related initial screen information comprising a menu of My Character and at least one menu of Character Shop;

displaying characters when the Character Shop menu is selected, purchasing a displayed character according to a request of a user, and registering the purchased character in the My Character;

displaying purchased characters when the My Character menu is selected, displaying a selected character on a preview screen, and transmitting the selected character to a wireless terminal when a transmission command is issued, wherein the characters comprise an avatar having at least two emotional models for expressing emotions in the wireless terminal and an item for configuring a House screen; and wherein the Character Shop comprises Avatar Shop, and wherein the step of purchasing a character of the avatar comprises the steps of:

displaying avatar images on an avatar display area when a menu of the Avatar Shop is selected, and displaying the House screen on a preview area;

displaying an avatar selected from the avatar display area as an avatar of the preview area; and registering the displayed avatar in the My Character when a purchase request is made.

15. The method of claim 14, wherein a screen of the Avatar Shop comprises an area for displaying buttons for selecting a type of the avatar, a first avatar display area for displaying avatars of the type selected by the buttons, and a second display area for displaying bestseller avatars, and wherein the step of processing the Avatar Shop menu comprises the steps of:

displaying the avatars on the first or second display area;

displaying a selected avatar on the House screen when the displayed avatars are selected; and registering the selected avatar in the My Character when a purchase request for the displayed avatar is made.

16. The method of claim 14, wherein the Character Shop comprises Item Shop, and wherein the step of purchasing a character of the item comprises the steps of:

displaying item images on an item display area when a menu of the Item Shop is selected, and displaying the House screen on a preview area;

displaying an item selected from the item display area as an avatar of the preview area; and registering the displayed item in the My Character when a purchase request is made.

17. The method of claim 16, wherein a screen of the Item Shop comprises an area for displaying buttons for selecting a type of the item, a first item display area for displaying items of the type selected by the buttons, and a second display area for displaying bestseller items, and wherein the step of processing the Item Shop menu comprises the steps of:

displaying a selected item on the House screen when the items displayed on the first or second display area are selected; and registering the selected item in the My Character when a purchase request for the selected item is made.

18. The method of claim 14, wherein the step of processing the My Character menu comprises the steps of:

displaying a registered avatar and registered items;

displaying a selected avatar on the preview screen when the displayed avatar is selected;

displaying a selected item on the preview screen when the displayed avatar is selected; and transmitting the preview screen's characters currently being displayed to a wireless terminal when a transmission command is issued.

19. The method of claim 14 wherein the characters are an avatar having at least two emotional models for expressing emotions in the wireless terminal and an item for configuring a House screen.

20. A character service method between data terminals and a character content server, the character content server being connected to the data terminals through a data network and having character content of an avatar and an item, comprises the steps of:

when the data terminals are connected, displaying character-related initial screen information comprising a My Character menu for displaying purchased characters downloaded from the character content server, an Avatar Shop menu for displaying avatar characters, a House Shop menu for displaying House items, and a Download menu for making a download request for a purchased character;

downloading an Avatar Shop screen from the character content server when the Avatar Shop menu is selected, displaying avatars on a display area, displaying a selected avatar in a House screen on a preview area, and transmitting the selected avatar to the character content server to register the selected character in My Character when a purchase request is made;

downloading a House Shop screen from the character content server when the House Shop menu is selected, displaying item characters on a display area, displaying a selected item in the House screen on the preview area, and transmitting the selected item to the character content server to register the selected item in the My Character when the purchase request is made;

downloading a My Character screen from the character content server when the My Character menu is selected, displaying avatars and items on display areas, displaying a selected avatar and item in the House screen on the preview area, and storing characters displayed on the preview area when a store request is made; and downloading character lists registered in the My Character menu when the download request is made, and downloading, to a data terminal, an avatar, an item, or House screen characters selected from the character lists when the download request is made.

21. The method of claim 20, wherein the step of purchasing the avatar comprises the steps of:

displaying a selected type of avatars on the avatar display area;

displaying a selected avatar on the preview area when the displayed avatars are selected;

displaying the avatar of the preview area in a selected emotional model when a Motion button is selected from a Menu button area;

displaying the avatar of the preview area in a selected growth model when a Level button is selected from the Menu button area; and purchasing the selected avatar and registering the purchased avatar in the My Character when a Buy button is selected.

22. The method of claim 21, wherein the step of displaying the avatars comprises the steps of:

displaying a selected type of avatars on a first display area, the avatar type being Human, Pet, Fairy, and so on; and displaying bestseller avatars of the Avatar Shop on a second display area.

23. The method of claim 20, wherein the step of purchasing the item comprises the steps of:

displaying a selected type of items on the House item display area;

displaying a selected item on a preview area when the displayed items are selected; and purchasing the item arranged on the preview area and registering the purchased item in the My Character when a Buy button is selected.

24. The method of claim 23, wherein the step of displaying the items comprises the steps of:

displaying a selected type of items on a first display area, the avatar type being a background item of House, an item for decorating the House, and a functional item for displaying a specific state of a terminal; and displaying bestseller items of the Item Shop on a second display area.

25. The method of claim 20, wherein the step of processing the My Character comprises the steps of:

displaying items on an item display area and displaying avatars on an avatar display area;

displaying an item and an avatar selected from the display areas on a preview area;

storing the House screen displayed on the preview area when House Store is selected; and transmitting the selected avatar, item, or House screen to a wireless terminal when transmission is selected.

26. The method of claim 25, wherein the steps of transmitting the character comprises the steps of:

when the wireless terminal is connected through a cable, transmitting the character through the cable; and when the wireless terminal is connected in a local area communication scheme, transmitting the character to the wireless terminal in a set local area communication method.

27. A character service method for a wireless terminal, comprising the steps of:

displaying a Character Shop menu and a Download menu when a character service request is made;

displaying a character downloaded from a character content server when the Character Shop menu is selected, sending a purchase request to the character content server when purchase of the displayed character is selected, and registering the character in My Character;

downloading the selected character in the My Character when a Buy menu is selected and registering the downloaded character as a character for displaying a specific state of a wireless terminal; and wherein the Character Shop is configured by Avatar Shop and House Shop, and wherein the step of purchasing a character from the Character Shop comprises the steps of:

displaying an avatar downloaded from the character content server when a menu of the Avatar Shop is selected, sending a purchase request to the character content server when purchase of the displayed avatar is selected, and registering the avatar in the My Character; and displaying an item downloaded from the character content server when a menu of the House Shop is selected, sending a purchase request to the character content server when purchase of the displayed item is selected, and registering the item in the My Character.

28. The method of claim 27, wherein the step of purchasing an avatar from the Avatar Shop further comprises the steps of:

displaying avatar types when the Avatar Shop menu is selected; and displaying a selected type of avatars while scrolling the avatars according to a user's selection when avatars of the displayed types are displayed.

29. The method of claim 28, wherein the step of displaying the avatar further comprises the steps of:

additionally including menus for viewing an emotional model and a growth model of the avatar;

displaying an avatar of a selected emotional model when a emotional model menu is selected; and displaying an avatar of a selected growth model when a growth model menu is selected.

30. The method of claim 27, wherein the step of purchasing an item from the House Shop further comprises the steps of:

displaying item types when a menu of the House Shop is selected; and displaying a selected type of items while scrolling the items according to a user's selection when items of the displayed types are displayed.

31. The method of claim 30, wherein the item types include a background item of the House screen, items for decorating the House, and a functional item for displaying a specific event state of a wireless terminal.

32. The method of claim 31, further comprising the steps of:

additionally including a time menu in the background item; and displaying a background item image in which the background item varies with time.

33. The method of claim 31, wherein the functional item is an item for displaying an unread message in a wireless terminal.

34. The method of claim 31, wherein the functional item is an item for displaying a missed call in a wireless terminal.

* * * * *